(12) United States Patent
Jhanji et al.

(10) Patent No.: US 11,115,467 B2
(45) Date of Patent: *Sep. 7, 2021

(54) SYSTEMS AND METHODS TO DISCOVER AND NOTIFY DEVICES THAT COME IN CLOSE PROXIMITY WITH EACH OTHER

(71) Applicant: Neeraj Jhanji, Singapore (SG)

(72) Inventors: Neeraj Jhanji, Singapore (SG); Renaldo Noma, Singapore (SG)

(73) Assignee: Neeraj Jhanji, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/226,260

(22) Filed: Apr. 9, 2021

(65) Prior Publication Data

US 2021/0227025 A1 Jul. 22, 2021

Related U.S. Application Data

(63) Continuation of application No. 17/098,747, filed on Nov. 16, 2020, now Pat. No. 11,019,141, which is a continuation of application No. 16/885,565, filed on May 28, 2020, now Pat. No. 10,951,698, which is a
(Continued)

(51) Int. Cl.
| | |
|---|---|
| *H04H 20/61* | (2008.01) |
| *H04L 29/08* | (2006.01) |
| *H04W 76/14* | (2018.01) |
| *H04W 4/08* | (2009.01) |
| *H04W 4/80* | (2018.01) |

(Continued)

(52) U.S. Cl.
CPC ...... *H04L 67/1091* (2013.01); *H04L 67/1046* (2013.01); *H04W 4/08* (2013.01); *H04W 4/80* (2018.02); *H04W 76/14* (2018.02); *H04W 84/18* (2013.01)

(58) Field of Classification Search
None
See application file for complete search history.

(56) References Cited

U.S. PATENT DOCUMENTS

| | | |
|---|---|---|
| 6,539,393 B1 | 3/2003 | Kabala |
| 8,086,535 B2 | 12/2011 | Zweig et al. |
| 8,458,363 B2 | 6/2013 | Rosenblatt et al. |

(Continued)

FOREIGN PATENT DOCUMENTS

WO 2015/094220 A1 6/2015

*Primary Examiner* — Nasser M Goodarzi
*Assistant Examiner* — Terrika Peterson
(74) *Attorney, Agent, or Firm* — Mattingly & Malur, PC

(57) ABSTRACT

An electronic device of a first user configured to connect with a second electronic device of a second user over a first peer-to-peer wireless network link; send to the second electronic device, a first unique code generated by the first electronic device, corresponding to a first user identifier of the first electronic device; receive from the second electronic device, a second unique code generated by the second electronic device, corresponding to a second user identifier of the second electronic device; store the second unique code; store on the first electronic device, information indicating the proximity of the second electronic device and the time when it is within the communicable range of the first electronic device; retrieve from a coupled backend database stored in a cloud, a third unique code; and, upon determining that the third unique code matches the second unique code, display a notification on the first electronic device.

30 Claims, 40 Drawing Sheets

Related U.S. Application Data continuation of application No. 15/655,934, filed on Jul. 21, 2017, now Pat. No. 10,791,172.

(60) Provisional application No. 62/365,784, filed on Jul. 22, 2016.

(51) Int. Cl.
*G01Q 10/00* (2010.01)
*H04W 84/18* (2009.01)

(56) References Cited

U.S. PATENT DOCUMENTS

| | | |
|---|---|---|
| 8,838,697 B2 | 9/2014 | Lashkari et al. |
| 8,934,624 B2 | 1/2015 | Zweig et al. |
| 9,078,087 B2 | 7/2015 | Yoon |
| 9,224,364 B2 | 12/2015 | Weber |
| 10,917,767 B2 | 2/2021 | Nilsson et al. |
| 2004/0077367 A1 | 4/2004 | Sama et al. |
| 2006/0200570 A1 | 9/2006 | Stirbu |
| 2008/0051033 A1 | 2/2008 | Hymes |
| 2008/0120150 A1 | 5/2008 | McSheffrey et al. |
| 2010/0081385 A1 | 4/2010 | Lin et al. |
| 2011/0066808 A1 | 3/2011 | Flynn et al. |
| 2011/0163944 A1 | 7/2011 | Bilbrey et al. |
| 2013/0268929 A1 | 10/2013 | Tyhurst et al. |
| 2014/0057560 A1 | 2/2014 | Lin et al. |
| 2014/0167936 A1 | 6/2014 | Lee et al. |
| 2014/0199967 A1 | 7/2014 | Varoglu et al. |
| 2014/0344446 A1 | 11/2014 | Rjeilie et al. |
| 2014/0362728 A1 | 12/2014 | Krochmal et al. |
| 2015/0082382 A1 | 3/2015 | Maguire et al. |
| 2015/0201443 A1 | 7/2015 | Emani et al. |
| 2015/0230078 A1 | 8/2015 | Kandangath et al. |
| 2015/0295995 A1 | 10/2015 | Yang |
| 2015/0326623 A1 | 11/2015 | Albert et al. |
| 2017/0134455 A1 | 5/2017 | Ballands et al. |
| 2018/0035294 A1 | 2/2018 | Reunamaki et al. |

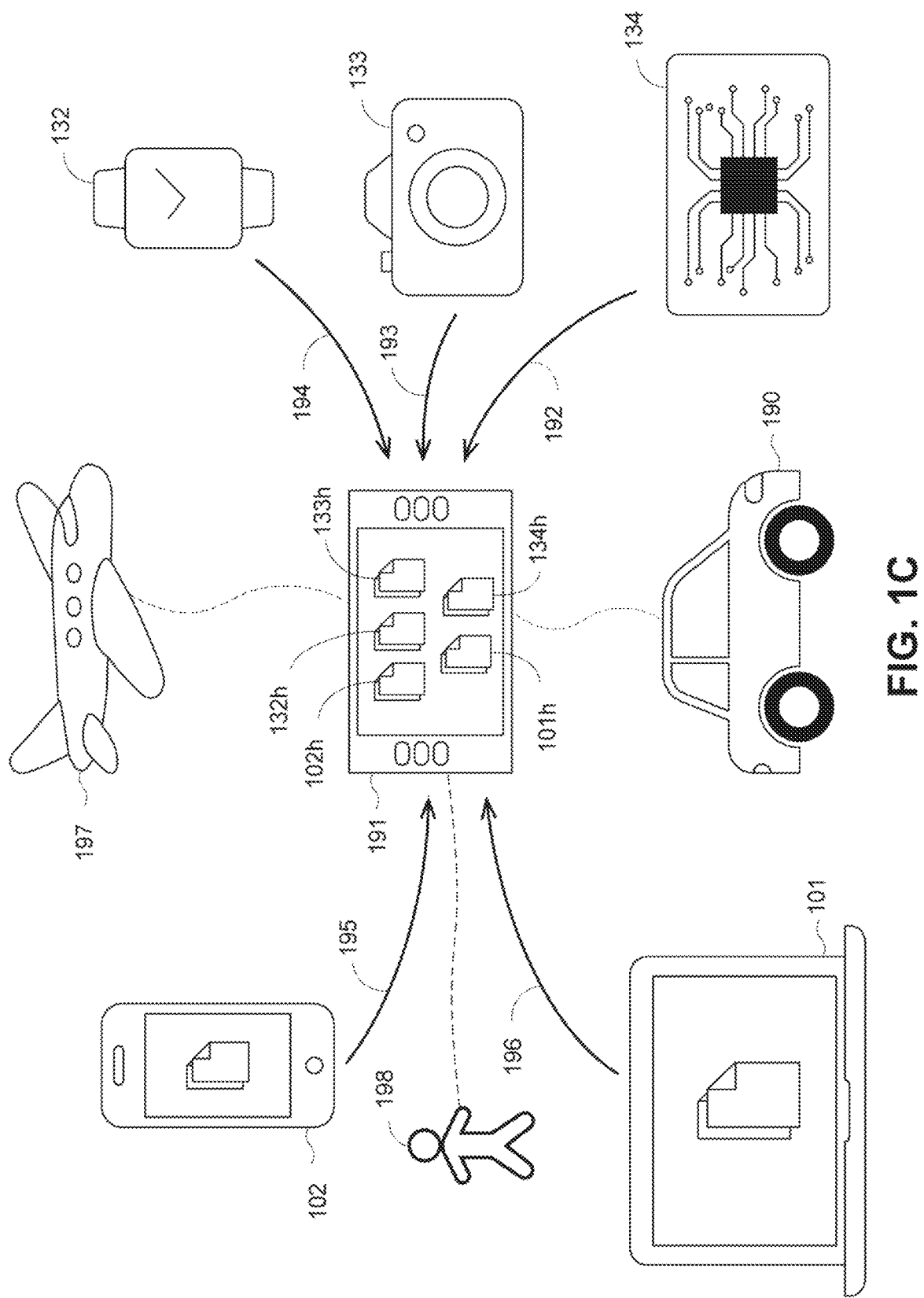

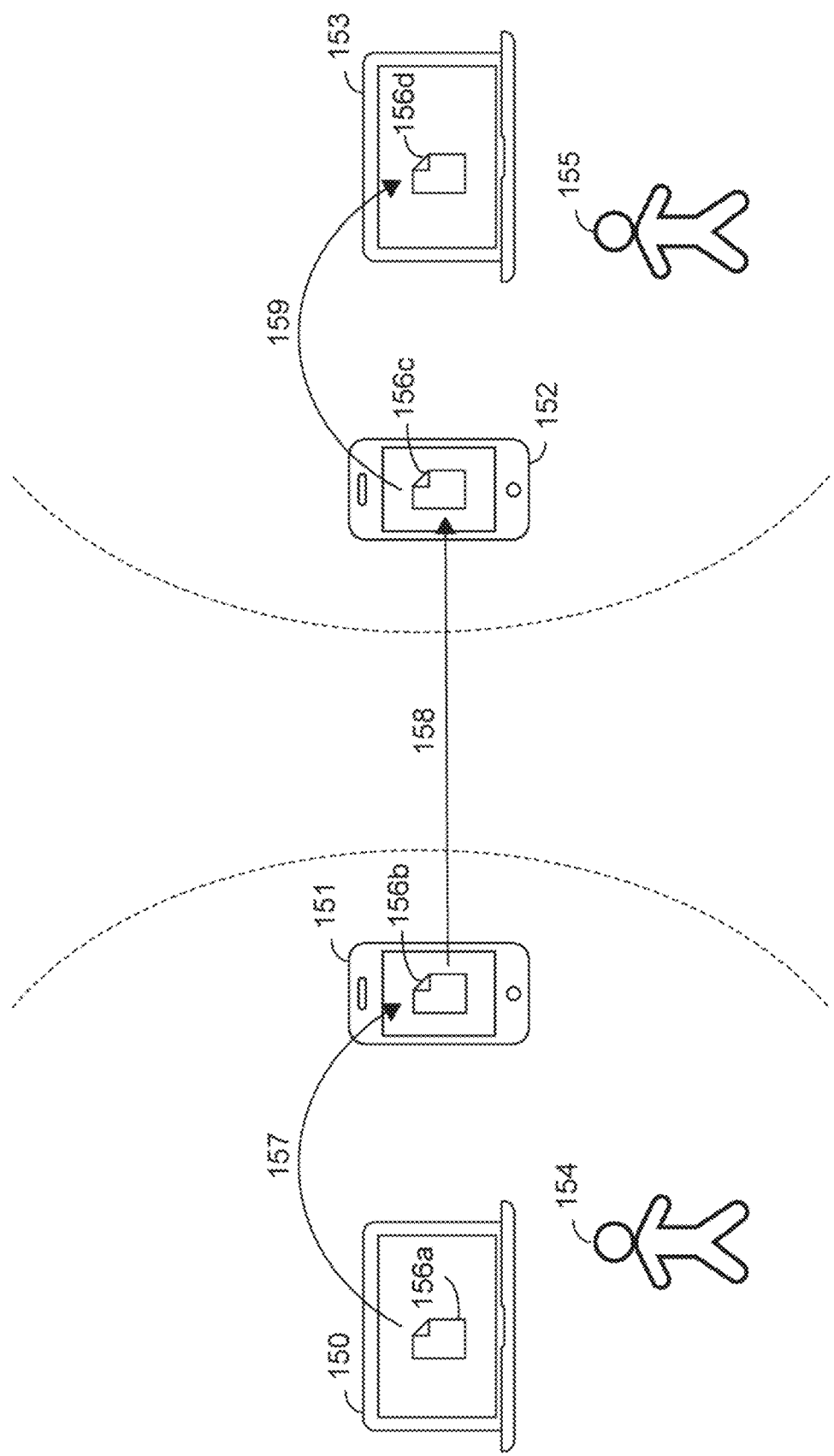

iOS PHOTO LIBRARY 253
*(CONTENT STORAGE CONTAINER)*

PHAssetCollection (251A)
| | |
|---|---|
| localizedTitle | : Kilimanjaro Tour |
| startDate | : 2016-07-08 08:05:34 |
| endDate | : 2016-07-13 21:30:15 |

PHAsset (252A)
| | |
|---|---|
| filename | : IMG_0123.JPG |
| creationDate | : 2016-07-08 08:05:34 |
| modificationDate | : 2016-07-08 08:05:34 |
| size | : 4,194,304 |

INTERMEDIATE DATA STRUCTURE

JSON (251C)
```
"contentOfDirectory": [
  {
    "name": "Kilimanjaro Tour",
    "type": "directory",
    "permissions": 417,
    "creationDate":
      "2016-07-8 08:05:34",
    "modificationDate":
      "2016-07-13 22:30:15"
  },
]
```

JSON (252C)
```
"contentOfDirectory": [
  {
    "name": "IMG_0123.JPG",
    "type": "regular",
    "size": 4194304,
    "permissions": 401,
    "creationDate":
      "2016-07-08 08:05:34",
    "modificationDate":
      "2016-07-08 08:05:34"
  },
]
```

PRESENTED FILE SYSTEM STRUCTURE

Folder Attributes (251E)
| | |
|---|---|
| name | : Kilimanjaro Tour |
| creationDate | : 2016-07-08 08:05:34 |
| modificationDate | : 2016-07-08 08:05:34 |
| permissions | : 417 |

Kilimanjaro Tour (251)
IMG_0123.JPG (252)
(250)

File Attributes (252E)
| | |
|---|---|
| name | : IMG_0123.JPG |
| creationDate | : 2016-07-08 08:05:34 |
| modificationDate | : 2016-07-08 08:05:34 |
| permissions | : 401 |
| size | : 4,194,304 |

FIG. 2C

| NO. | IDENTIFIER TYPE | EXAMPLE |
|---|---|---|
| 1. | DEVICE Unique ID | • Serial Number<br>• Hardware ID: WiFi MAC address, Bluetooth MAC address, etc<br>• UUID or GUID which typically formatted as: 123e4567-e89b-12d3-a456-426655440000<br>• Hash of combination or either of the above numbers |
| 2. | DEVICE NAME | • Renaldo's iPhone |
| 3. | USER ID / USER LOGIN | • Company Directory such as LDAP<br>• Social Sign-In e.g. OpenID, Facebook Connect, Twitter login, Google login, etc.<br>• User Account e.g. Apple ID |
| 4. | CONTACT INFO | • Email Address<br>• Phone Number<br>• Person Name<br>• Social Media handle, e.g. Twitter handle |

FIG. 2D

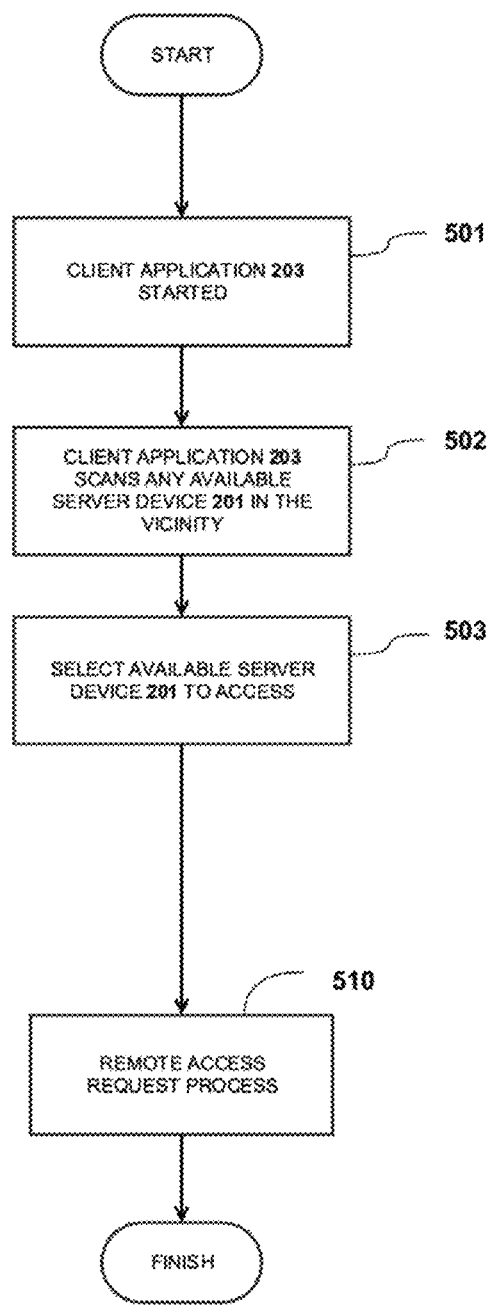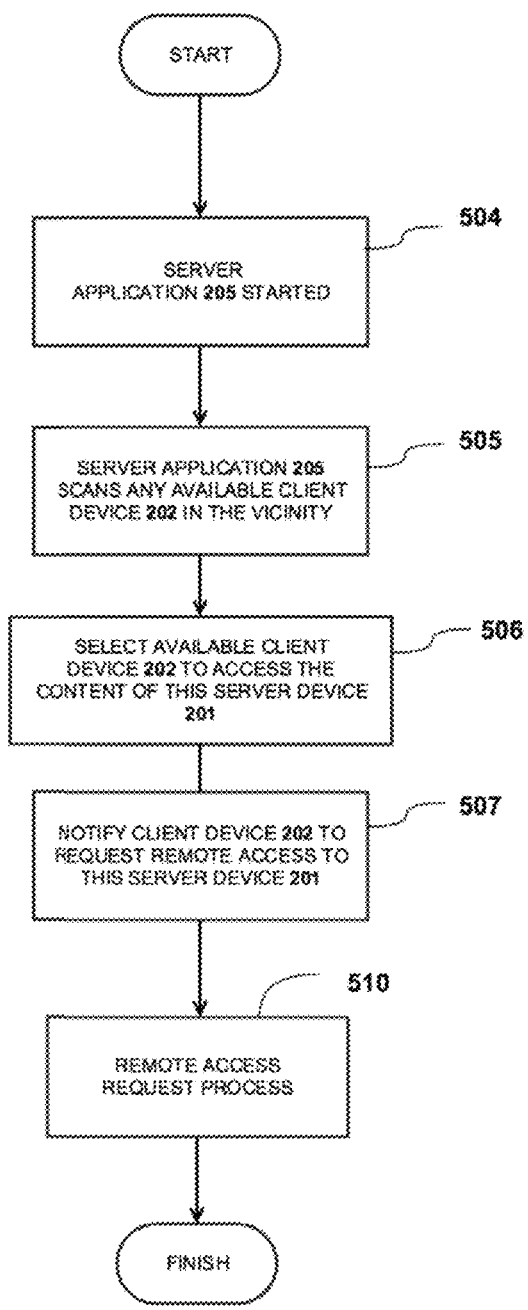
FIG. 5A
FIG. 5B

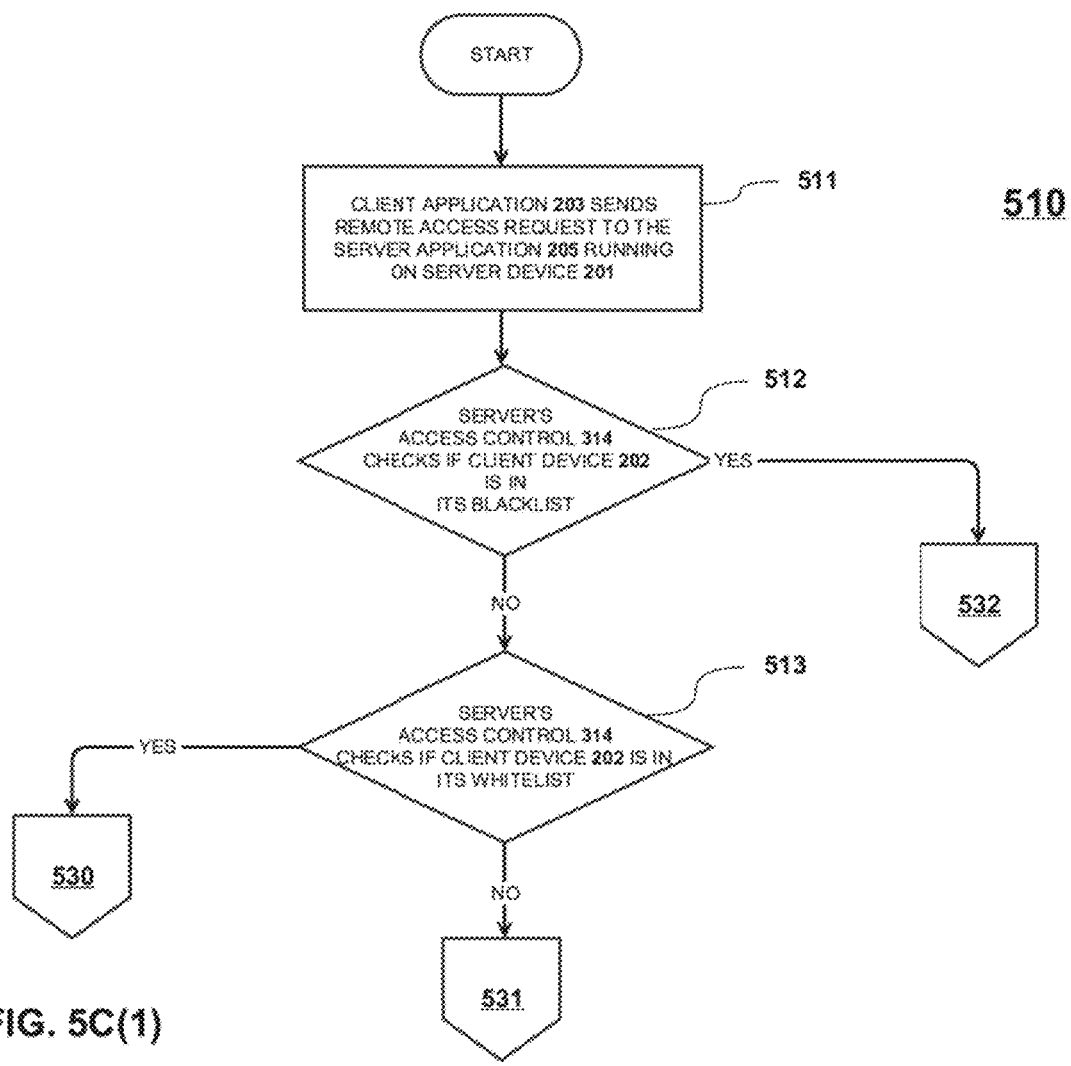
FIG. 5C(1)

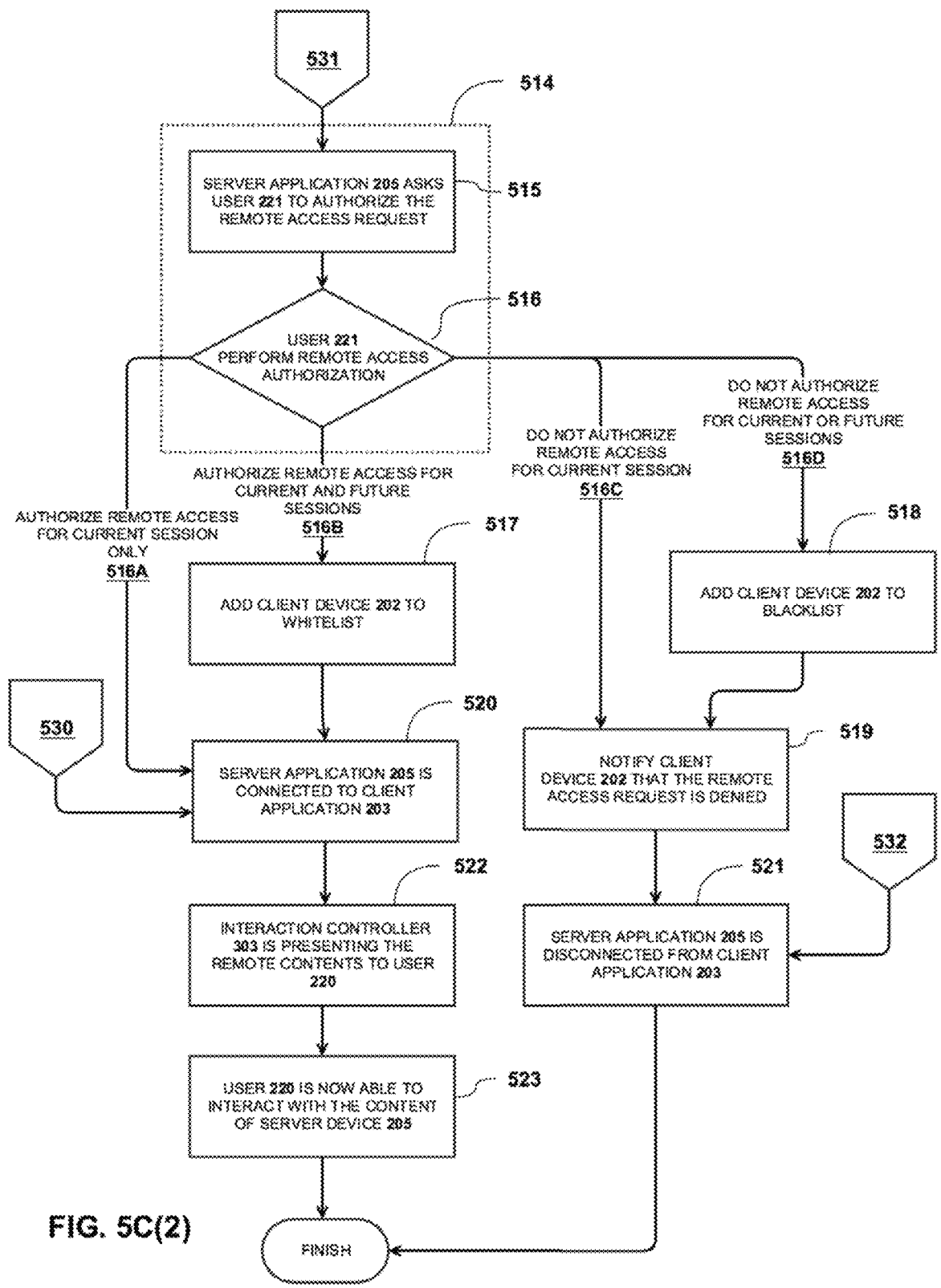
FIG. 5C(2)

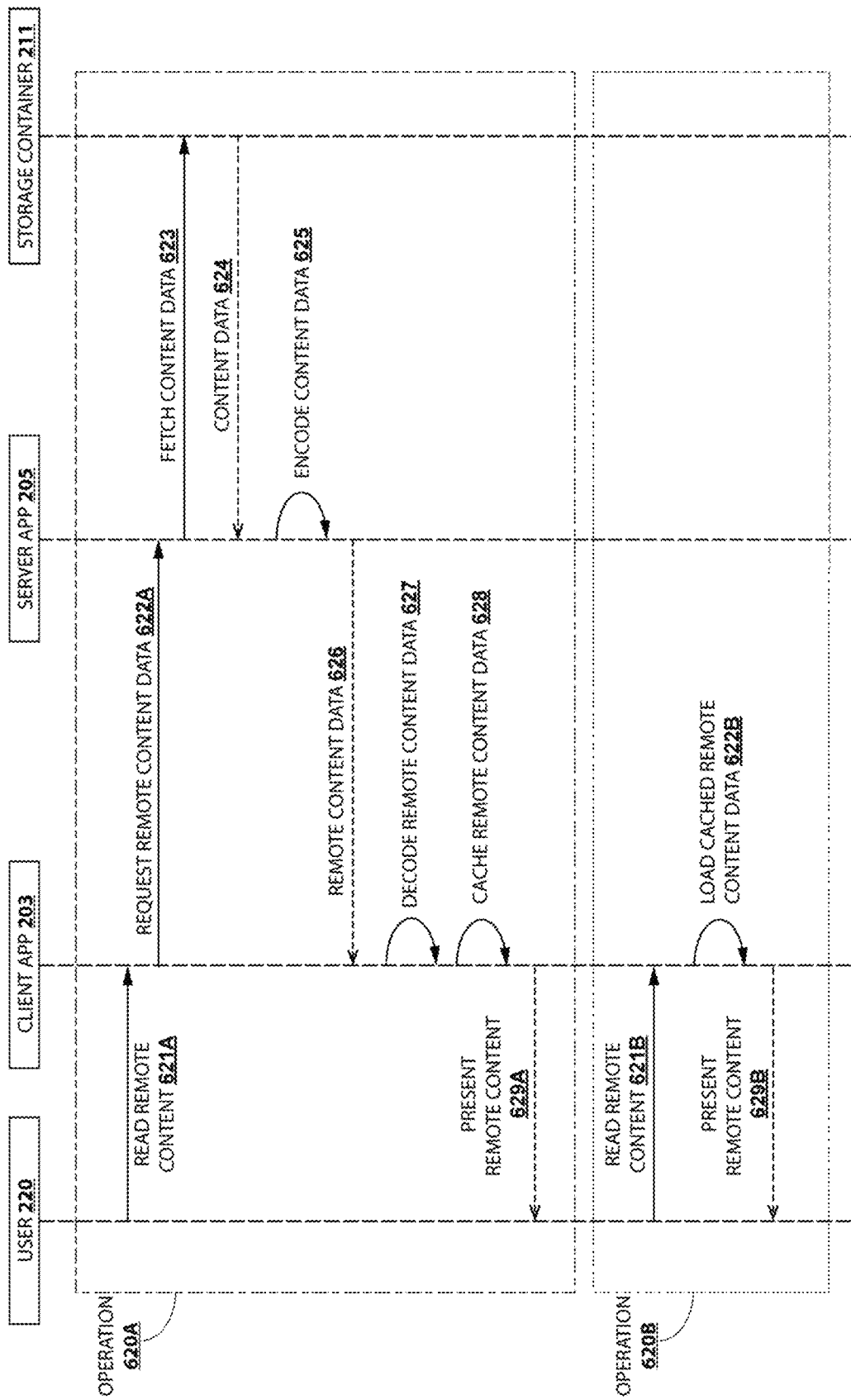

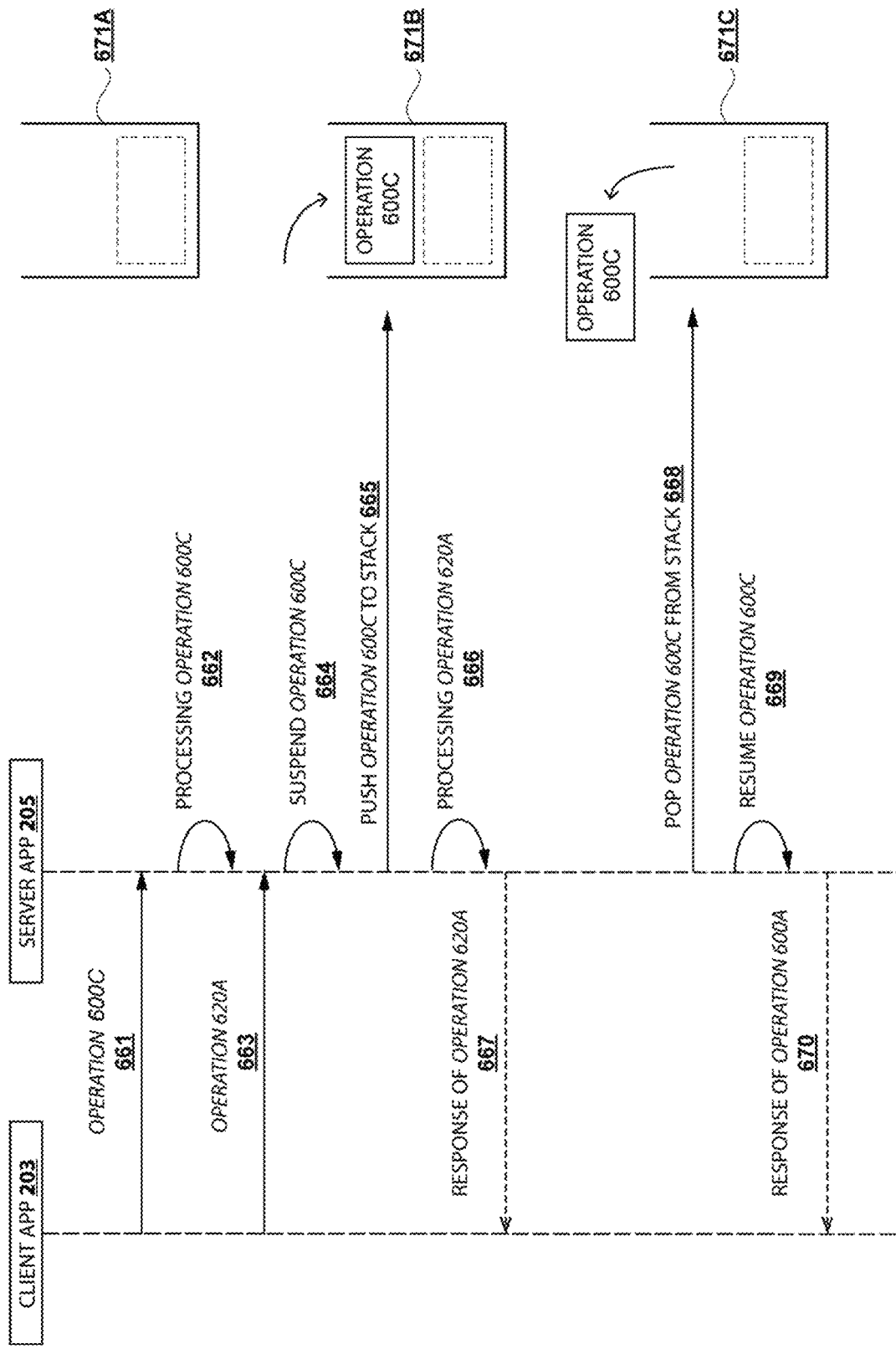

SYSTEMS AND METHODS TO DISCOVER AND NOTIFY DEVICES THAT COME IN CLOSE PROXIMITY WITH EACH OTHER

BACKGROUND

Wireless and wired connections, such as Wi-Fi, cellular (3G/LTE) or Ethernet may be used for internet connectivity to handle our needs for file transfer, browsing the internet, social networking, email/messaging, sending photos to each other, audio/video calling and e-commerce. It is curious that when we pass a printed photo to someone next to us in the real world we just hand it over to them but when we want to share a digital photo from our smartphone to someone standing in front of us, we typically send it across the internet, creating copies along the way. This approach lacks privacy and can be slow and costly when uploading to cloud storage or a web service via a 3G/LTE cellular connection. Further, it seems counter-intuitive to send a photo to the internet and back when we are simply trying to move it from one of our devices to another device physically located next to or in close proximity with each other. Emailing a photo or file to yourself feels as strange as sending a letter to ourselves. For short distance communication, we typically use a USB cable to connect our smartphone to our computer, or Bluetooth/NFC for light data transfers for example for streaming audio or transferring business cards. A USB cable is just not as user friendly as not needing one at all, whereas Bluetooth/NFC are not fast enough to transfer rich media such as photos and videos. Accordingly, technical problems exist in the conventional techniques for exchanging data amongst users and devices.

The subject matter of the following documents is incorporated herein by reference.

|    | Patent Application     | Title                                                                                                                             | Filing Date    |
|----|------------------------|-----------------------------------------------------------------------------------------------------------------------------------|----------------|
| 1  | US20150230078          | Secure Ad Hoc Data Backup to Nearby Friend Devices                                                                                | Feb. 10, 2014  |
| 2  | US20140344446          | Proximity and context aware mobile workspaces in enterprise systems                                                               | Apr. 11, 2014  |
| 3  | US20130268929          | Method for sharing an internal storage of a portable electronic device on a host electronic device and an electronic device configured for same | Apr. 5, 2012   |
| 4  | US20060200570          | Discovering and mounting network file systems via ad hoc, peer-to-peer networks                                                   | Mar. 2, 2005   |
| 5  | U.S. Pat. No. 8,934,624 | Decoupling rights in a digital content unit from download                                                                         | Dec. 27, 2011  |
| 6  | U.S. Pat. No. 8,086,535 | Decoupling rights in a digital content unit from download                                                                         | Apr. 4, 2006   |
| 7  | PCT/US2013/076063      | Gesture-based information exchange between devices in proximity                                                                   | Dec. 18, 2013  |
| 8  | US20150082382          | Techniques for multi-standard peer-to-peer connection                                                                             | Jun. 20, 2014  |
| 9  | US20140362728          | Discovery of nearby devices for file transfer and other communications                                                            | Sep. 25, 2013  |
| 10 | U.S. Pat. No. 8,838,697 | Peer-to-peer file transfer between computer systems and storage devices                                                           | Mar. 8, 2012   |
| 11 | US20150295995          | File transferring method and device through wi-fi direct                                                                          | Jun. 21, 2013  |
| 12 | US20100081385          | Peer-to-peer host station                                                                                                         | Sep. 30, 2008  |
| 13 | US20140057560          | Peer-to-peer host station                                                                                                         | Aug. 23, 2013  |
| 14 | US20140287690          | Method of connecting networks using wi-fi direct in image forming apparatus, image forming apparatus supporting wi-fi direct, and image forming system | Mar. 21, 2014  |
| 15 | U.S. Pat. No. 9,078,087 | Method and apparatus for forming Wi-Fi P2P group using Wi-Fi direct                                                               | Aug. 6, 2012   |
| 16 | US20140199967          | Bump or Close Proximity Triggered Wireless Technology                                                                             | Jan. 16, 2013  |
| 17 | US20110163944          | Intuitive, gesture-based communications with physics metaphors                                                                    | Jan. 5, 2010   |
| 18 | U.S. Pat. No. 9,224,364 | Apparatus and method for interacting with handheld carrier hosting media content                                                  | Apr. 8, 2013   |
| 19 | U.S. Pat. No. 8,458,363 | System and method for simplified data transfer                                                                                    | Sep. 30, 2008  |

SUMMARY

Some examples herein relate generally to wireless data communication. For instance, some implementations may relate to wireless sharing of content between nearby devices Further, some examples relate to presenting content stored by one or more server devices at a client device, and interacting with the content at the client device.

In some implementations, a plurality of wireless computing devices are connected as ad-hoc, pop-up wireless network using direct peer-to-peer wireless connections amongst the devices, without using a wireless access point as in conventional technologies. Each device may store a plurality of data in the form of files which collectively amount to the content of the respective device. Each device may take the role of a client or server or both, as described in the implementations disclosed, unless otherwise noted. As a client, the device requests access to the content of each server. As a server, the device manages client access to the content thereof and further prepares a lightweight representation of the content for the client. At the client, the lightweight representation of content is received from one or more of the servers, and is further modified to be presented to a user of the client. According to the various implementations that will be described in greater detail herein, from the presentation of server content at the client, a user can preview and interact with the remote content.

Any of the devices can concurrently act as a client, or a server, or both. Once connected, the client device can retrieve, present, interact and operate on the contents of the servers. According to the particular implementation, the content(s) may be presented in the form of an interactive document, a filesystem volume, and/or an API, different from the original form in which the content(s) are stored at each server. The client directly interacts and operates on the content(s) of the server(s) according to the presentation thereof at the client. The types of interactions the client may perform can vary by presentation but generally include viewing, browsing, downloading, uploading, editing, deleting, tagging, commenting and the like.

BRIEF DESCRIPTION OF THE DRAWINGS

FIG. 1C shows an implementation of presenting aggregated remote content on a vehicle infotainment system or on an airline in-flight entertainment console from various type of computing devices such as smartphone, computer, wearable device, digital camera, and an embedded computing device.

FIG. 1H shows an implementation of content propagation from a user's computer to another's computer via their mobile devices.

FIG. 2C shows an exemplary intermediate data structure of JSON format to translate a content list and content metadata into a file system tree and file system attributes.

FIG. 2D shows examples of identification types that may be used by either the server or client device to identify itself.

FIG. 5A shows a flowchart of remote access request initiated by client device 202.

FIG. 5B shows a flowchart of remote access request initiated by server device 201.

FIG. 5C(1) shows a flowchart of the processing of the remote access request.

FIG. 5C(2) shows a continuation of the flowchart of the processing of the remote access request in FIG. 5C(1).

FIG. 6C shows a sequence diagram of the read operation of the remote content.

FIG. 6G shows a sequence diagram of priority handling for remote content operations of different categories.

DETAILED DESCRIPTION

Figure 1A:
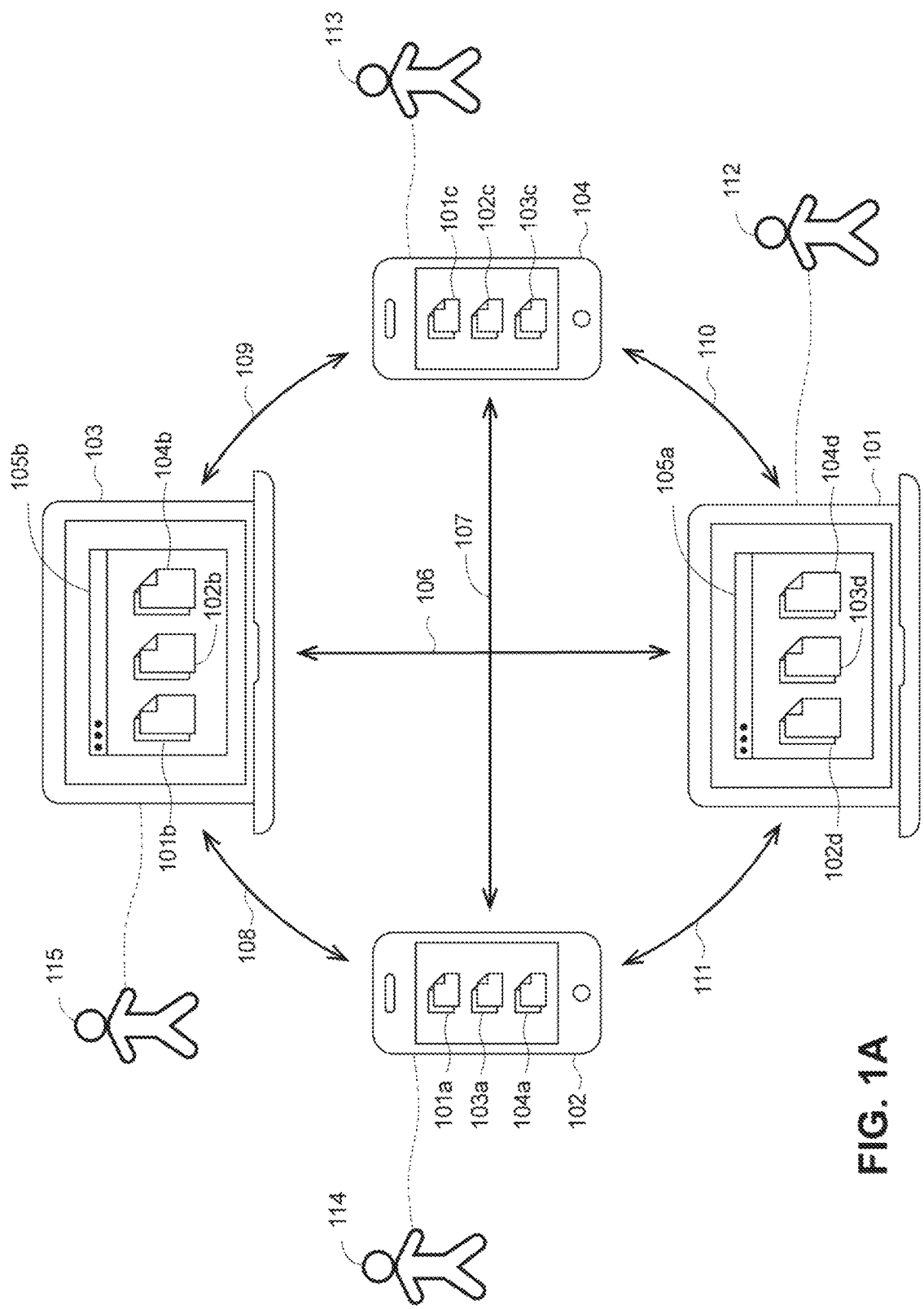
FIG. 1A shows an implementation of retrieval and presentation of remote content among computing devices in proximity using peer-to-peer wireless networking.

A peer-to-peer (P2P) wireless connection, generally referred to as "Wi-Fi Direct" offers the advantages of (a) higher data transfer rate than current Bluetooth technology, comparable to the speed of infrastructure Wi-Fi (i.e., connecting to a Wi-Fi access point) and (b) zero configuration is required for setting up ad-hoc connections. The present inventors have found that Wi-Fi Direct is therefore more suitable than current Bluetooth technologies for transferring rich media files such as photos and videos. In the coming years, it is expected that the next version of Bluetooth (i.e., Bluetooth 5) will be widely adopted and become a viable alternative to Wi-Fi Direct for high-speed short-distance data transfers. In the following description, these and other such high-speed short-distance zero-configuration wireless peer-to-peer connections are generally referred to as peer-to-peer wireless connections. Such connections and ad-hoc networks readily lend themselves to wireless sharing of content as will become evident in the several scenarios and various implementations described below.

In today's connected age, the internet or cloud serves as the source of all information, with users connecting to it to retrieve information, even to guide their locality-based decisions. In many cases, however, a need exists to efficiently, conveniently and directly discover, browse and interact with the information around you without relying on an intermediary such as the world wide web or the cloud. These peer-to-peer wireless connections offer a unique opportunity to build a set of applications for browsing and interacting with nearby devices, such as browsing nearby files, interacting with people nearby over an ad-hoc local pop-up social network, making audio or video calls to people in proximity and engaging in commerce in our vicinity, all without ever needing to connect to the internet or to a Wi-Fi access point. However, architecting these applications requires more innovation than simply porting the existing web architecture to work over a peer-to-peer wireless connection.

Similarly, wireless mobile devices are serving as the new digital cameras, communication devices and personal computers. People take more photos using mobile phones than with dedicated digital cameras and we live in a world of rich media with billions of photos and videos taken and uploaded daily for sharing and backup to social networks, and messaging apps using services like Facebook, Twitter, Instagram, Flickr and cloud backup services like Dropbox, Apple iCloud, Google Drive, Microsoft OneDrive, Box etc. Consequently, transferring content in the form of files, such as photos, videos, documents and the like, between devices and people, is a daily necessity for the purpose of sharing, editing, organizing, storing or workflow.

However, the conventional approaches present challenges when storing and sharing content like digital photos and videos with each other. While billions of photos and videos are captured, shared and uploaded daily using smartphones, typical sharing is generally considered a "push" mechanism (i.e. the sender chooses the content and a target person to send it to). The push approach creates multiple redundant copies of the photos, for example, on each recipient's device and in certain cases, on the cloud, and each of the devices connected to the cloud. In contrast, the beauty of the world wide web is that while the amount of information on the WWW is almost infinite, users can choose to browse, interact and download with only what they need as a "pull" mechanism (i.e., the user chooses the content and when to receive it). It should be appreciated that it is impossible to "push" the entire contents of the Internet to a user device. Similarly, if a user wishes to share a large number of photos with a large number of users nearby, it would be more efficient to let the user browse the aggregated contents and download what the user is interested in. Accordingly, the present inventors recognized that a need exists for a similar innovative breakthrough when sharing photos, videos, documents and files with nearby devices by using the metaphor of "pull", instead of the conventional "push". For example, if a user is interacting with several other users in a social or business situation, it would be quite useful and advantageous to aggregate and create a shared feed of contents from the other nearby users that other users can browse. A specific user can then choose to download only the contents he is interested in, or just browse other users' contents without downloading. Typical "pull" methodology requires a cloud proxy to serve as an intermediary, however some examples herein may include a direct peer-to-peer mesh connection between the nearby devices using a client-server architecture.

The present disclosure relates to environments of client device(s) and server device(s) where content that is stored on one or more server devices is presented at the client device so that the presented content from the servers can be interacted with at the client device. Further, the communications between the client devices and server devices are facilitated by direct wireless connections without relying upon a wireless access point to provide a wireless local area network to the client device(s) and server device(s).

In some examples herein, an electronic device is described as a "client device" or "client" and/or as a "server device" or "server". While particular devices may be referred to as a client or server, in the various implementations described herein, each particular device is generally considered to be capable of acting as a client and server contemporaneously, unless specifically noted otherwise. Each device is a wireless computing device which performs wireless communications with other devices. Examples of such devices include mobile telephones or smartphones with are provided with a processor and storage media to execute a mobile operating system (OS) such as iOS, Android, BB10 and the like as well as hardware for wireless communications. Other examples of devices include laptops, tablets and other general purpose computers or computing systems or devices, which operate by executing a OS as are generally known in the art such as OS X, Windows, Unix, and the like, and include a storage area, processor and hardware for wireless communications. Still further examples of devices include smartwatches, digital cameras, smart TVs and set-top boxes, car infotainment systems, in-flight entertainment systems, embedded computing devices as in the "internet of things", and the like. Each electronic device herein is provided with one or more processors and one or more storage media that are configured or programmed to perform the operations, acts, sequences and methods which will be described in further detail below.

As described herein, direct peer-to-peer wireless connections can include Wi-Fi Direct connections, Apple Wireless Data Link (AWDL) connections, IEEE 802.11 ad hoc mode connections, Bluetooth 5 or higher, and the like. Unless otherwise noted, wireless connections between devices according to the implementations described herein may refer to any of the foregoing methods of connecting devices directly.

Direct peer-to-peer connections are implemented between devices to achieve greater effect in facilitating wireless file transfer than is available with conventional techniques. Using direct peer-to-peer connections is beneficial because many users are not comfortable with uploading content and other information to the cloud since storing content on the internet is fraught with privacy and security issues. In addition, the present inventors recognized that content transfer could be accomplished in a more advantageous manner without needing to transfer content on a nearby computer across the internet and back. The need to provide an alternative way to share content locally is further compounded when considering that storage space and bandwidth generally cost users money and may be limited. Accordingly, some examples may provide content sharing and content transferring which not only avoids incurring storage and bandwidth costs but also removes the necessity of cloud storage, internet access, Wi-Fi access points, and wired connections as in the conventional techniques, while at the same time preserves the speedy, simple and secure user experience.

Conventional direct file transfer technologies, may not offer a means to browse or manipulate remote content without being required to transfer the content first. Further, conventional techniques may not provide a manner to aggregate content from multiple sources, neither do they present a contextual relationship to present multiple content items, such as a hierarchy (for example, a directory tree), chronology (for example, a timeline or newsfeed), association (for example, a smart album) or the like.

The technical benefit and technological improvements of the implementations disclosed herein can be explained with reference to some exemplary scenarios as follow, but in no way are intended to limit the present disclosure. In one scenario, you are walking around a neighborhood and come across a restaurant on a busy street that appears interesting. You might wish to look at its menu before deciding whether to enter the establishment, or you might want to know what other patrons thought of the restaurant. To get this information in a conventional manner, you would be required to log into the internet on your wireless mobile device (i.e., smartphone), search for the restaurant by entering its name and location into a search engine, or access its website or mobile app, to look at the menu. Moreover, you could find a user review site or app such as Yelp, and look at user reviews for the restaurant. Alternatively, a much more natural way of gathering information about the restaurant before crossing the street would be to be able to pull out your mobile device and automatically see the restaurant's name pop up in the "nearby feed" section of the application on your device. Accessing the nearby feed, you see a variety of information and contents there, including the restaurant's menu, popular items, coupons and an interactive living document that shows what other users thought of the restaurant, while also giving you the option/ability to leave a review or like the restaurant. A further advantage would be if you did not have to rely on internet access to be able to access this data—your device is simply picking up on information being made available by other devices within its range. In this scenario, the restaurant's device, as a server, is sharing digital contents for potential patrons, each with a smartphone as nearby clients, to peruse, without needing to create a web site or an app.

In another scenario, suppose that you run into your friend John as you are boarding the plane on your way back from vacationing in Hawaii. John, who has also vacationed in Hawaii, has a phone full of photos, and both of you are eager to share your experiences. However, John has been upgraded to first class, and you have to make your way to the back of the plane. If the airplane provides no internet access, you have no way of interacting with John's photos during the flight using conventional techniques. However, both your phones are actually capable of communicating directly with each other using high-speed peer-to-peer wireless communication technologies such as Wi-Fi Direct. We recognized that it is needed and desirable for each phone to be able to discover and browse the content available on all devices within its range, albeit subject to privacy and access control restrictions. So, in this scenario, John could make his photos available for browsing to nearby consumers in accordance with the implementations described herein, subject to certain restrictions of his choosing, such as only allowing access to people on his phone's contact list or social network, only allowing read access, or only allowing access to certain photos or albums. All devices within range of John's device, including yours, would then be able to browse (pull) and interact with the data they have been granted permission to, without requiring an intermediate external network to provide connectivity, or needing John to send (push) them to you. From the perspective of any passenger on the plane, their smartphone can act as a client for browsing the aggregated content made available by their fellow passengers as servers and vice versa, in the form of an ad-hoc, pop-up wireless network.

In the scenarios described above, using Wi-Fi Direct to form an ad-hoc, pop-up wireless network over direct peer-to-peer wireless connections alone does not address the problem of needing an efficient strategy or mechanism to transfer large amounts content. By way of example, each phone may have tens of gigabytes of photos transferring which will take forever. Therefore, the inventors recognized that beyond creating such a wireless network, it is further desirable to provide a more efficient alternative to needing to "push" content to every individual client device that wants access. The "push" approach creates multiple unnecessary copies of the content(s) and does not give the browsing user the opportunity to choose which specific content he wishes to download (save or store) to his device. Thus, some examples allow efficient, speedy and simple means for browsing and interacting with the contents of John's smartphone from nearby wireless devices. According to various implementations, the contents from John's smartphone can be presented either as (a) an interactive document akin to a webpage, for example as a nearby feed or timeline, at a client device, or (b) in the file system of the client device, or (c) within a third party application at the client device via an API. In these various implementations, the remote content of the servers should be a lightweight representation of the actual content stored at the servers and the actual content should only be transferred upon request from the client.

In some implementations, presenting the nearby content via an interactive document is like creating a web page or a feed of nearby accessible content. A user of the client device can browse the contents and choose which items he wants to open or save. However, the user of the server device sharing the contents does not need to create the interactive document since it can be created on the fly at the client device, from the lightweight representation received from the server, by using a web page template or the like. By way of example only, presenting content as an interactive document or feed can be particularly advantageous in social situations such as a group of people at a birthday party or on a hike. In such circumstances, by providing the client and server software architecture at each persons' device via an application or built-in function of the device's operating system, each person can browse the photos taken by their friends' devices directly from their own individual device without having to rely on a wireless access point. Further, presenting content as an interactive document or feed can be particularly advantageous in a classroom where students can browse and download reading materials on their devices as shared from the professor's device, without requiring the professor to upload them to a website. Similarly, in a meeting or at a conference, parties can exchange business cards and documents without needing internet access or waiting for the content owner to send them by email.

In some implementations, presenting the nearby content via the filesystem of a client device offers particular advantages. Users already know how to use the file manager interface of their device, for example the Finder in case of OSX or File Explorer in case of Windows. The file manager allows users to browse, open, rename, move, copy, tag and organize photos in a folder. For example, it is very convenient and handy if all the photos, videos and documents i.e. the server content, are made accessible directly via the Finder or other OS interface of the client, simply by placing a first electronic device having the content stored thereon in close enough physical proximity to be able to directly and wirelessly communicate with a second electronic device that acts as a client. For example, Wi-Fi Direct typically has a range of approximately 30 meters or 100 feet. Users already know what to do with the files, as they know the typical gestures of drag and drop, select, double-click to open, right click, etc. of the operating system of their device. However, it would be a time consuming file transfer exercise to copy the entire contents of the server, such as the entire photo and video library of the first electronic device to the second electronic device, and those of skill in the art would recognize time and processing restraints such a transfer poses. Typically, users have large volumes of content on their smartphones, in the order of thousands of photos/videos and tens of Gigabytes of data, so even over a high speed peer-to-peer wireless connection, transferring the entire contents of a server device would take a long time. Accordingly, the present inventors have proposed to provide a lightweight representation of server content which is presented at the client in a manner, which according to the particulars of the implementation, that appears as if the fileserver content are already existing at the client without actually needing to transfer the content beforehand. In this manner, the user of the client device is able to browse the entire contents of the servers and choose to download only the selected content, thus providing the user the ability to browse the entire aggregated content of the servers but also to select desired content on demand wirelessly.

In some implementations, presenting the nearby content via an API hook would allow any third-party application to advantageously browse and interact with contents servers wirelessly. The third-party application may be customized to access the API hook, or use plug-ins that interact with the API hook, as will be appreciated and understood by those of skill in the art. For example, a user can edit a photo in the first electronic device directly from within a photo editing application executing on the second electronic device without needing to explicitly send the file to the second electronic device and/or send back the edited photo to the first electronic device.

By connecting devices directly to each other as an ad-hoc, pop-up wireless network, the client and server device architecture is designed to support presentations of content according to the implementations described herein, and which may include one or more of the following mechanisms and technological advantages:

a. Efficient discovery of nearby devices, identify the fastest way of connecting to a nearby device, and set up the connection, thus creating an ad-hoc peer-to-peer network of devices using point-to-point wireless connections, without any manual configuration by a user;

b. An efficient, light-weight content discovery, aggregation and browsing client and server architecture that allows client device to browse content stored on one or more servers in-place, without having to create a local copy of the content at the client. This is advantageous because a client can have multiple neighboring server devices who are making content available, as well as multiple other client devices, so creating local copies would be prohibitively slow due to bandwidth and cost constraints, in addition to rapidly exhausting the client device's storage space. The goal is to provide the look-and-feel, and high performance of local data access to the client without incurring the expense of creating a local copy of the data on the client;

c. Creation of a mechanism by which a device can choose to function as a client or as a server or both simultaneously. In case a device chooses to be a server, a mechanism by which the user/owner of the device can specify the scope of the data on the device that should be made available for discovery and access by other neighboring devices and to who;

d. Creating access control mechanisms that allow the owner or producer of data to maintain the desired levels of privacy of the data hosted on a server device when it is accessed by multiple client devices. This access control mechanism determines which client device can access a given piece of data, and the type of access privilege granted (read only, read and write, allow copy, etc.);

e. Creating multiple intuitive user interfaces by which a client can interact with the data hosted on other server devices in its vicinity. Such user interfaces might range from (i) a file manager to (ii) web pages to (iii) integrating over an API hook with existing custom applications for each file type, such as the ability to browse all photos on neighboring devices using a photos software application;

f. Creating mechanisms by which data can be transferred directly from device to device over the wireless communication medium, without requiring an intermediary or proxy or connectivity to an external network like the internet;

g. Creating and implementing protocols by which a server advertises itself on the short range wireless network and interfaces connectivity and file operations with nearby client devices;

h. Maintaining the integrity of the data hosted by a server device, which could be potentially accessed and modified by multiple clients concurrently; and/or i. Discovering when devices move out of range, updating the available content available over the short range wireless network accordingly, and notifying consumers of the updated data as needed.

In some implementations, a single user owns multiple devices, such as a mobile phone, a tablet, and a laptop, which each execute client and server software as will be described in greater detail below. In other implementations, multiple devices are operated by different users rather than a single user. For example, a user may take a photograph on a first electronic device, such as a phone, then place his phone next to a second electronic device, such as a laptop computing device, creating an instant short range wireless network. A federated view of content across all devices can be presented to the user from any one of the devices. Further, the user can access, view or modify the same content from any of his devices. The user may use a photo editing application on the second electronic device to edit the photo which remains in-place on the first electronic device. If the first electronic device is running low on storage, the user can simply drag and drop the file directly from the first electronic device to the second electronic device using the an OS interface or the like, and delete the copy of the photo on the first electronic device, releasing the associated storage space thereon. In contrast, with implementations where multiple users are present, each of the phone, laptop, tablet, etc. may be operated by a different user rather than a single user as described above.

In some implementations, a mirror reflection of the photo and video content file and/or directory structure is presented on the client. As the user interacts with the presented content by choosing folders and selecting photos, the sub-directory tree and file content may be downloaded in real-time on demand in the background. If the user changes folders, the file list and file metadata of the currently selected folder begins to download. If the user selects a file such as a video, the video file begins to stream from the server electronic device. At all times, the content resides on the server electronic device, while from the second electronic device it appears that a local copy exists on the second electronic device. Any edits or changes made to the content from the second electronic device may be propagated to and reflected on the photo album on the first electronic device. Similarly, photos can be deleted from first electronic device by the second electronic device, such as by dragging the photos to the trash icon on the desktop of the second electronic device.

In some implementations, the foregoing features are realized by running server software on the first electronic device and client software on the second electronic device, which is responsible for managing access privileges, managing connections and providing the interactive presentation of the contents. The first electronic device stores photo data in storage containers and each piece of content needs to be mapped to the filesystem interface of the second electronic device as an alias. File operations made on this alias copy of the content may be propagated to the actual file on the first electronic device. Alternatively, in other implementations, the content can be mapped to an interactive document or an API accessible by a third party application.

The short range wireless network approach described in the implementations described herein has several advantages over the state of the art. Today, if a user wants to access content across devices, they have two options: (1) store the content on a cloud, which can be accessed by both devices by attaching to an external network connection, or (2) physically transfer a copy of the content from one device to another. The first approach suffers from the drawback of exposing the data to security breaches and potential loss of privacy. Also, the data is only accessible when access to the internet is available, unless another redundant copy is saved on each device. This approach results in wastage of storage space, which is often is a limiting factor in mobile devices, and is inefficient when there are multiple servers and multiple clients. The short range wireless network approach described in the implementations herein avoids all these drawbacks. Data can be accessed in-place in real-time by a remote device, which is something no current approach does. In case the remote device requests a copy of the data, it is transferred directly from server device to client device using P2P wireless technologies. At no point during the creation, operation or reconfiguration of a short range wireless network is a connection to an external network required. All operations are performed using device-to-device wireless communication.

In addition, the short range wireless network allows for discovery of content in proximity to a device, something that no existing approach provides today. That is, it enables a user to browse the contents published by all neighboring devices, using a variety of supported user interfaces including a traditional file manager interface, an interactive document similar to a webpage or the familiar newsfeed used in social networks, or through a custom application that uses an API surfaced by the short range wireless network implementation.

The short range wireless network approach provides an intuitive, natural way for people to interact with their surroundings and exchange information with those around them, restoring a more local, social flavor to societal interactions. It is the means to be able to directly, efficiently and securely present remote content of nearby devices connected over a peer-to-peer wireless mesh network that preserves the contextual relationship, or even constructs a new one, between the content items and optionally aggregates them from multiple source devices. A lightweight representation of the remote content is provided and/or displayed at the client in order to visualize its context while minimizing actual file transfer until it is actually requested at the client. Such an innovative mechanism has the potential to create a local popup social network, for example, a newsfeed aggregated from the shared photos of friends sitting in proximity, showing the latest 25 photos taken by the group.

According to various implementations, a computer system and methods for creating a proximity-based ad-hoc network of devices inter-communicating using wireless communication media create an impromptu digital library of data aggregated from one or more of the devices participating in the network, which can be accessed by any of the devices participating in the network. This cooperating network comprised of devices in vicinity of each other may be referred to as a short range wireless network in some examples herein.

The devices offering up data for discovery in the short range wireless network are called "servers". The devices accessing and interacting with the data in the short range wireless network are called "clients". The same device can function as client, or server, or both. A short range wireless network could be comprised of any device that is capable of wireless communication. This includes laptops, phones, desktops, digital cameras, embedded devices, wearable devices such as smart watches and fitness trackers, IoT sensors, smart TV and set top boxes, car infotainment systems, in-flight entertainment systems and more. These devices could be carried by a person or animal, or be integrated into vehicles such as automobiles, planes and trains, or be a part of the environment such as traffic cameras, parking meters, home and industrial appliances etc.

Each client device has its own view of the short range wireless network, based on which server devices are within range of this client. The short range wireless network forms automatically, based on the access privileges the client has been granted by various servers within its wireless range. Clients have the ability to request access authorization to any server(s) of their choosing, or to ask for higher levels of privilege to any data that a server within its short range wireless network is hosting. As the client's authorization level changes, its short range wireless network configuration and presented aggregated data changes correspondingly.

The client has the ability to discover, view and interact with the aggregate data presented by all the servers in its short range wireless network, within its access rights and permissions, without actually moving the data to its local storage. The client can present this data library to the user through different user interfaces. These user interfaces include, but are not limited to, integration with their device's file manager such as the MacOS Finder, so that the contents of the short range wireless network appear as folders within the file manager, which the user can browse as a directory structure and interact with the presented data using familiar gestures such as double-click to open, drag to move, right click etc. Another user interface could be through integration with existing specialized applications for dealing with specific data types, such as a photo browser or editor application like Mac Photos, a contents browser like iTunes, Adobe Photoshop etc. A third user interface could be in the form of an interactive document, similar to a web page or the "news feed" or "timeline" in social networks. In this format, the client can interact with the data through actions like adding comments to a file, "liking" content etc. Whenever new content is made available, or existing shared content has been modified in some way, or any user has interacted with existing shared content such as commenting on it, the "news feed" is updated to reflect the new activity, and the clients could be optionally notified of such new activity.

The client interacts with the digital library created within its short range wireless network without transferring the hosted content to its local device. The content remains on the server, with only the necessary information required to satisfy the client's current request being transferred directly over the wireless communication link established between the client and server devices. For example, if the client is merely browsing all the files in the library, only the metadata corresponding to the current directory structure being viewed by the client is transferred from the server to the client. If a client desires to open a video file using a video player, the video is streamed on demand to the client in small chunks according to which portion is being displayed in the video player. If the client navigates away from the video while it is playing mid-stream, the transfer of the rest of the video stream is paused until the data for the user's latest request has been transferred. This approach has several advantages. First, the server always maintains its "single source of truth", namely, the most up-to-date copy of the file. Second, the server maintains control of its digital content, satisfying important privacy and security requirements for the owner of the data. The data can be optionally encrypted when transmitting it across the wireless link between the client and server, to increase security. Third, the client gets the look-and-feel and high performance of all this data being available locally, but the data is not consuming the storage space on the client side, because it is being streamed from the server on-demand. There are several other optimizations, described further in this disclosure, aimed at improving the real-time performance with which a client can interact with the digital library in its short range wireless network, such as prioritizing which data is retrieved at what point in time to provide the most optimal user experience.

A device acting as a server provides a mechanism to choose data from various data storage repositories it hosts or has access to, to make part of the digital library of any short range wireless network that it participates in. The server also provides mechanisms to convert the data it is making available to the short range wireless network into an intermediate data format that can be transferred over to clients and interpreted by the client. The client can then make this data available to its user through any of the different user interface mechanisms described in the previous paragraphs.

A server has the ability to specify what access privileges to provide for a specific piece of data. Examples of such access privileges include, but are not limited to, read-only, read and write, make copies, execute, etc. The same piece of data can have different access privileges for different users. That is, for a given piece of data, the server has the ability to determine and set which user or set of users have access to which data, and what access privileges each of these users have for that piece of data. These access privileges can be set manually by the server or server user in advance or upon request from the client, or through the application of user-defined rules.

Servers have the ability to enforce access control to the data they are serving up. Such access control may be enforced through explicit user input, or by automatically enforcing access control based on preset criteria. Examples of such preset criteria include making a certain set of data available only to clients who are in a whitelist maintained by the server device. This whitelist could be created manually, or using certain user-defined rules such as including all mobile devices whose corresponding phone number or email address is in the address book of the server device, or are in social graph of the user or in the company directory. The server can also choose to deny access manually or through preset criteria such as denying access to any device in a blacklist maintained by the server. This blacklist could also be created manually or through user-defined rules. The whitelists and blacklists can also be set based on criteria such as location and duration. For example, a server may grant access to a set of data to all users within wireless range of its device from 2 p.m. to 3 p.m. on Jan. 1, 2017.

The following are some additional scenarios in which various implementations are advantageous over conventional file transfer technologies.

Imagine a family reunion in the great outdoors. The family flies in from various locations across the planet to unite together or a special occasion. Over the next few days, they indulge in camping, go on hikes, have special moments of unity and togetherness, adventure and daring. They capture these in photographs and videos they take of each other and their activities, to preserve these memories for a lifetime. When the vacation ends, each member of the family has photos on his/her device. Everyone in the family has a different set of photos they enjoy. Parents want all photos of their children, captured by anyone in the group. Children want photos of their favorite cousins and activities, but really aren't interested in the photos of the adults. On the evening before departure, the family gathers together and forms an instant short range wireless network with their devices, even though the resort is in a remote location with no access to the internet or cellular coverage. Each person browses all the photos in the short range wireless network, likes and comments on others' photos, and chooses the ones he wants to keep, downloading them to his own device to create local copies. When the family departs to their different lives the next day, they each carry with them the memories they cherish the most, to share with their friends when they get back.

Some examples herein may create a high speed content sharing network between nearby devices. It is not practical or desirable to create a local copy of the remote content on every nearby device because doing that would require copious amounts of data transfer which will exceed the available time, network bandwidth and storage capacity of the client device. Nevertheless, implementations herein create an illusion that the remote content of the nearby device is actually available to the accessing client device for viewing and interacting with it. To achieve this outcome, some implementations may employ one or more of the techniques outlined below.

The application running on the client and server discovers nearby devices and establishes the fastest available direct connection between them. When displaying the remote content of nearby devices, the client initially fetches only the content metadata and content list from the server. Then it fetches the content file icons. By doing so, the client is able to present a lightweight representation of the content i.e. the list of available content to its user without needing to fetch the actual content files. When the user selects a content item, the client application requests it from the server, on demand, in real-time. This way, the network bandwidth can be optimized for the content last requested by the user. If the user switches to a different view, fetching the content list of that view is prioritized. If a file item has been previously downloaded and is available in the cache, the cached copy is used as long as the content file has not been modified since it was last cached. By doing so, the application is able to create the illusion of a local copy of the content and deliver a near real-time user experience.

Imagine walking into a museum. In each exhibit room, the museum hosts a short range wireless network server that makes detailed content available about the exhibits in that room. You could watch a video of the artist describing the significance of the piece, or leave a comment about the exhibits in the room in the interactive document hosted by the museum's short range wireless network server. As you walk into the next exhibit room on a different floor, the first short range wireless network server drops out of range, and the new one for this exhibit room comes into range, presenting a different set of content corresponding to the exhibits in this room. As you walk out of the museum, you have had a much richer experience, but you carry no printed material to discard, your phone has not used up any extra storage, and the museum did not have to set up a website or distribute an app for you to download. Same scenario applies when you visit the zoo or a Broadway show. short range wireless network serves as a digital content distribution platform by enabling all viewers to browse and interact with content available at that event location. The digital content can be distributed easily and quickly without too many steps.

Imagine you are in an industry conference, having paid a hefty attendee fee for the exclusive privilege of being able to attend this conference in-person, and have access to the thought leaders in your industry. You attend a speaker session on a topic of interest to you by the leading expert, from 2-3 p.m. The speaker turns his mobile phone into a short range wireless network server, hosting the presentation content and additional reading materials, making them available to anyone in the room from 2-3 p.m. This allows you to browse through the presentation at your own pace, download a copy to your device, and make notes on it during the session. This is a privilege and convenience not available to people who could not attend the session in person.

Imagine you are a photographer on a field trip taking hundreds of photos and videos. While on the field trip, you can use your tablet, phone or computer to browse, edit or delete photos on your digital camera without needing to transfer them. Once you return to your home or office, you place the digital camera on your table next to your computer with the large display and storage space. The short range wireless network technology described above enables the photographer to browse, edit and save his camera photos and videos from his computer.

Imagine you have some photos on your phone or computer that you wish to carry on your tablet computing device, you can simply mount both the phone and the tablet on your computer, and drag and drop to copy the desired photos from the phone or computer to your tablet.

Imagine you are in a transatlantic flight and you have time to kill, perhaps even make a few new friends or share some stories. Using a short range wireless network, anyone can share his photos from his smartphone to nearby passengers through a "nearby feed" of digital photos/videos and allow others to participate in liking, tagging, commenting or copying them.

Imagine you are next to or walk into a shop and you can browse the product list, specials, detailed product information and coupons or commercial offerings, without requiring the shop staff to upload anything to the internet. Just take out your phone and check the nearby feed for contents and commercial offerings that the shop may be sharing with potential customers nearby.

Imagine you are in classroom in a remote part of India and the students are able to collaboratively edit a document together using their devices without the need to connect to a Wi-Fi access point.

Imagine you can video call your friend/colleague sitting in another cabin of the passenger airplane without needing to connect to the airplane Wi-Fi access point or internet.

Imagine you are a mother driving your young twins. You simply place your smartphone inside the car and the twins riding in the back seat of the car are able to browse, select and watch two different animation movies from your smartphone on the displays mounted on the backside of the front seats, without you needing to choose and stream a specific video.

Imagine you are sitting in a meeting with colleagues or clients and each of them can browse and markup the presentation stored in your smartphone or computer using their devices without you needing to send over the presentation document to them. They can also download the presentation to their device to review and peruse after the meeting.

These are merely a few examples associated with utilizing the implementations herein in real-life scenarios. However, the implementations disclosed herein are in no way intended to be limited to these scenarios.

FIG. 1A shows an implementation of retrieval and presentation of remote content among computing devices in proximity using peer-to-peer wireless networking. Each computer 101, 103 and each mobile device 102, 104 is interconnected via its wireless network interface to create a single mesh network. In this example, the device 101 is bi-directionally connected to devices 102, 103, and 104 over wireless connections 111, 106, 110 respectively. Similarly, device 102 is bi-directionally connected to devices 103 and 104 over wireless connections 108, and 107 respectively. Each of the devices 103, 104 are bi-directionally connected in a similar manner as devices 101 and 102. Each device may execute a client application to interact with remote content on the other devices each executing a server application. Any device running the client application is referred to herein as a "client", while any device running the server application is referred to herein as a "server". A single device may act as a client, a server, or both at the same time. Content remotely accessed by the client refers to both the content stored on the server devices individually and collectively and accessible via the client application.

In FIG. 1A, a client application executed by mobile device 102, can individually or collectively interact with the remote content 101a stored on the server device 101, the remote content 103a stored on the server device 103, and the remote content 104a stored on the server device 104. At the same time, a client application executed by the computer 103 which also executes application 105b individually or collectively interacts with the remote content from the server devices 101, 102, and 104 presented respectively as 101b, 102b, and 104b. In various implementations, application 105b may be the client application itself or a $3^{rd}$ party application connected to the client application. Mobile device 104 which also executes a client application, individually or collectively interacts with the remote content from the server devices 101, 102, and 104 presented respectively as 101c, 102c, and 104c. The computer 101 also executing application 105a, acting as client and part of the wireless mesh network, individually or collectively interacts with the remote content from the server devices 102, 103, and 104 presented respectively as 102d, 103d, and 104d. Thus, a single client device can interact with remote content from one or more servers, and one server can simultaneously serve multiple clients. As a practical scenario, at a group event, each user using his phone (acting as a client) can access photos aggregated from the phones of multiple event participants (acting as servers) and the multiple event participants need not be actively involved in transferring their photos to the client user.

Figure 1B:
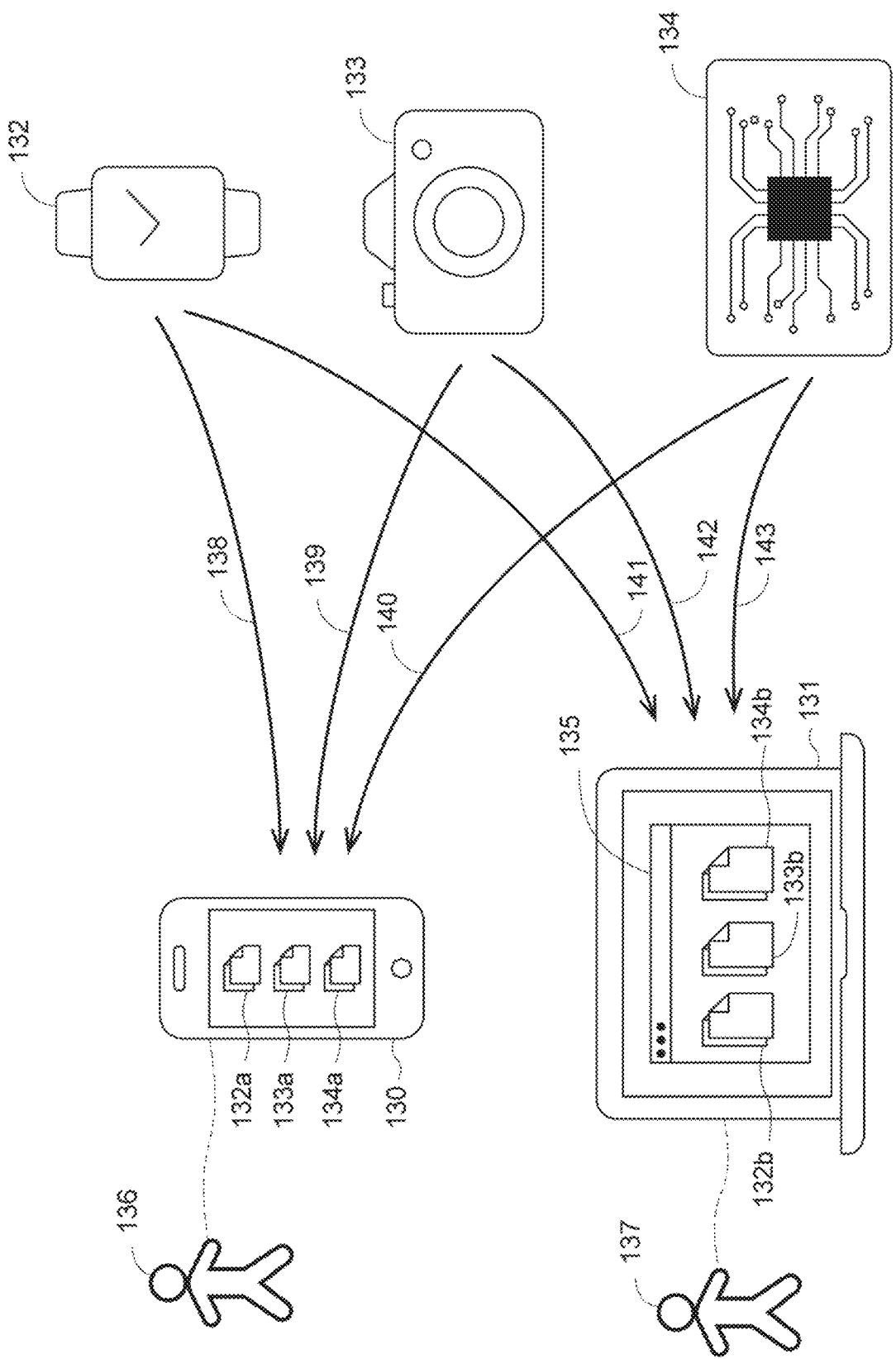
FIG. 1B shows an implementation of presenting aggregated remote content on a mobile device or computer from various types of computing devices such as a wearable device for example a smart watch, a digital camera and an embedded computing device.

FIG. 1B shows an implementation of presenting aggregated remote contents on a mobile device or computer from various types of computing devices such as a wearable device like a smart watch, a digital camera and an embedded computing device. In FIG. 1B, a wearable device 132, a digital camera 133, and an embedded computing device 134, each acting as servers, are connected with a mobile device 130 and a computer 131 as clients. The computer 131 is connected to the server devices 132, 133, 134 over wireless connections 141, 142, 143, and is able to interact with the respective contents of each server device via a presentation of the contents as files 132b, 133b, and 134b, respectively. Similarly, the client device 130 is able to interact with the respective contents of each of the server devices 132, 133, and 134 via a presentation of the contents as files 132a, 133a, and 134a, respectively. In some other implementations, it is possible for one or more of the devices 132, 133, 134 to execute a client application to act as a client device.

FIG. 1C shows an implementation of presenting aggregated remote content on a client device 191, which is may be part of the wireless mesh network of either of FIG. 1A and FIG. 1B, interacting with the remote contents of multiple nearby server devices, such as wearable device 132, digital camera 133, embedded computing device 134, the computer 101 and the mobile device 102. Client device 191 is connected wirelessly to each of the devices 132, 133, 134, 101, and 102 over direct wireless connections 192, 193, 192, 196, and 195 respectively. The client device 191 may be an infotainment system of a vehicle 190 or an in-flight entertainment console of an airplane 197.

Figure 1D:
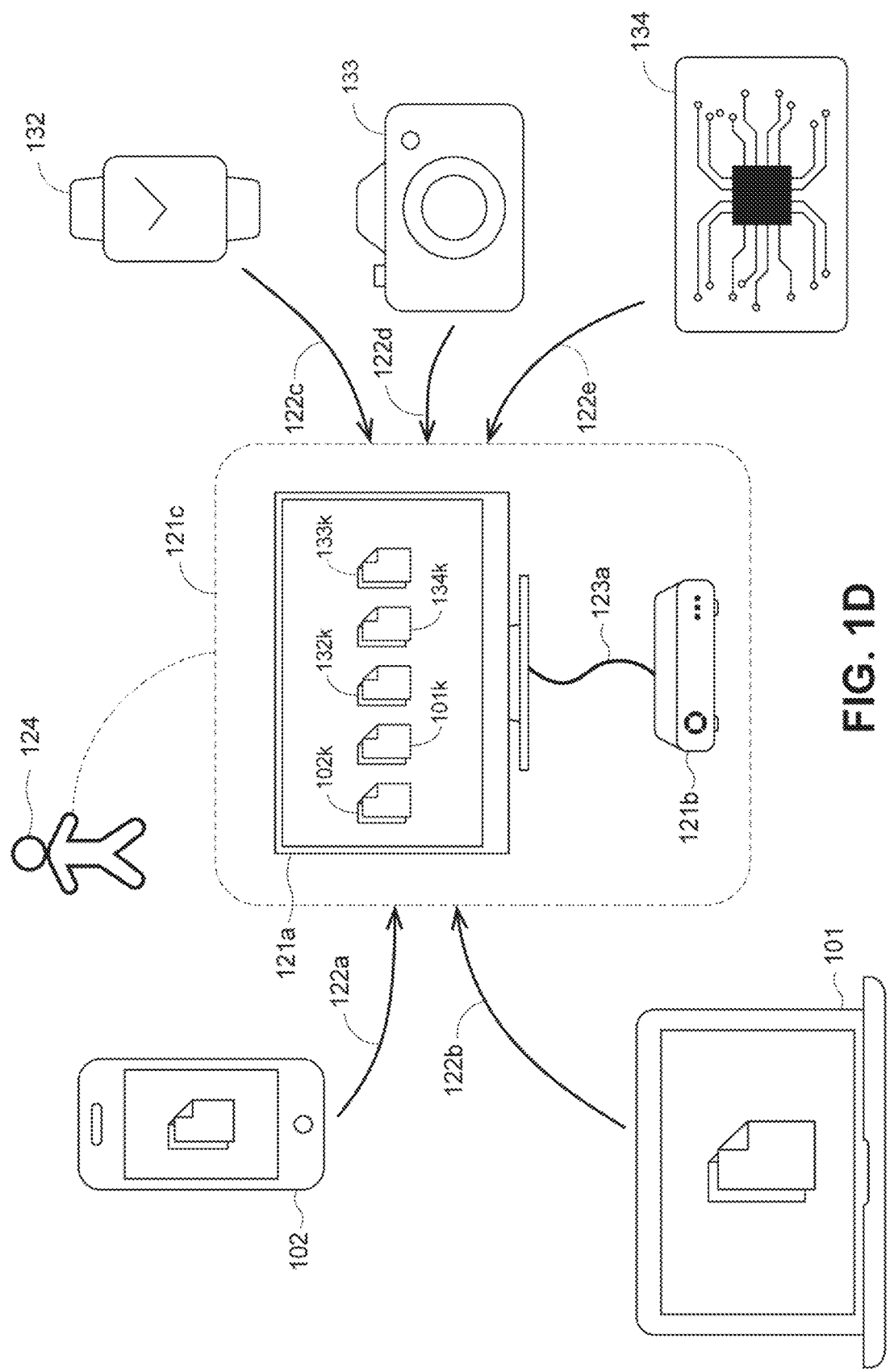
FIG. 1D shows an implementation of presenting aggregated remote content on a screen of a television, monitor, or projector which may or may not be via set-top-box from various type of computing devices such as smartphone, computer, wearable device, digital camera, and an embedded computing device.

FIG. 1D shows an implementation of presenting aggregated remote contents on a screen of a client display device 121a displaying the remote contents 132k, 133k, 134k, 101k and 102k from multiple devices 132, 133, 134, 101, and 102 via wireless connections. In this implementation, the client device 121a may be connected directly to devices 132, 133, 134, 101, and 102, via wireless connections 122c, 122d, 122e, 122b, and 122a. In another implementation, the wireless connections 122c, 122d, 122e, 122b, and 122a may be connected to a set-top-box unit 121b which presents the remote content by a connection 123a on the display device 121a such as a television, monitor, projector or any device capable of displaying digital content and also has its own controller such as a remote control, front panel buttons, or the like. The connection 123a may be a wired or wireless connection that connects the set-top-box 121b unit to the display device 121a. A user 124 can interact with the remote content from the devices 132, 133, 134, 101, and 102 via its remote representation 132k, 133k, 134k, 101 k and 102k thereof using the controller of the screen 121a or the set-top-box unit 121b.

Figure 1E:
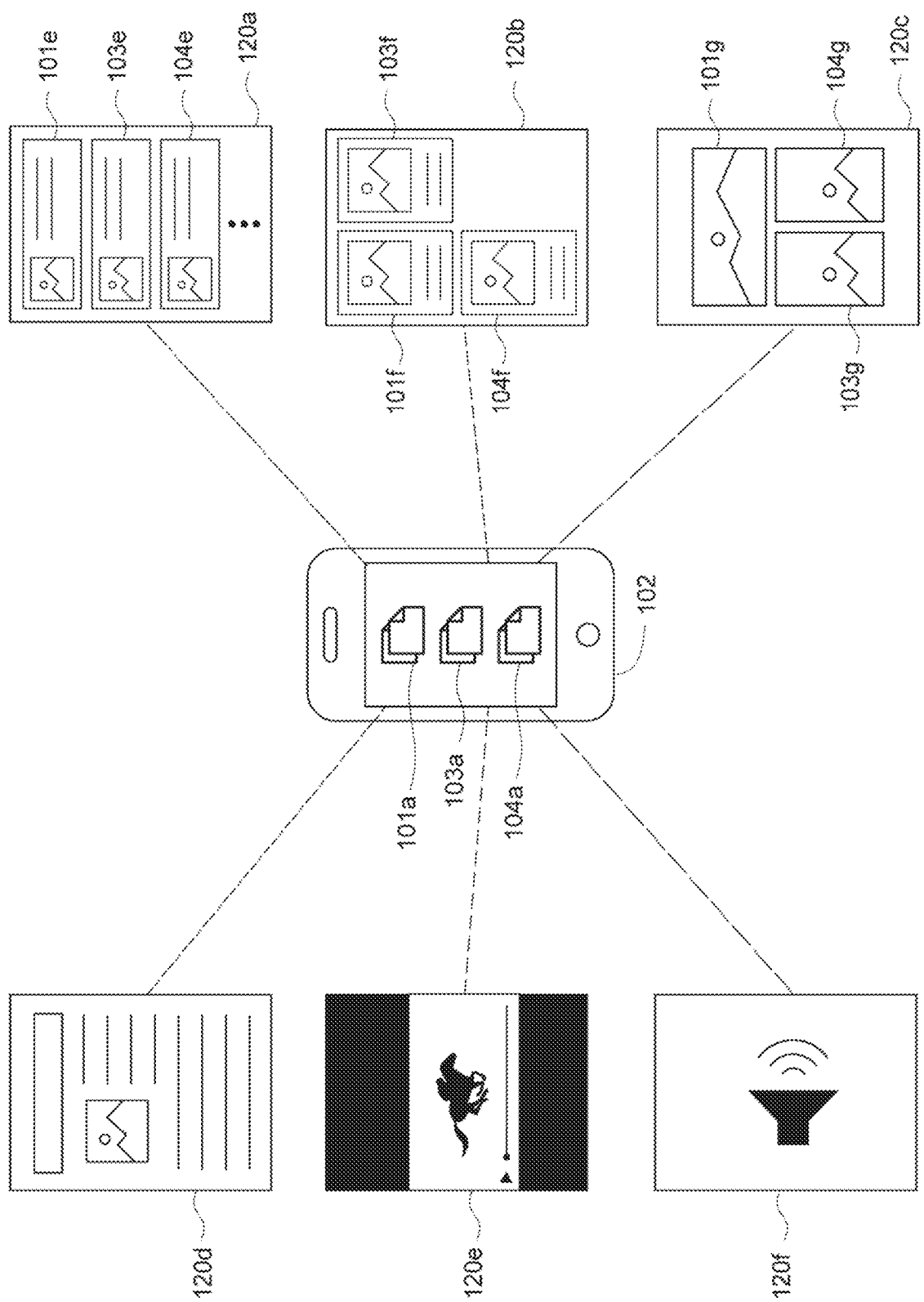
FIG. 1E shows an implementation of aggregated remote content presented in various layout styles of interactive documents, such as a web page, list, timeline, newsfeed, grid and multimedia.

FIG. 1E shows various implementations of presenting aggregated remote content. In a first presentation 120a, the remote contents 101a, 103a, and 104a are displayed collectively in a list layout with small thumbnails or file icons 101e, 103e, and 104e along with content metadata or the like. In another presentation 120b, the remote contents are displayed in a grid layout with content items 101a, 103a, and 104a of the server 102 presented as contents 101f, 103f, and 104f respectively. In another presentation 120d, the contents 101a, 103a, and 104a of the server 102 may be combined and displayed inside a rendered page based on a predefined design template, such as a web page, a page formatted by a markup language, slide, document, multimedia document, applet, album, folder, newsfeed, timeline, map, mobile or desktop application layout, or any other kind of custom multimedia presentation layout or user interface, or any combination thereof. Further, the combined content of 101a, 103a, and 104a may be presented in a multimedia form such as a collage presentation 120c or a video presentation 120e with or without metadata, subtitles or audio. In a case of the content 101a, 103a, and 104a being aggregated audio content, of the presentation may be an audio output or playlist 120f. The aggregated content may be grouped by time, places, people, activities or its subject, and also searchable based on keywords, tags, time, place, people, activities, other content or metadata as criteria for grouping content.

Figure 1F:
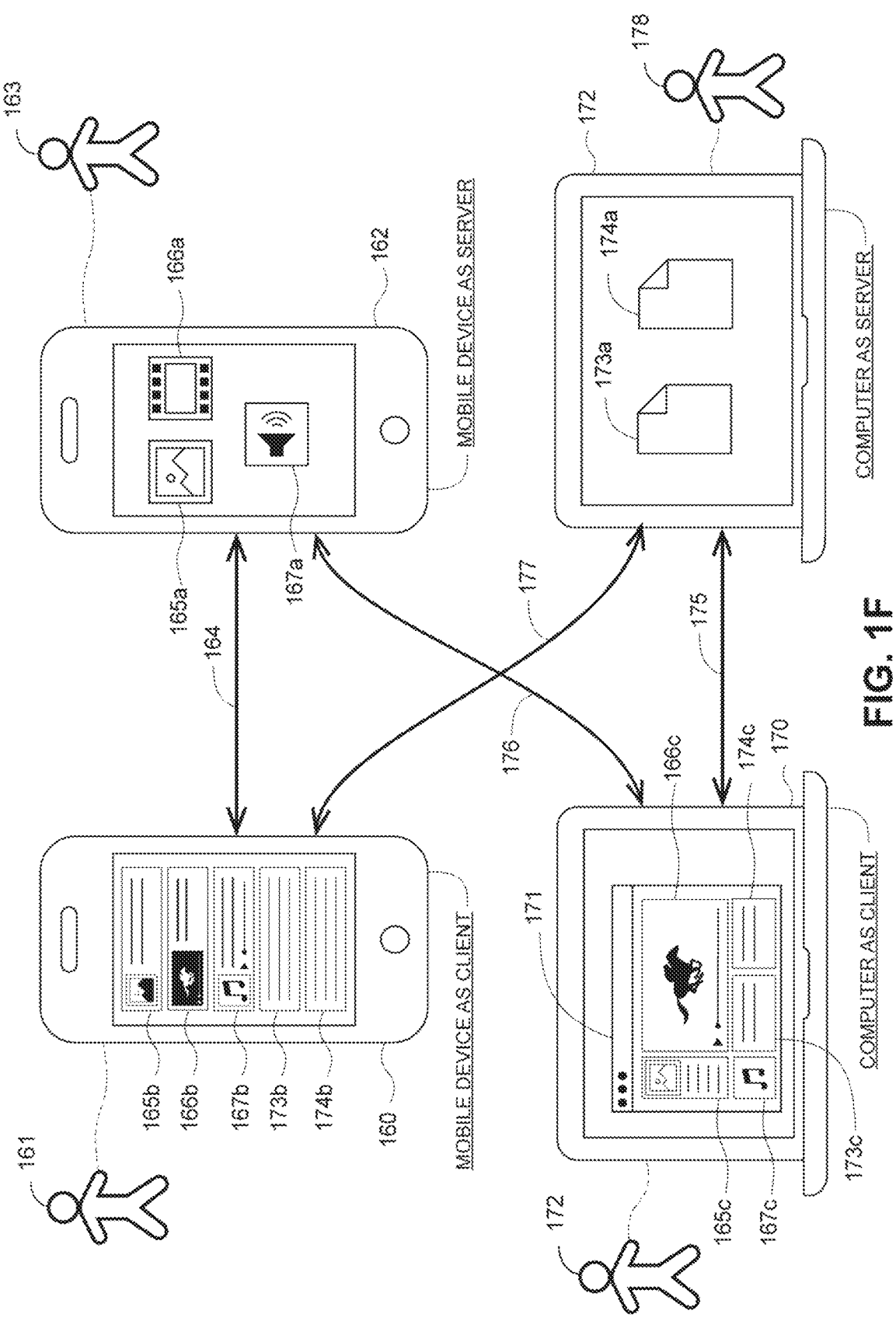
FIG. 1F shows details of the content aggregation implementations in cases of (a) a mobile device as a client with another mobile device as a server, (b) a mobile device as a client with a computer as a server, (c) a computer as a client and a mobile device as a server, and (d) a computer as a client with another computer as a server.

FIG. 1F shows details of the content aggregation implementations in cases of (i) a mobile device as a client with another mobile device as a server, (ii) a mobile device as a client with a computer as a server, (iii) a computer as a client and a mobile device as a server, and (iv) a computer as a client with another computer as a server. As shown in FIG. 1F, client devices 160 and 170 access content stored remotely in content storage containers of server devices 162 and 172. A "content storage container" 211 is shown in further detail with respect to the server device on which it resides, and is a type of data storage where access to the data is limited via a content storage interface 210. A storage container can be a database and the like which is accessible via an API as the storage container interface 210, or it can be a photo library of a mobile device which is accessible via a framework API as the storage container interface, or even a file system volume which is accessible via file system API as the storage container interface. For example, one way to access photo content of an electronic device implemented as a server may use an API, such as a photos framework API.

Returning to FIG. 1F, the client device 160 is connected to the server device 162 via a wireless connection 164 and also to the server device 172 via a wireless connection 177. The contents 165a, 166a, 167a of server device 162 may be aggregated together with the contents 173a and 174a of the server 172 and presented on the client application running on device 160 as a presentation of aggregated contents 165b, 166b, 167b, 173b, and 174b. Similarly, the contents 165a, 166a, 167a of the server device 162 may be aggregated together with the contents 173a and 174a of the server 172 and presented differently in an application 171 running on the client device 170 as a presentation of aggregated contents 165c, 166c, 167c, 173c, and 174c respectively. The application 171 may be the client application 203, a $3^{rd}$ party application 206 or a custom application 207 as shown in FIG. 2A and explained later.

Figure 1G:
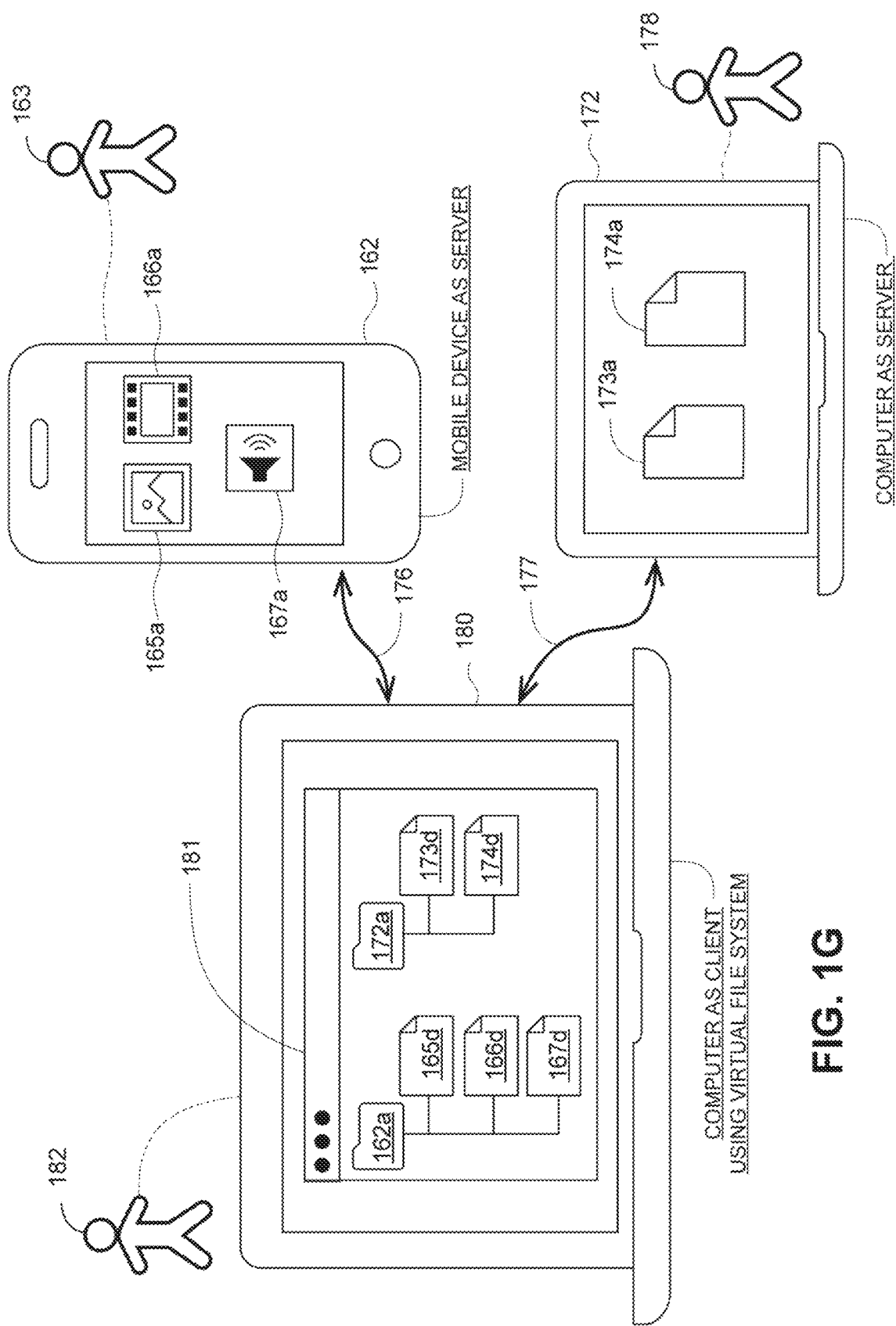
FIG. 1G shows implementation of content aggregation using file system abstraction on a computer from a mobile device and/or another computer as server(s).

FIG. 1G shows a client device 180 accessing contents stored remotely by a content storage container on server devices 162 and 172 and presenting the aggregated content as a file system volume to a $3^{rd}$ party application 181. The $3^{rd}$ party application 181 is equivalent to the $3^{rd}$ party application 206 shown in FIG. 2A. In implementations where the presentation of remote contents is a file system volume, the client application working together with the server application, will map each separate piece of content in the server devices 162 and 172 as a file representation on the client device 180. At the client device 180, a photo 165a is mapped to a photo file 165d, a video 166a is mapped to a video file 166d, audio content 167a is mapped to an audio file 167d, files 173a and 174a are mapped to a file 173d and a file 174d according to file types thereof. The client application together with the server application will also map file system operations applicable to each of the separate mapped content. For example, a file delete operation on the photo file 165d by the client application 181 is performed on the server device 162 as a remove operation on the photo 165a. One example of a $3^{rd}$ party application 181 is a built-in file manager application provided by the OS of the client device 180. Examples of built-in file manager applications are Finder on OS X operating system, Windows Explorer in Microsoft Windows operating system, and the like. Further, in the implementation shown in FIG. 1G, a user 182 of the client device 180, a user 163 of server device 162, and a user 178 of server device 172 may or may not be the same person. In further implementations, the system may be applied in a fully automated manner in which the client device 180, the server devices 162 and/or 172 operate without user input or involvement.

FIG. 1H shows yet another implementation where a user 154 copies content 156a from his computer 150 to a mobile device 151 in step 157 creating a copy 156b. The copy 156b is then transferred in step 158 to a mobile device 152 of another user 155 creating a second copy 156c of the content. The user 155 can remotely access the second copy of the content 156c via its remote representation 156d on a computer 153 in step 159. The copying step 157 is executed by having the server application running on the mobile device 151 and the client application running on the computer 150, where the interaction with the client application may be directly within the client application, via file system volume representation of the client application, or via an API exposed by the client application. The remote access in step 159 is performed by having the server application executed on the mobile device 152 and the client application executed on the computer 153, where the interaction with the client application may be directly within the client application, via file system volume representation of the client application, or via an API exposed by the client application.

Figure 2A:
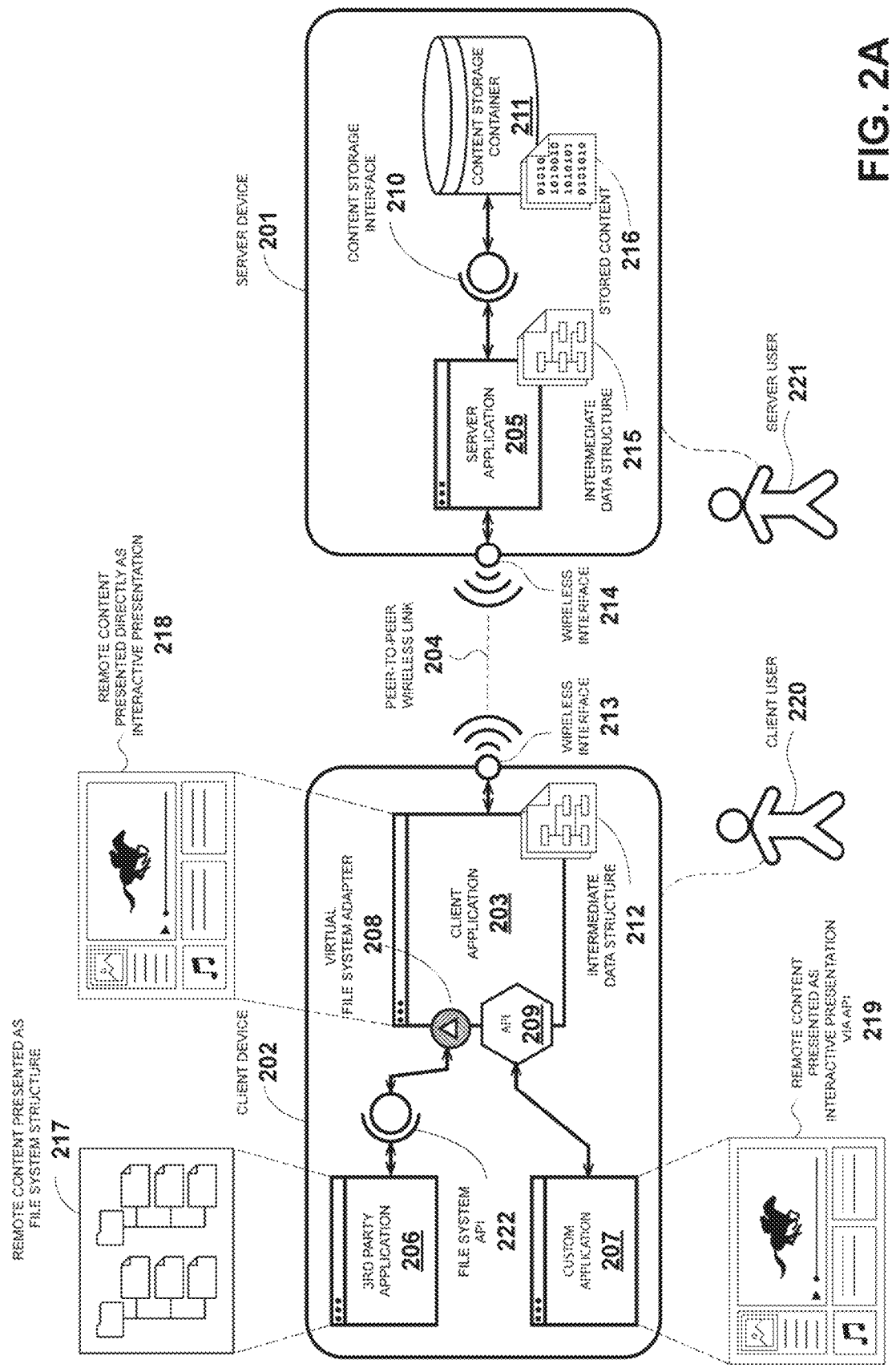
FIG. 2A shows a high level system architecture schematic of an exemplary implementation for browsing and interacting with remote content nearby.

FIG. 2A shows a high level overview system architecture of an exemplary implementation of a computer system for browsing and interacting with remote content. The system consists of a client application 203 running on a client device 202 and a server application 205 running on a server device 201. While two devices 201 and 202 are shown in FIG. 2A, it should be understood that a plurality of devices may be connected as a short range wireless network with one or more devices each executing a client application 203 and a server application 205.

The server application 205 is responsible for extracting content 216 stored on the content storage container 211 via its storage interface 210. The server application is also responsible for converting the content 216 in the content storage container 211 into an intermediate data structure 215 to be transmitted to the client application 203 in the form of network data packets over a peer-to-peer wireless link 204. The intermediate data structure 215 is converted back to an appropriate format at the client device 202 by the client application 203 as an intermediate data structure 212. Content 216 may be in form of, but not limited to, a list, metadata, or raw binary data resembling a specific content type, for example a raw binary data of a JPG image or the like. Server application 205 interacts with the client application 203 using a communication protocol over the peer-to-peer wireless link 204. The server application 205 is also responsible for performing operations on the content 216 based on the instructions received from the client application 203 via peer-to-peer wireless link 204. The server application 205 may or may not have a user interface depending on the implementation.

Further, in FIG. 2A, the client application 203 is responsible for converting the intermediate data structure 212 into multiple representations to be presented on the client device 202. In one implementation, client application 203 may convert the intermediate data structure 212 into an appropriate presentation 217, 218, 219 according to the implementation. For example, in some implementations, the interactive presentation 218 is generated by the client application 203 for display on a user interface of client application 203 to user 220. In some implementations, the client application 203 may convert the intermediate data structure 212 into a virtual file system adapter 208 to be accessible by a $3^{rd}$ party application 206 as a file system structure 217 via the virtual file system adapter 208. In some implementations, the client application 203 converts the intermediate data structure 212 into a set of data structures accessible by an API 209 so that a custom application 207 can present it, for example, as an interactive presentation 219 to a user 220. The client application 203 is also responsible for receiving and processing interaction requests from either its own user interface, the virtual file system adapter 208, or API 209. The requests will then be converted into a communication protocol message to be delivered to the server application 205 over the peer-to-peer wireless link 204.

Figure 2B:
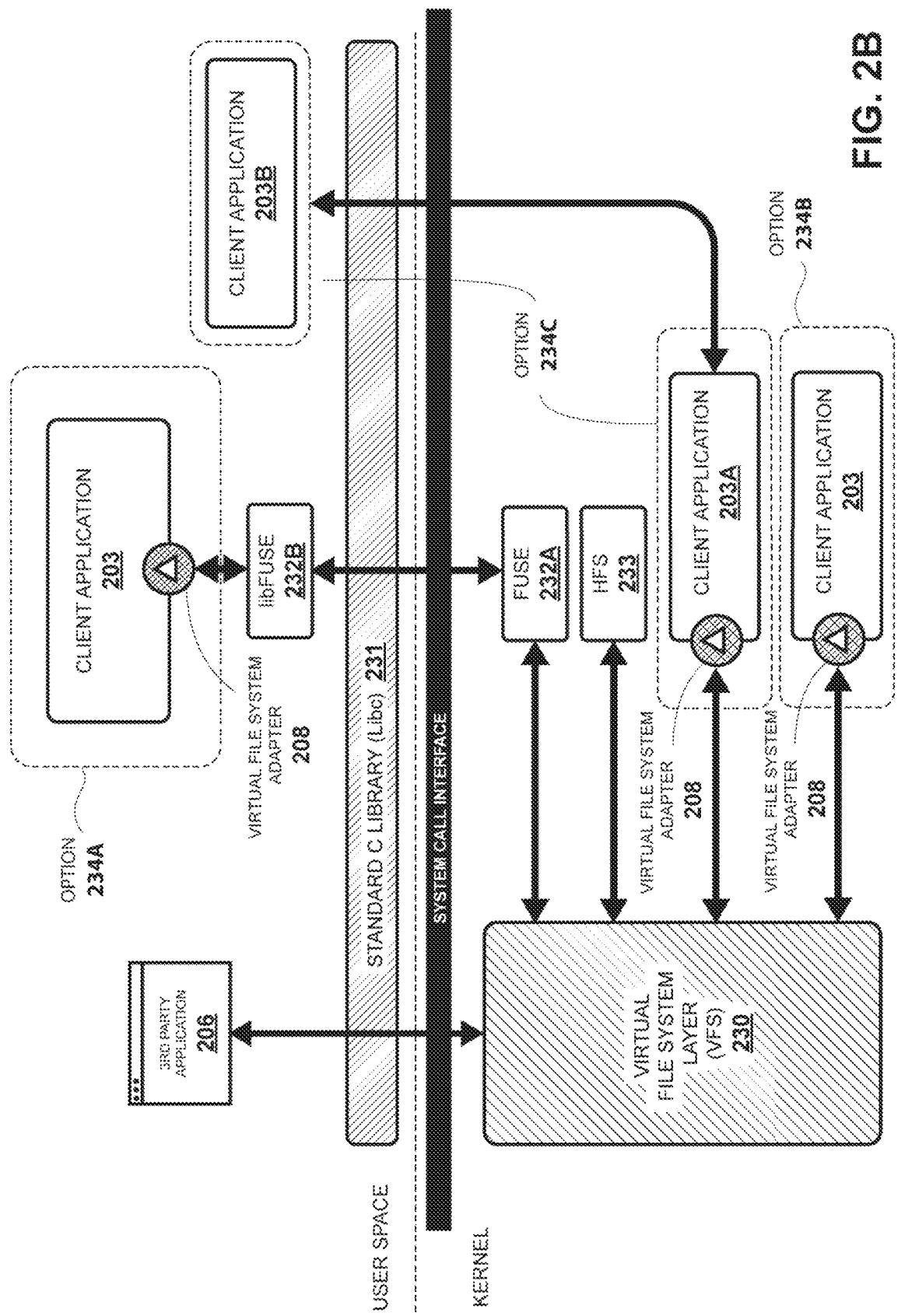
FIG. 2B shows a typical file system architecture of an operating system in accordance with implementations described herein.

FIG. 2B describes an exemplary file system architecture of a UNIX-style OS. A file system volume that needs to be mounted on the operating system is connected to a virtual file system (VFS) layer 230 in the operating system kernel. Different types of file system formats may be connected at the same time to the virtual file system layer 230, for example HFS, EXT4, FUSE, native or custom kernel extensions and the like. Applications that need to access the file system volume may use the standard file system APIs available in the standard C library (libc) 231. One implementation of the file system API 222 is a standard C library 231 in case that the system is implemented in a UNIX-style OS environment. In order to access the client application 203 via a file system API 222, the virtual file system adapter 208 has to be connected to the virtual file system layer 230. In some implementations, the virtual file system adapter 208 may be directly connected to the virtual file system layer 230 at the kernel level via a kernel extension or kernel module approach as in option 234B or option 234C. In some implementations, like option 234A, the virtual file system adapter 208 may be connected indirectly to the virtual file system layer 230 via a user space file system such as FUSE which bridges the connection using the kernel component FUSE 232A and user space component libFUSE 232B. Depending on the implementation, the client application 203 may reside in the kernel as in option 234B, in the user space as in option 234A, or split into 2 parts as in option 234C where the client application resides partly in the kernel 203A and partly in the user space 203B.

The intermediate data structure 215, 212 is an encoded data structure used by the server application 205 and client application 203 to exchange the data related to the content being accessed. The type of content data may be one of, but not limited to, a content list, content metadata, or content binary data. In the case where the content data being exchanged is a content list, the intermediate data structure may be structured as arrays, dictionaries, and/or trees and encoded in a particular text format such as JSON, XML, HTML, RSYNC, a binary format following ASN.1 notation and the like. FIG. 2C shows an implementation of a content list exchange between a photo library 253 as a storage container 211 of the server device 201 with the virtual file system adapter 208 to present a content list in a file system structure tree 250 at the client device 202. The client application 203 is requesting the content of the photo library 253 from the server application 205. Content type of photo library 253 may be an object of type PHAssetCollection 251A which is a photo album, or an object of type PHAsset 252A which is an image or video content. Some example properties of PHAssetCollection class are localizedTitle, startDate, and endDate. Some example properties of PHAsset class are filename, creationDate, modificationDate, and size. Requesting the content of photo library 253 will make the server application 205 extract the information from the properties of PHAssetCollection 251A and convert it into intermediate data structure of type JSON 251C in step 251B before transmitting to the client application 203. When the client application 203 received the JSON 251C, in step 251D, the client application 203 will convert the intermediate data structure into a file system node attributes of type folder 251E. When the client application 203 requesting the content of the folder 251, it will send a request to the server application 205 to extract the content of PHAssetCollection 251A which in this example is PHAsset 252A. The server application 205 will extract the information from the properties of PHAsset 252A and convert it into intermediate data structure of type JSON 252C in step 252B before transmitting to the client application 203. When the client application 203 received the JSON 252C, in step 252D, the client application 203 will convert the intermediate data structure into a file system node attributes of type file 252E and present it as file 252 under the folder 251.

Figure 3A:
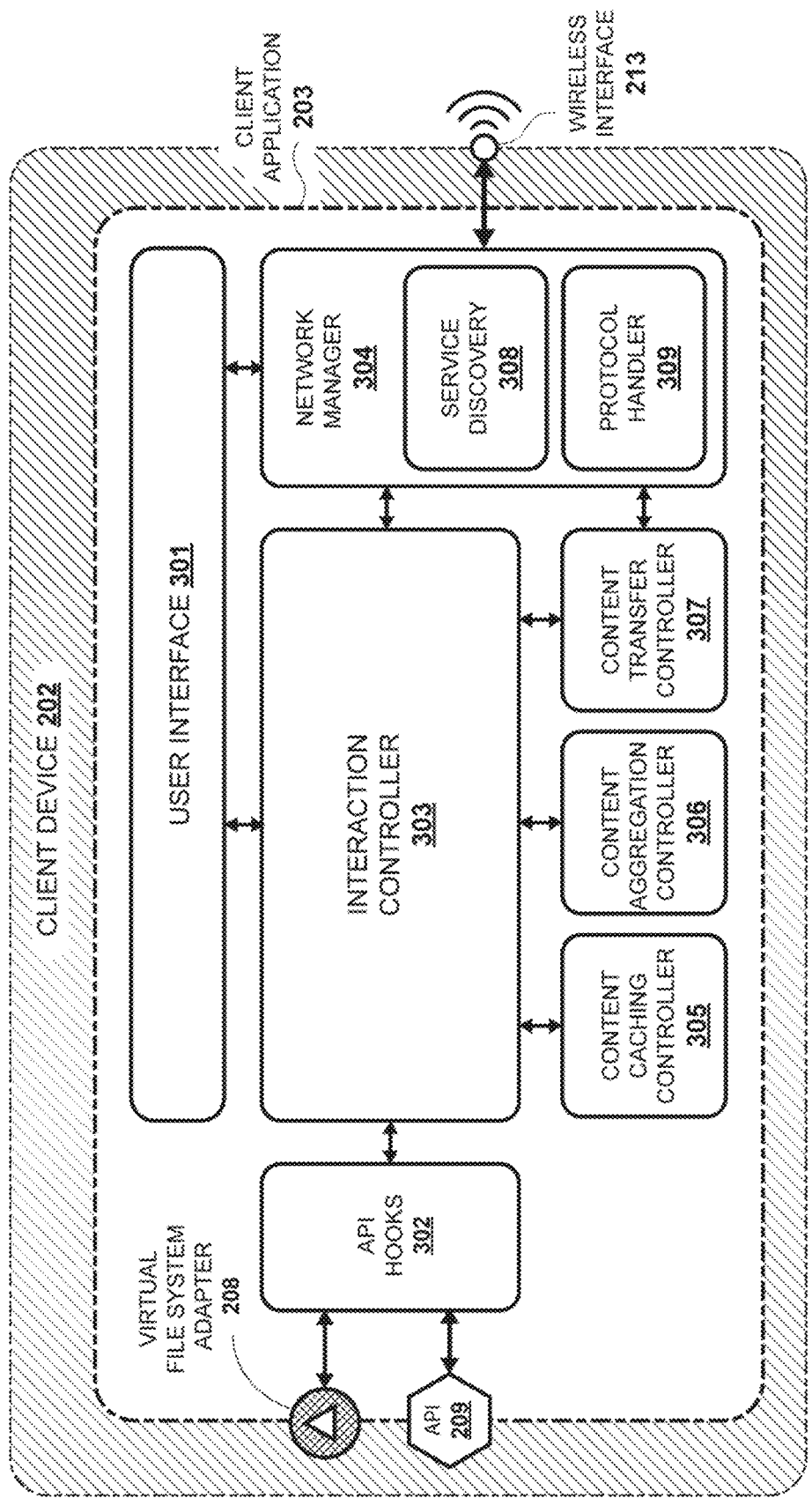
FIG. 3A shows the internal software components of the client application 203.

FIG. 3A shows the software components of the client application 203. The network manager 304 handles the network communication over the wireless interface 213 of the client device 202. It is responsible for discovering server application(s) 205 running on nearby devices by using a service discovery module 308, establishing the peer-to-peer wireless connection to the nearby device, and handling the communication with the connected server application 205 using the protocol handler 309. The peer-to-peer wireless connection may use one of, but not limited to Wi-Fi Direct, Bluetooth, or the like which is available on both client and server devices. In discovering nearby server application(s) 205, server discovery 308 may use a unique identifier to identify the server device(s) 201. The unique identifier of the server device 201 may be in form of, but not limited to, Device Unique ID, Device Name, User ID/Login, Contact Info, or any other unique identifier of a user or machine as partially described in FIG. 2D. In some implementations, service discovery 308 may also function to advertise the client application 203 to nearby server application(s) 205.

Interaction controller 303 is the main component of the client application 203 that controls the presentation of the remote content, interaction with the user interface 301 or API hooks 302, and handles the business logic for exchanging contents and operation instructions with the server application 205. Interaction controller 303 together with transfer controller 307 are responsible for handling the content transfer mechanism between client application 203 and server application 205. Content aggregation controller 306 is responsible for reconstructing or creating group of the remote contents delivered from the server application 205. Content caching controller 305 is responsible for caching remote contents received from the server application 205 for the purpose of quick retrieval and increasing responsiveness of the client application 203. The type of operations that can be performed by client application 203 on the remote content is defined by the presentation form of the content on the client application 203. For example, if the content is presented as interactive document of type newsfeed, user of client application 203 may tag the content, add a comment on the content, or mark the content as favorite or liked. In another example, if the content is presented as file system volume, the interaction will typically be a file system operation such as open and read the content, edit, delete, copy, move, etc.

In some implementations, a user interface 301 of client application 203 is provided for presenting the remote contents directly to the user as well as accepting user input. In some implementations, API hooks 302 of client application 203 provide access to other application in several different methods. In some implementations, API hooks 302 may be connected to public API 209 so any custom application 207 may use the service of client application 203 for accessing the remote content over peer-to-peer wireless connection. In some implementations, API hooks 302 may be connected to a virtual file system adapter 208 so any $3^{rd}$ party application 206 may access the remote contents transparently using file system API 222 of the operating system of the client device.

Figure 3B:
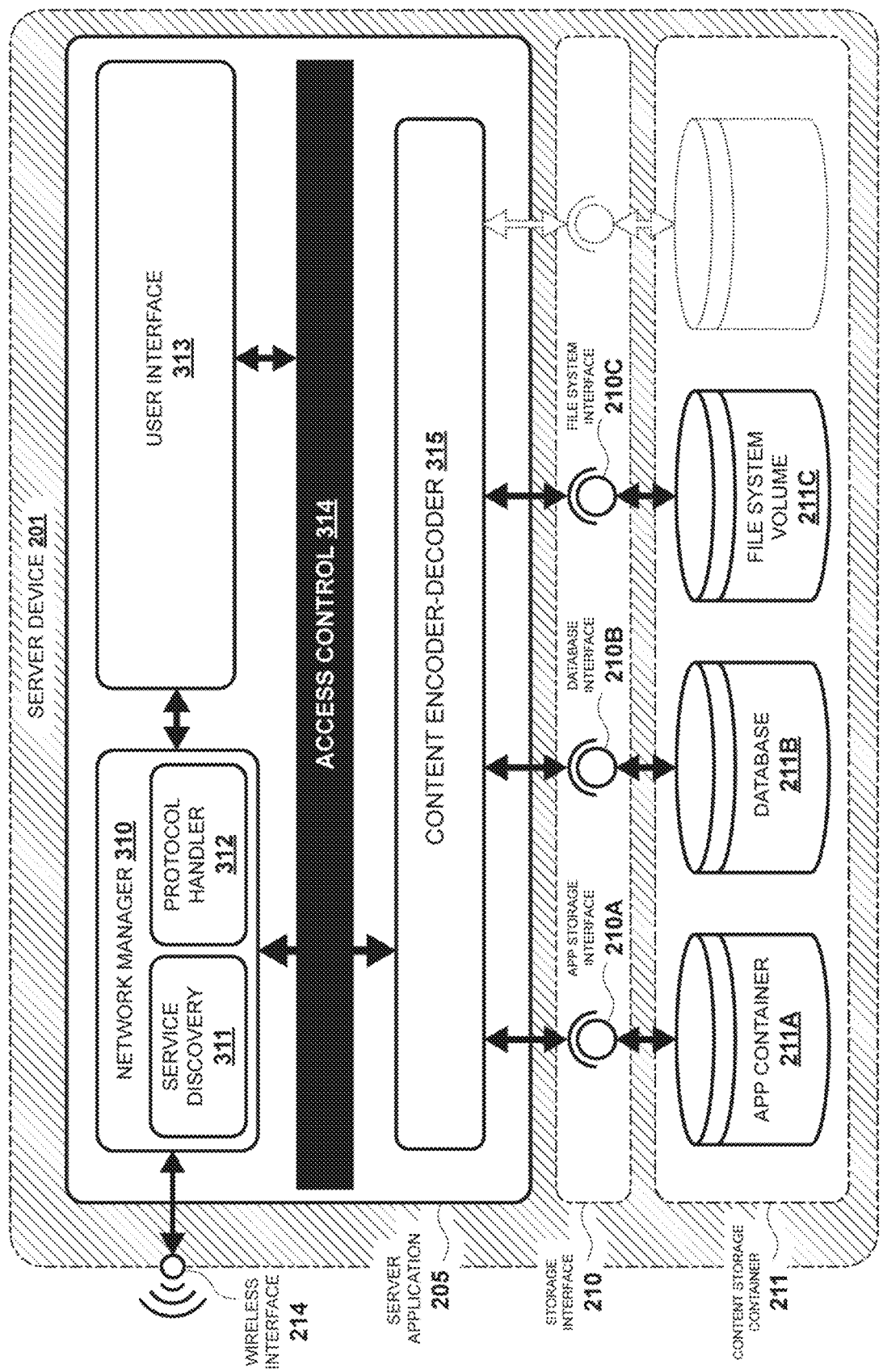
FIG. 3B shows the internal software components of the server application 205.

FIG. 3B shows the software components of the server application 205. A network manager 310 handles the network communications over the wireless interface 214 of the server device 201. It is responsible for advertising server application 205 using service discovery 311 to be discoverable by nearby client device(s), accept peer-to-peer wireless connection established by client device(s), and handling the communication with the connected client application(s) 203 using the protocol handler 312. The peer-to-peer wireless connection may use one of, but not limited to, Wi-Fi Direct, Bluetooth, or the like which is available on both client and server device. In advertising to nearby client application(s) 203, server discovery 311 may use a unique identifier to identify the server device 201. The unique identifier of the server device 201 may be in form of, but not limited to, UUID (Universally Unique Identifier), user login, email address, or any other unique identifier of a user or machine. The unique identifier of the server device 201 may be in form of, but not limited to, Device Unique ID, Device Name, User ID/Login, Contact Info, or any other unique identifier of a user or machine as in FIG. 2D. In some implementations, service discovery 311 may also function to discover nearby client application(s) 203.

As shown in FIG. 3B, the server application 205 includes a content encoder-decoder 315 which responsible for extracting contents from different types of storage containers 211, such as an app container 211A, a database 211B, a file system volume 211C via its individual storage interfaces 210A, 210B, and 211C respectively, or any other kind of storage container supported by the server device 201. The content encoder-decoder 315 is also responsible for mapping the contents, its structure and context into an intermediate data structure before transmitting to the client application 203 using the network manager 310 over the peer-to-peer wireless network connection on wireless interface 214. Moreover, the content encoder-decoder 315 is also responsible for decoding the protocol message request coming from the network manager 310 into content operation.

In some implementations, the app container 211A is a user's photos library in a first electronic device. The user's photos library may be a private container managed by the photos app and accessible directly via a photos framework API. As one example, a photos framework may allow any app on the first electronic device to retrieve photos or videos for display and playback, edit their contents, or work with its albums or collections. More generally, an app container may be a storage container which has a limited method and scope of access, and may include access control and security mechanisms, and it is not possible to access the raw content directly without a designated interface such as the photo framework APIs in the case of a user's photos library. In the case of a user's photos library, the photos framework APIs may provide an app storage interface 210A. In some implementations, the database container 211B is an SQLite database. The method to access the database content is using database interface 210B which is SQLite library in the case of SQLite database storage format. In some implementations, the file system volume 211C is HFS file system used by OS X or EXT4 file system typically used on Linux and accessible via a standard file system API.

The server application 205 also contains an access control layer 314 that adds security and privacy handling of the content to be accessed by client application 203. The privacy and security aspect of the access control layer 314 may include setting the permissions of the content accessible by one or more client application(s) 203. For example, content can be marked as hidden, read-only, modifiable, etc. This will limit the interaction types and level thereof on the content by the client application 203. Another privacy and security aspect of access control layer 314 is to control authorization of connection requests from client applications 203 running on client devices 202. For example, the server application 205 may prompt a user via the user interface 313 to authorize a connection request from a given client application 203. In another example, the server device 201 may prompt a user via the user interface 313 to authorize a request from a given client application 203 to access a particular content, a content group, or a content type stored in one or more storage containers 211 of the server device 201. Authorization of connection request or access request on the server application 205 may be performed automatically based on certain criteria without involvement of the user of server application 205. For example, the server application 205 may automatically authorize a connection from a given client application 203 based on a current or last system state, as in the case of an auto-reconnection after a sudden network breakdown. In another example, the server application 205 may incorporate additional authorization policies to screen requests from the client application 203.

Figure 3C:
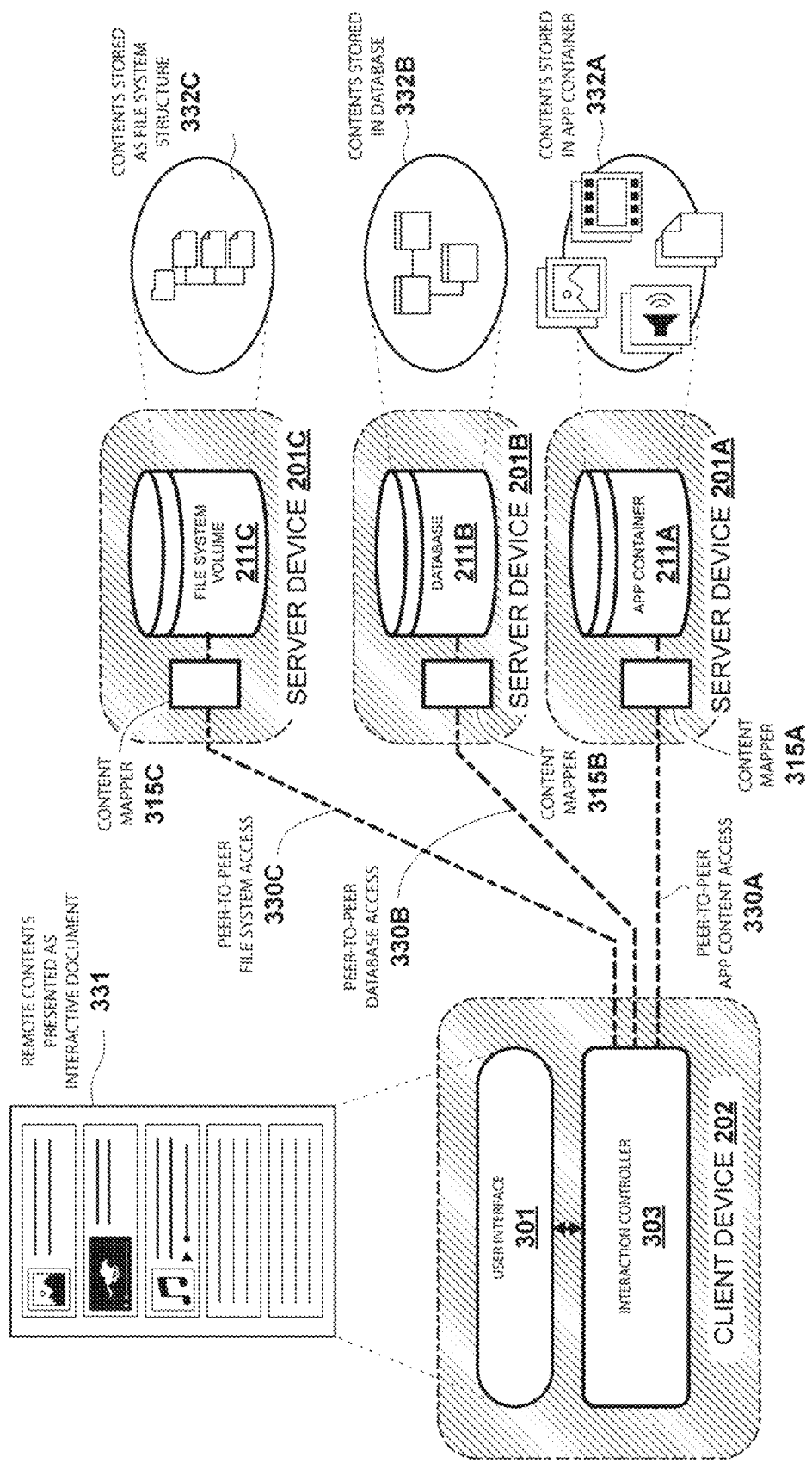
FIG. 3C shows an implementation of aggregated remote contents presented as an interactive document on the client device 202 constructed from multiple different content types and content structures stored on multiple different server devices 201A, 201B, and 201C.
Figure 3D:
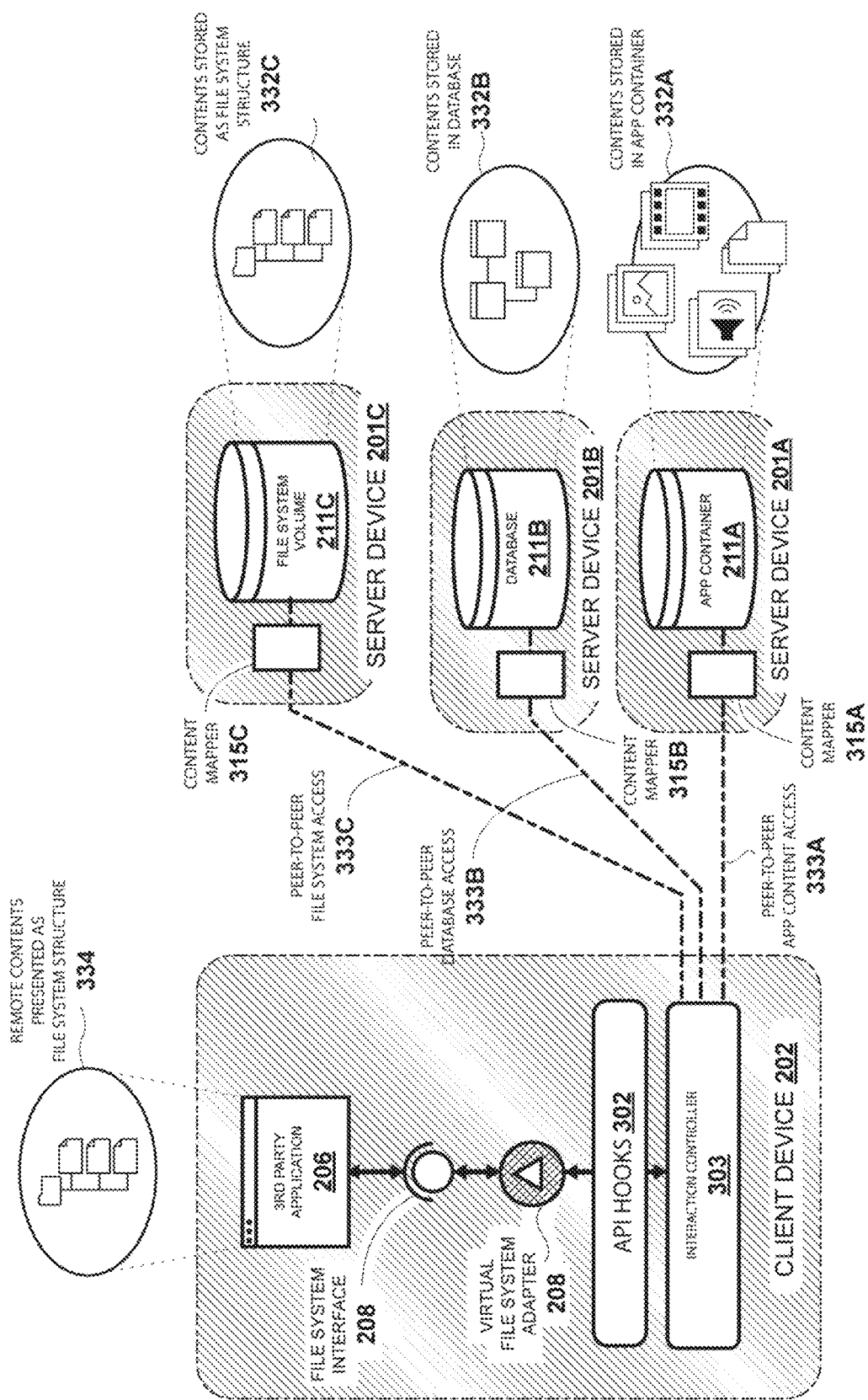
FIG. 3D is a modification of FIG. 3C and shows the approach of using the virtual file system adapter 208 in the client application to present the remote contents to the user of the client device 202.
Figure 3E:
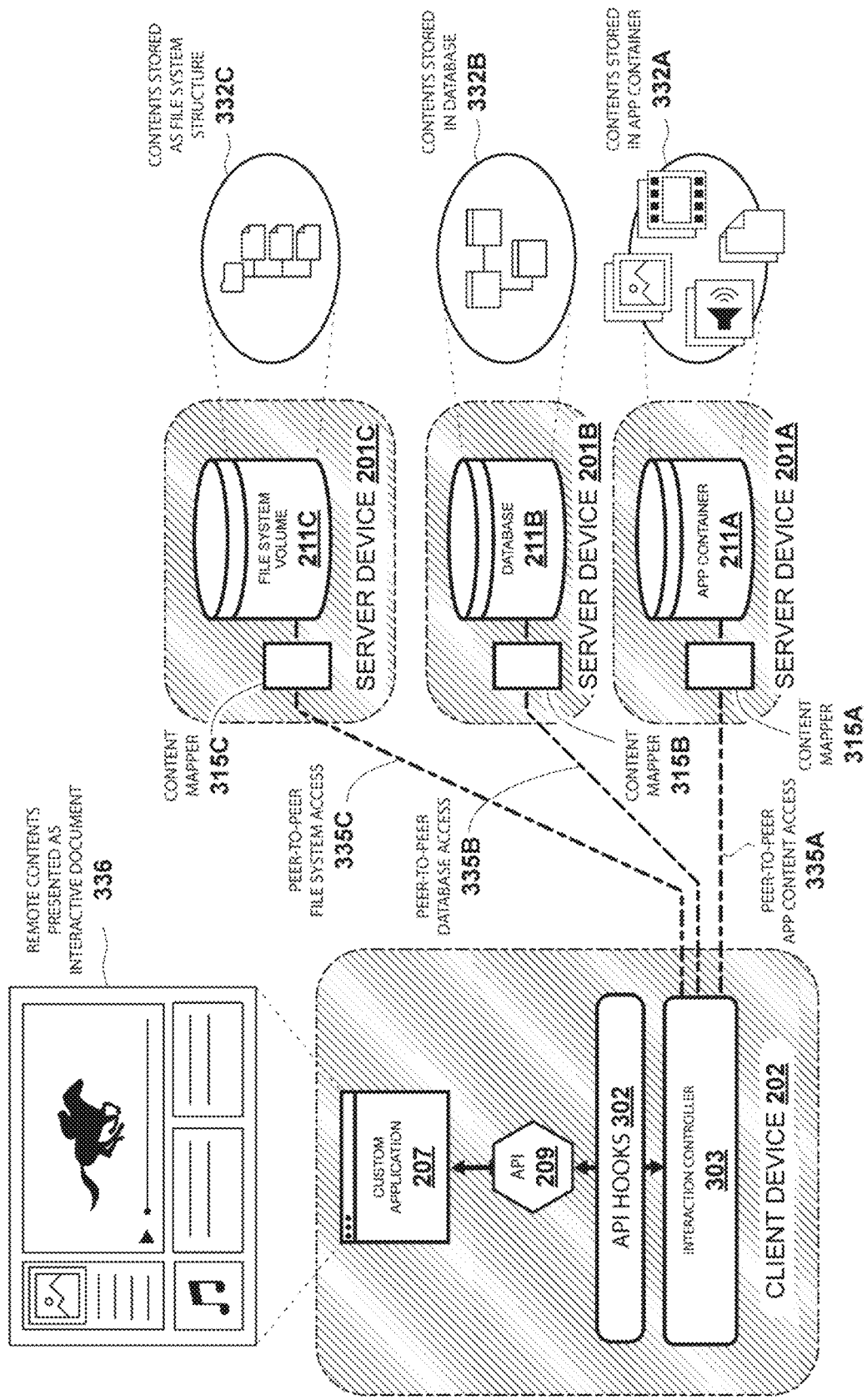
FIG. 3E is a modification of FIG. 3C and shows a presentation of the remote content performed by the custom application 207 through API 209.

FIGS. 3C, 3D and 3E show different implementations for aggregating and presenting the remote content from multiple server devices. FIG. 3C shows aggregated remote contents presented as an interactive document on the client device 202 constructed from multiple different content types and content structures stored on multiple different server devices 201A, 201B, and 201C. The content encoder-decoder 315A of server device 201A performs mapping of content and operations from the app container 211A to be accessed by the interaction controller 303. The content encoder-decoder 315B of server device 201B performs mapping of content and operations from the database 211B to be accessed by the interaction controller 303. The content encoder-decoder 315C of server device 201C performs mapping of content and operations from the file system volume 211C to be accessed by the interaction controller 303. The interaction controller 303 will then aggregate the remote contents from the multiple content encoder-decoders which is presented as the interactive document 331. User interaction with the interactive document 331 is handled and processed by the interaction controller 303 which when necessary sends the interaction request to the respective content encoder-decoder of the server device. For example, when the user of client device 202 performs a delete operation of a remote content that belongs to the app container 211A, such as a video, the interaction controller 303 will send a delete request to content encoder-decoder 315A to delete the respective video in the app container 211A. The content encoder-decoder 315A may reply with an acknowledgment of the operation back to the interaction controller 303 so it updates the presentation on the interactive document 331 accordingly.

FIG. 3D is a modification of the implementation shown in FIG. 3C and shows the virtual file system adapter 208 in the client application which presents the remote contents to the user of the client device 202. The aggregated remote contents from multiple server devices 201A, 201B, and 201C are presented in the form of a file system volume by connecting the virtual file system adapter 208 to the virtual file system layer of the operating system. This implementation allows a $3^{rd}$ party application 206 to access the remote content using file system APIs. The file system operation is mapped accordingly to an equivalent operation of the content. Each remote content is presented as a file of the file system volume. The same remote content may be presented at more than one location in the file system depending on the group created when aggregating the remote contents. For example, a photo stored inside app container 211A under an album titled "Vacation" may be presented in the file system volume inside a folder "Vacation" and may also be presented inside a different folder titled "Latest Photos" when such a photo appears in both albums on the server. In the case of a "Latest Photos" folder, the client application 203 using its content aggregation controller 306 will construct a new group of the remote content based on the metadata thereof such as the date when the photo(s) is taken. Another example of grouping that may be constructed is to group multiple photos accessed from multiple server devices based on the location of the photos taken.

FIG. 3E is a modification of the implementation shown in FIG. 3C and shows the presentation of remote content performed by a custom application 207 through an API 209. A custom application 207 interacts with the interaction controller 303 using the API 209. The API 209 is made accessible to custom application 207 by means of, but not limited to, a shared library, messaging over a socket, a system call API, a web API, and the like. The custom application 207 presents the aggregated remote contents as an interactive document 336 or any other presentation format described herein depending on the particular custom application requirements.

Figure 4A:
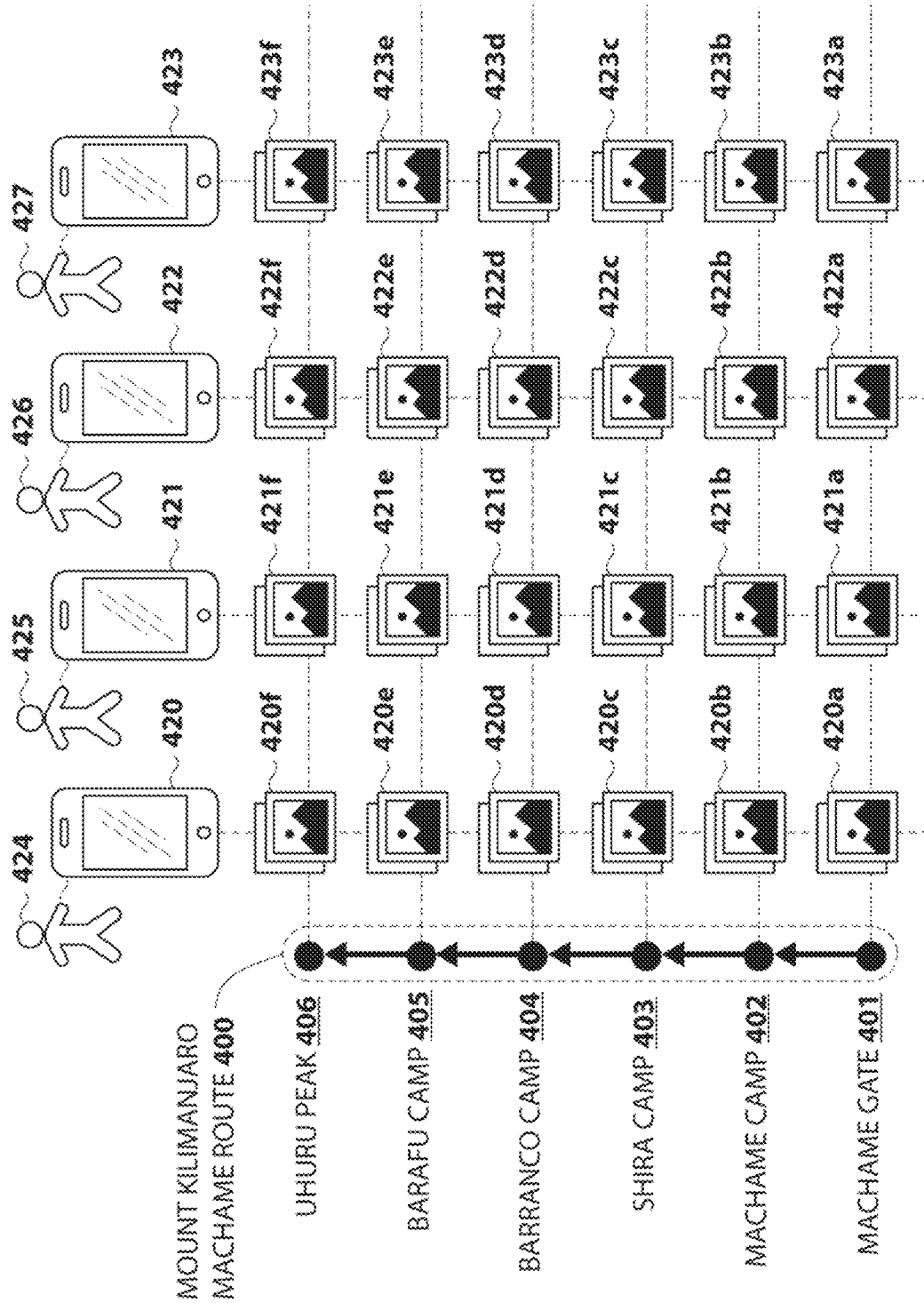
FIG. 4A shows a set of photos taken by a group of four persons 424, 425, 426, and 427 at various locations while they are climbing Mount Kilimanjaro following Machame route 400.

One example of grouping the content from plural devices is explained with respect to FIG. 4A. FIG. 4A shows a diagram of a group of four users 424, 425, 426, and 427 that generate a plurality of different contents such as taking pictures while they are on a climbing tour of Mount Kilimanjaro following the Machame route 400. The Machame route 400 starts at a first location named Machame Gate 401 and ends at a peak location, which is Uhuru Peak 406, with multiple rest locations in between which are Machame Camp 402, Shira Camp 403, Barranco Camp 404, and Barafu Camp 405.

Figure 4B:
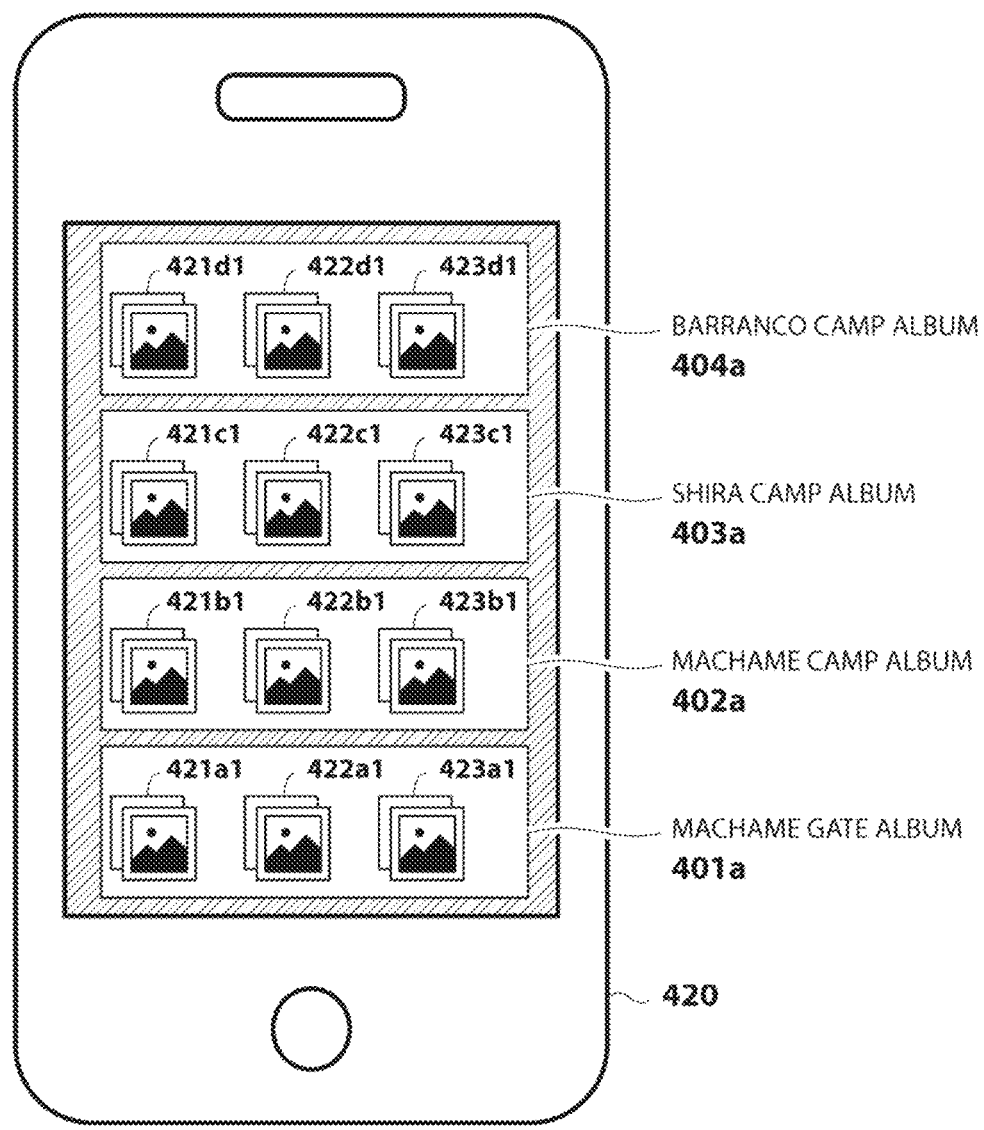
FIG. 4B shows an aggregated presentation of photos taken by the other 3 users implemented on the device 420.

Each user takes photos along the way to the Uhuru Peak 406. At resting location Barranco Camp 404, the user 424 would like to view and download the photos taken so far by each other mobile device. User 424, using his mobile device 420 and executing the client application 203, will request a peer-to-peer wireless connection and authorization to access photos on each of the mobile devices 421, 422, and 427 of the users 425, 426, and 427 respectively via the server application 205. The server device users 425, 426, 427 will have the right to give the authorization to user 424 to access the photos as well as setting access permissions of each of the photos such as read-only, copy-permitted, editable, and the like. Upon receiving authorization, the user 424 using his mobile device 420 browses and/or downloads the authorized photos presented as an interactive document such as photo albums, with the albums created as groups of different photos by contexts such as location and/or date. As shown in FIG. 4B, user 424 is presented an interactive document and accesses the album "Barranco Camp" 404a which contains a groupings of photo sets 421d1, 422d1, and 423d1, album "Shira Camp" 403a which contains a groupings of photo sets 421c1, 422c1, and 423c1, album "Machame Camp" 402a which contains a groupings of photo sets 421b1, 422b1, and 423b1, and album "Machame Gate" 401a which contains groupings of photo sets 421a1, 422a1, and 423a1. The group or album names may be automatically derived from metadata thereof such as the locations of the photos or may be manually assigned by the users depending on the implementation. In the case of grouping by date, the photo albums may contain, for example, a group of photos within the same day from different sources of nearby mobile devices as servers. The server user may automatically authorize content access to nearby client devices based on specific preset rules for example photos and videos taken on particular date(s) and within certain distance(s) of a location of a specific person. For example, in the case of group climbing tour of Mount Kilimanjaro, the user 425 using his mobile device 421 may set automatic authorizations for device 420, 422, and 423 to access all photos taken within the duration of the tour and around the vicinity of Mount Kilimanjaro. The authorization to access the photos may also be given to the user themselves instead of the client devices based on, but not limited to, user login or contact info shown in FIG. 2D which may be pre-assigned manually by server device user, or automatically based on a social network relationship between server device users and the client device users. The authorization given to a client device user via social graph may be assigned permanently by adding the respective user to the whitelist of the server device, or temporarily only during some period of time or at particular location(s).

Figure 4C:
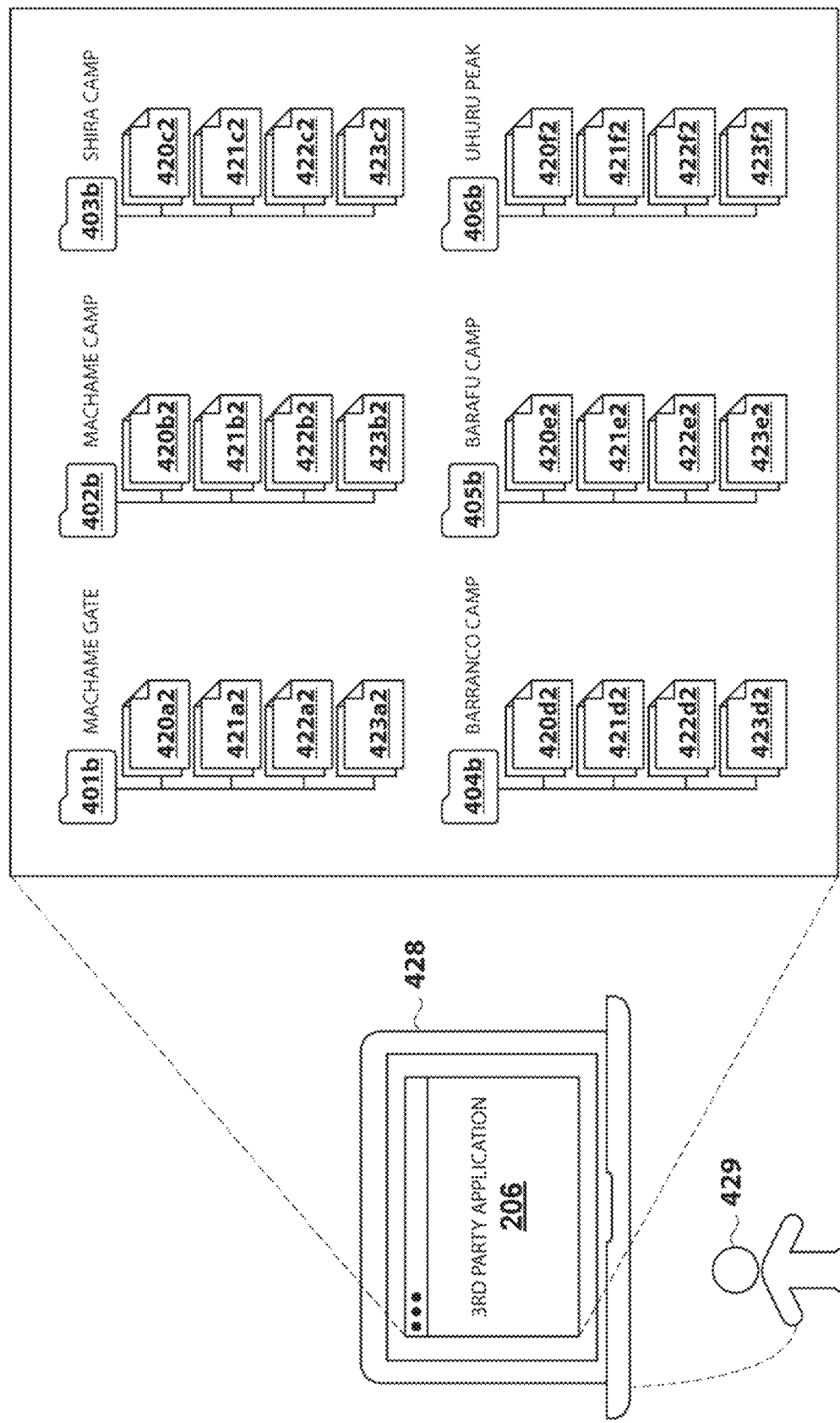
FIG. 4C shows an aggregated presentation of photos implemented on a $3^{rd}$ party application 206 on computer device 428.
Figure 7B:
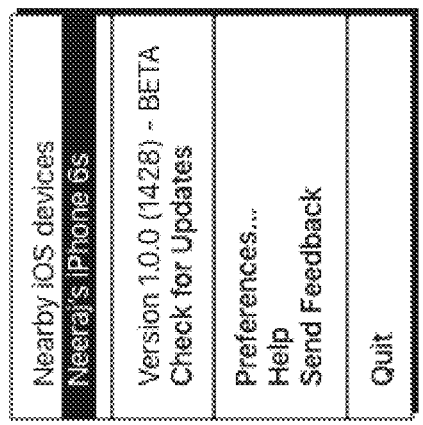
FIG. 7B shows a screenshot of one implementation of the client application in the menu bar of an electronic device showing another nearby electronic device.
Figure 7A:
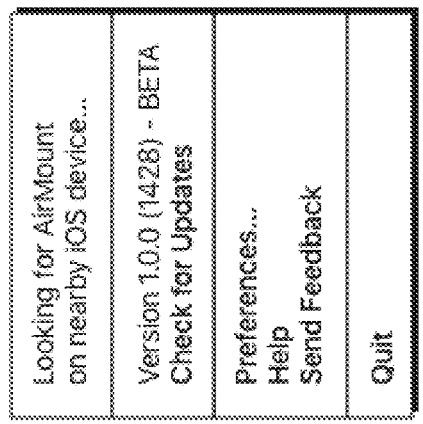
FIG. 7A shows a screenshot of one implementation of the client application in the menu bar of an electronic device.
Figure 7C:
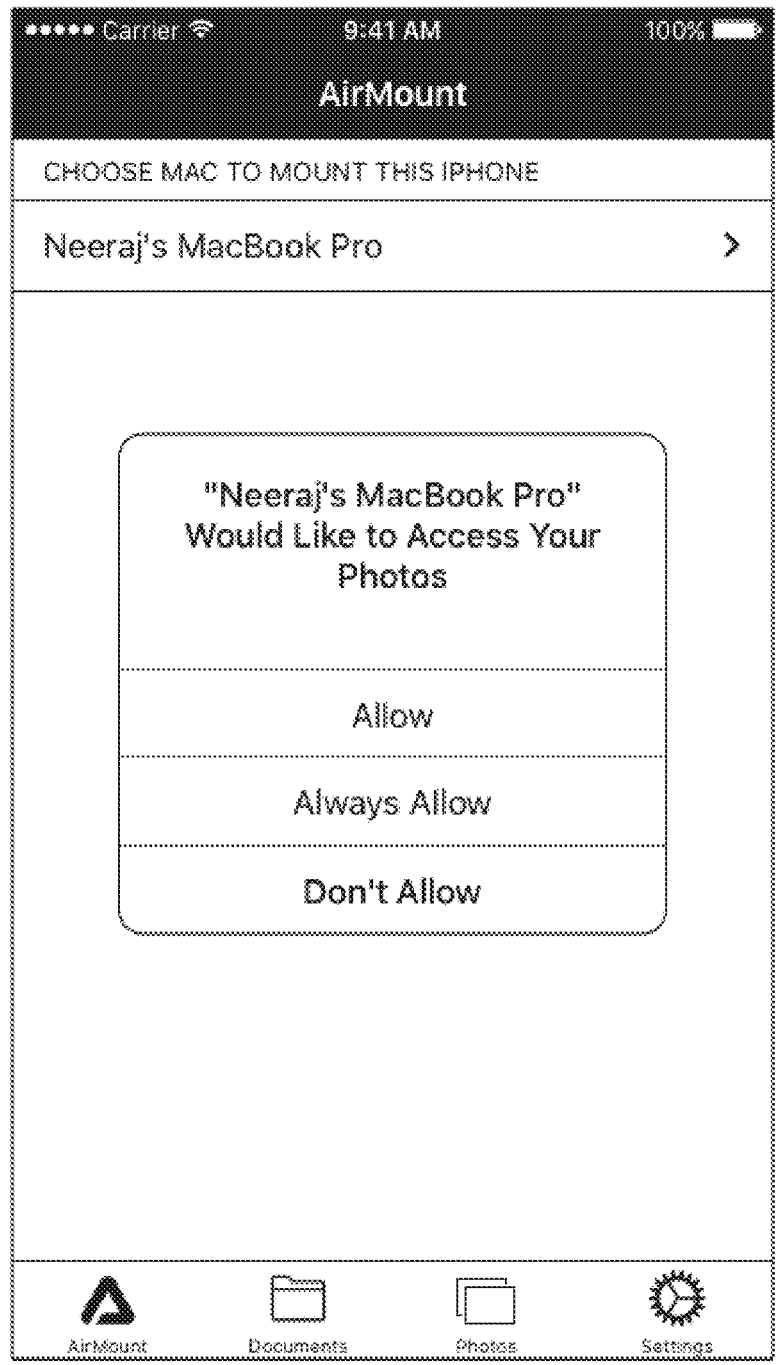
FIG. 7C shows a screenshot of one implementation of the server application receiving a permission request to access its contents from a client application running on an electronic device.
Figure 7D:
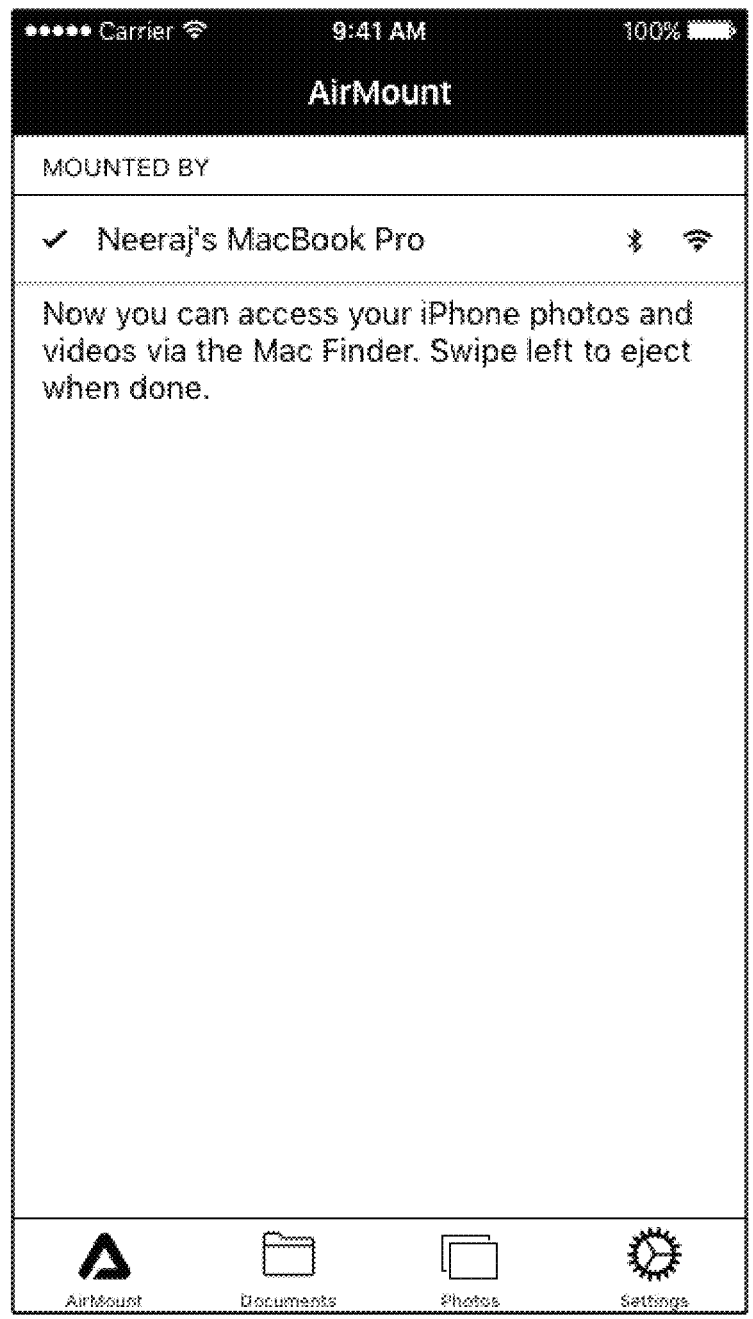
FIG. 7D shows a screenshot of one implementation of the server application showing that the client application running on the electronic device is currently permitted to browse contents thereof.
Figure 7E:
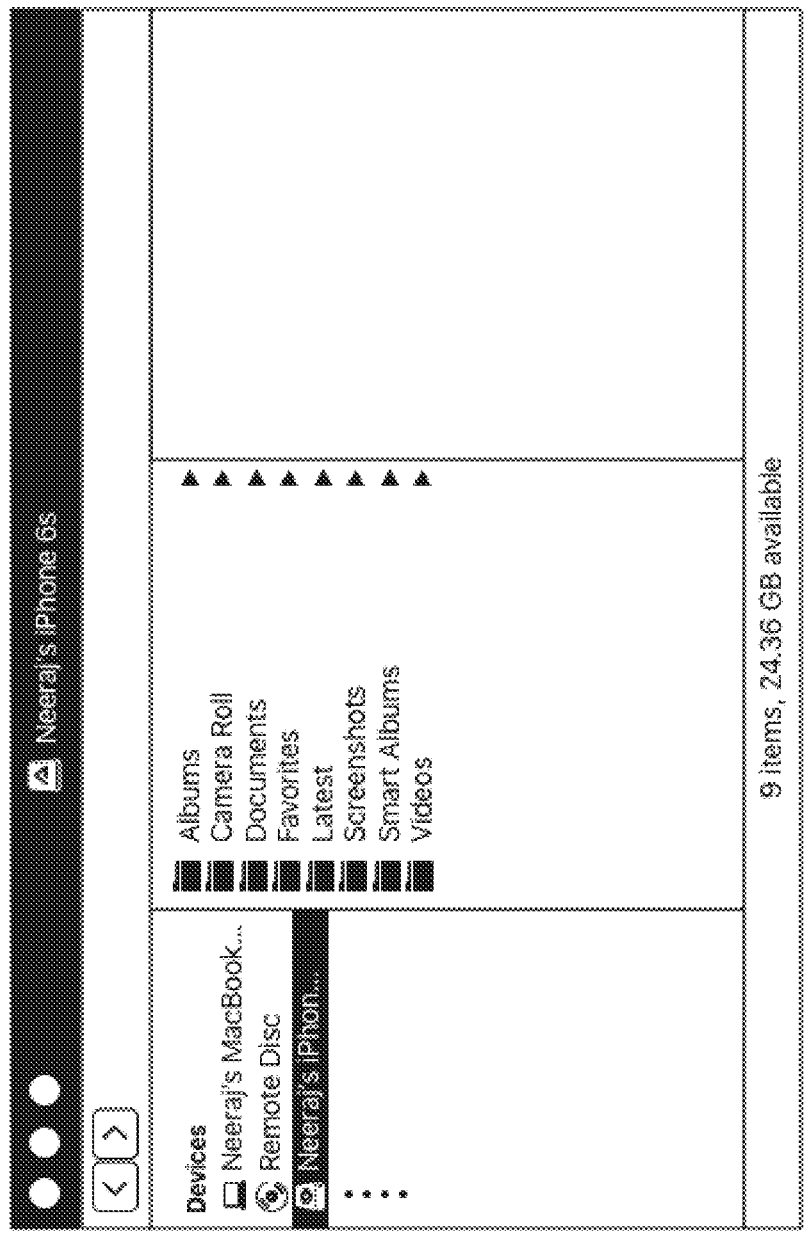
FIG. 7E shows a screenshot of one implementation of the client application on the electronic device with its Finder displaying the photo and video contents of the server device, with photo albums organized into corresponding folders.
Figure 7F:
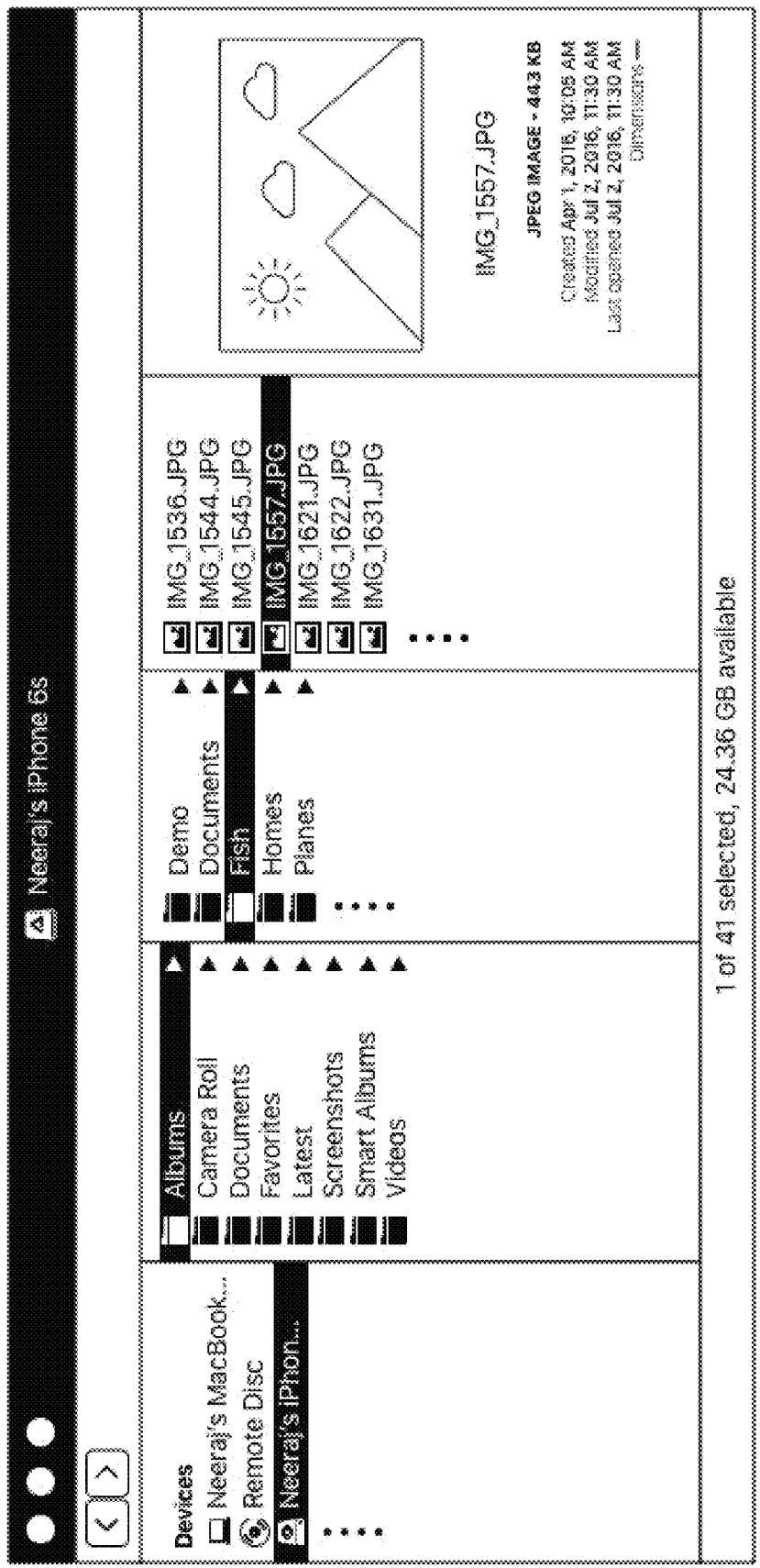
FIG. 7F shows a screenshot of one implementation of the client application on the electronic device with its Finder displaying a list of photos and thumbnails contained within an album on the server device.

Continuing from the exemplary implementation shown in FIG. 4A, after the group of users 424, 425, 426, and 427 complete their tour and return to a hotel, for example, the user 429 using client application 203 on his computer 428 requests access to the photos taken during the tour by the users 424, 425, 426, and 427 as shown in FIG. 4C. User 429 runs client application 203 on the computer 428 and requests a peer-to-peer wireless connection and access authorization to the nearby devices 420, 421, 422 and 423. After client application 203 is authorized by users 424, 425, 426, and 427 to access their photos on respective devices 420, 421, 422 and 423, client application 203 accesses the photos. FIG. 4C shows an implementation the client application 203 is using a virtual file system adapter 208 to present the remote contents so a $3^{rd}$ party application 206 may present the photos in a form of a folder tree. In some implementations, the photos may be grouped in directories named after the locations where the photos are taken as shown in FIG. 4C. Photos 420a, 421a, 422a, and 423a are shown inside folder "Machame Gate" 401b as files 420a2, 421a2, 422a2, and 423a2. Photos 420b, 421b, 422b, and 423b are shown inside folder "Machame Camp" 402b as files 420b2, 421b2, 422b2, and 423b2. Photos 420c, 421c, 422c, and 423c are shown inside folder "Shira Camp" 403b as files 420c2, 421c2, 422c2, and 423c2. Photos 420d, 421d, 422d, and 423d are shown inside folder "Barranco Camp" 404b as files 420d2, 421d2, 422d2, and 423d2. Photos 420e, 421e, 422e, and 423e are shown inside folder "Barafu Camp" 405b as files 420e2, 421e2, 422e2, and 423e2. Photos 420f, 421f, 422f, and 423f are shown inside folder "Uhuru Peak" 406b as files 420*f*2, 421*f*2, 422*f*2, and 423*f*2. In some implementations, the photos may be grouped in folders named after the event date, such as "Kilimanjaro Day 1", "Kilimanjaro Day 2", and so on. As should be understood by those of skill in the art, the method of grouping is also applicable for content types other than photos, such as videos, notes, documents, audio and the like. Another exemplary implementation of a folder structure is shown in FIG. 7F where contents stored on an electronic device are shown in different folders such as "Albums", "Camera Roll", "Documents", "Favorites", "Latest", "Screenshots", "Smart Albums" and "Videos".

Figure 4D:
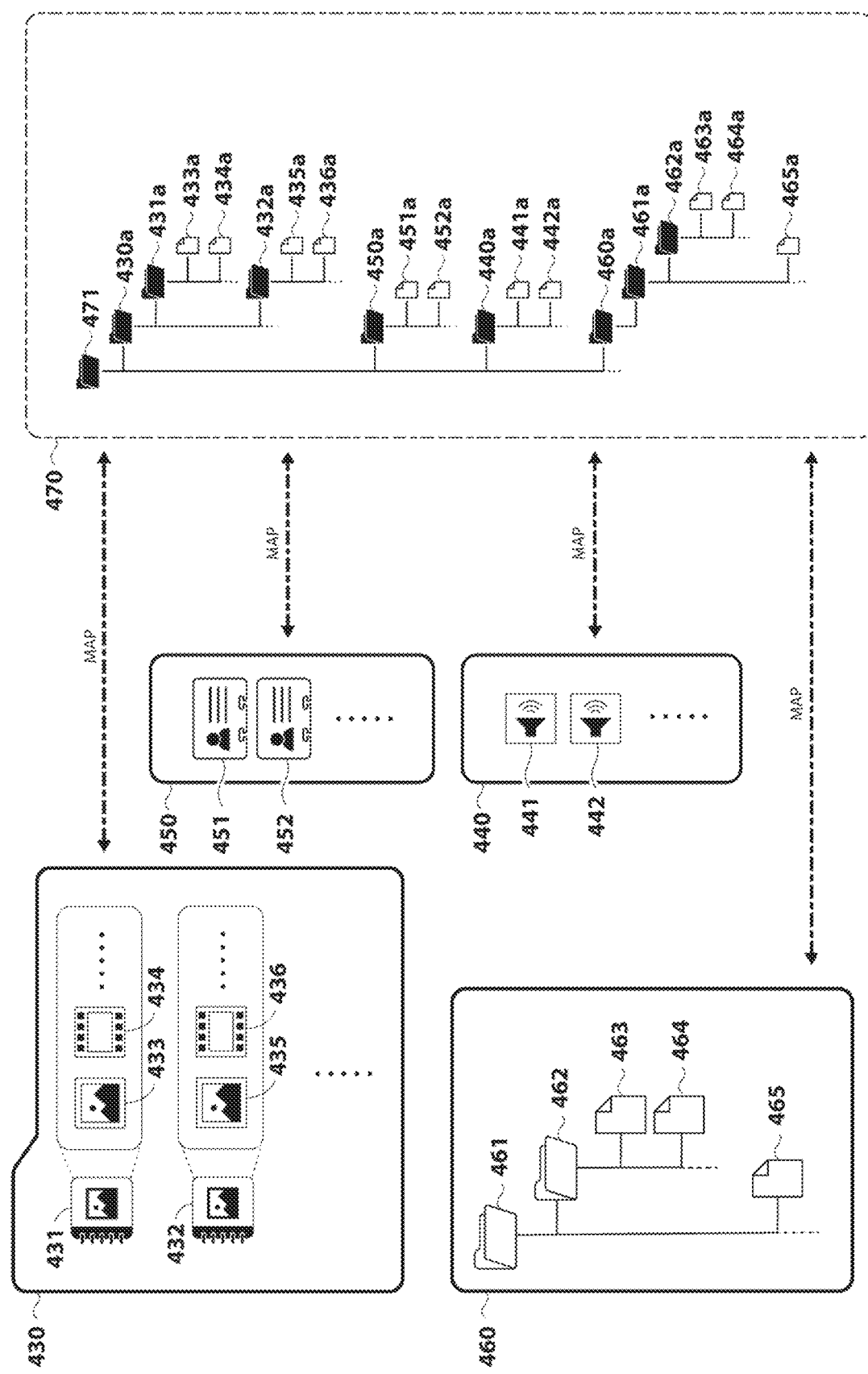
FIG. 4D shows an example of remote content mapping when a client application 203 implements presentation using the virtual file system adapter 208.

A more detailed implementation of remote content mapping when client application 203 is presenting using a virtual file system adapter 208 is shown in FIG. 4D. A photo and video storage container 430, equivalent to content storage container 211 on a server device 201, contains albums 431 and 432. The album 431 contains a photo 433, video 434, etc., while the album 432 contains a photo 435, video 436, etc. A contact database 450, equivalent to content storage container 211 on a server device 201, contains contact info 451 and 452. The contact database may be used, among other things, to generate a whitelist and/or blacklist to manage authorizations to access content. A file storage or file system volume 460, equivalent to content storage container 211 on a server device 201, contains files stored in folder tree 461 with file 465 at the root, file 463 and 464 inside subfolder 462. An audio or music storage 440, equivalent to content storage container 211 on a server device 201, contains audio file 441 and 442. Each of the containers 430, 440, 450, or 460 may or may not be on the same instance of the server device 201. Client application 203 accessing the content of container 430, 440, 450, and 460 using virtual file system adapter 208 will present the remote contents as folder tree structure inside file system volume 470, with folder 471 as the root. Client application 203 using the interaction controller 303 together with the content aggregation controller 306 maps the structure of the aggregated content as follow: (i) Photo and video container 430 is mapped as remote subfolder 430*a*, album 431 is mapped as remote subfolder 431*a*, album 432 is mapped as remote subfolder 432*a*, photo 433 is mapped as file 433*a* under remote subfolder 431*a*, video 434 is mapped as remote file 434*a* under remote subfolder 431*a*, photo 435 is mapped as remote file 435*a* under remote subfolder 432*a*, and video 436 is mapped as remote file 436*a* under remote subfolder 432*a*, (ii) contact database 450 is mapped as remote subfolder 450*a* with the contact info 451 and 452 mapped as remote file 451*a* and 452*a* respectively, (iii) audio storage 440 is mapped as subfolder 440*a* with audio content 441 and 442 mapped as file 441*a* and 442*a*, and (iv) file storage 460 is mapped as remote subfolder 460*a*, its subfolder 462 is mapped as remote subfolder 462*a*, file 463 is mapped as remote file 463*a*, file 464 is mapped as remote file 464*a* and file 465 is mapped as remote file 465*a*.

Establishing remote content access on the server device 201 from a client device 202 first includes "content access privileges assignment" which occurs on the server device 201 which involves selecting and assigning the access privileges to the contents to be shared with client device 202. The assignment of access privileges may or may not involve user 221. In the case user 221 is not involved with the access privileges assignment, the server application 205 may incorporate a special algorithm based on predefined rules to assign the access privileges on the contents. For example, server application 205 may automatically assign read-only privileges for photos taken at a current location to all nearby client devices. Secondly, "device access authorization" occurs when the client device 202 requests access of the content stored on server device 201, to further prevent random access from just any nearby device. Depending on the implementation, either one of content access privileges assignment and device access authorization may be provided separately without the other.

To perform the assignment of content access privileges, the user of a server device has to set the access privileges of the content to be accessible by nearby client devices. The access privileges type may be one of, but not limited to: allow view, allow copy, allow download, allow modification, allow delete, allow adding child content, allow adding comment, allow tagging, allow marking as favorite/like, etc. The access privileges of the content may be applied to different scopes, such as to anyone nearby (public) or a specific group of users, or a specific group of devices, or a specific user, or a specific device. Any content not assigned to a scope shall be private by default. A single content may be assigned to multiple scopes at the same time. For example, in a conference a user may choose to share his business card with anyone nearby, while in a company a team member may share certain contents or group of contents only with devices of team members, or certain content may be shared only with one's own devices (private).

The method of setting the access privileges and/or the scope may be performed manually or automatically for each piece of content or a group of contents. Manual setting of access privileges and/or scope may be performed by the server's user by selecting and assigning it to each content item or a group of contents, either in advance or upon request. Assigning automatic content access privileges and/or scope may be achieved by detecting the content metadata with some other conditions. For example, access privilege may be granted automatically to a person in my phone's contact list or social network who is at the same time and location as the content (photo) taken. This may be further refined by the person's face detection in the case the content is a photo. Client device accessing remote content via virtual file system, the remote content access privileges are mapped into a file system permission, for example, allow read is mapped as a file read permission, and allow modification is mapped as a file write permission, and so on for other types of access privileges. Once the access privileges are assigned on the contents, the server device 201 is able to share its contents with any nearby client device 202.

Accessing contents stored in content storage container 211 of server device 201 from client device 202 will depends on a client application 203 running on the client device 202 and a server application 205 running on server device 201. Before client application 203 can access the remote content on server device 201, it has to follow the "device access authorization" process described in flowcharts shown in FIGS. 5A, 5B, and 5C.

A client device 202 may initiate a remote access request following the flowchart on FIG. 5A starting from step 501. To access the contents of server device 201, the client application 203 has to scan for and discover any available server device 201 in the vicinity as in step 502. A discovered electronic device, as a server, on a client application user interface running on an OS is shown in the implementation of FIG. 7B where discovered devices are listed under "Nearby devices". Client application 203 has to select the discovered server device 201 from the list before accessing the content as in step 503. The process of selecting the server device 201 in step 503 may or may not involve input from the user 220. In case user 220 is not involved in the selection of the server device 201, the client application 203 may automatically select the server device 201 based on certain criteria. In one implementation, the client application 203 may make a decision based on current or last system state, for example, in the case of auto-reconnection after a sudden network breakdown. In another implementation, the client application 203 may incorporate a specific algorithm according to the application of the system to select the server device 201 to access, for example, the server device 201 is registered in the whitelist. After selecting the server device 201, the client application 203 will proceed to perform the process of remote access request as in step 510. The unique identifier of the server device 201 may be in form of, but not limited to, Device Unique ID, Device Name, User ID/Login, Contact Info, or any other unique identifier of a user or machine as exemplified in FIG. 2D.

In some implementations, the server device 201 may also trigger the initiation of the remote access request by client device 202. This process follows the flowchart shown in FIG. 5B starting from step 504 where the server application 205 is started and running on the server device 201. The server application 205 scans for and discovers any available client devices 202 in the vicinity thereof as in step 505. Server application 205 will select the discovered client device 202 from the list. The process of selecting the client device 202 in step 506 may or may not involve input from the user 221. In case user 221 is not involved in the selection of the client device 202, in one implementation the server application 205 may automatically select the client device 202 based on certain criteria. In one implementation, the server application 205 may make a decision based on current or last system state, for example, in the case of auto-reconnection after a sudden network breakdown. In another implementation, the server application 205 may incorporate a specific algorithm according to the application of the system to select the client device 202, for example, if the client device 202 was registered in the whitelist. After client device 202 is selected by sever application 205, the server application 205 will notify the client application 203 running on client device 202 to send remote access request to itself (the server application 205) as in step 507, followed by the process of remote access request as in step 510. The unique identifier of the server device 201 may be in form of, but not limited to, Device Unique ID, Device Name, User ID/Login, Contact Info, or any other unique identifier of a user or machine as exemplified in FIG. 2D.

FIG. 5C shows a flowchart of the processing of a remote access request. The process starts from step 511 where client application 203 sends a remote access request to the server application 205 running on the server device 201. In step 512, the access control component 314 of the server application 205 will check if the identifier of client device 202 is registered in its blacklist. If the identifier of client device 202 is registered in the blacklist, the server application 205 is disconnected from client application 203. If the identifier of client device 202 is not registered in the blacklist, server application 205 will proceed to check the identifier against the whitelist in step 513. The unique identifier of the server device 201 may be in form of, but not limited to, Device Unique ID, Device Name, User ID/Login, Contact Info, or any other unique identifier of a user or machine as exemplified in FIG. 2D.

In step 513, the access control component 314 of the server application 205 will check if the client device 202 is in its whitelist. If the identifier of client device 202 is found in the whitelist, the server application 205 is connected to client application 203 on client device 202, as in step 520.

The unique identifier of the server device 201 may be in form of, but not limited to, Device Unique ID, Device Name, User ID/Login, Contact Info, or any other unique identifier of a user or machine as exemplified in FIG. 2D. Next in step 522, the interaction controller 303 of the client application 203 is presenting the remote contents of server device 201 to user 220. The presentation to the user 220 may be in form of user interface client application 203, custom application 207 via API 209, or 3$^{rd}$ party application using file system interface via virtual file system adapter 208. Upon completion of step 522, user 220 is able to interact with the content of server device 201 remotely.

If the identifier of client application 203 is not found in the whitelist in step 513, the server application 205 will ask the user 221 to authorize the remote access request in step 515. An exemplary implementation of step 515 is shown in FIG. 7C where an electronic device, as a server, receives an authorization request from another electronic device as a client (e.g., "Neeraj's MacBook Pro") to access photos stored thereon. The user 221 will then respond to the remote access authorization request in step 516. In one implementation, the steps inside 514 may be performed automatically based on certain criteria without involvement of the user 221. For example, the server application 205 may make a decision based on current or last system state, such as in the case of auto-reconnection after a sudden network breakdown. In another implementation, the server application 205 may incorporate a specific algorithm according to the application of the system to authorize the remote access request, for example, if users 220 and 221 are the same person. At step 516, there are four possible authorization responses that can be given by the user 221 or automatically by the system in case user input is not involved and include: "Authorize remote access for current session only" 516A, "Authorize remote access for current and future sessions" 516B, "Do not authorize remote access for current session" 516C, or "Do not authorize remote access for current or future sessions" 516D. An exemplary implementation after authorization is shown in FIG. 7D.

At the step 516A and 516B, in some implementations the user may also set the access privileges of the contents or group of contents to be shared to the client application 203. The process of content access privileges assignment may be performed at the same time with the process of device access authorization.

In case the user 221 gives the authorization type 516A, the server application 205 is connected to client application 203 as in step 520, followed by presentation of remote content by interaction controller 303 of client application 203 to the user 220 in step 522. The presentation to the user 220 may be in form of user interface client application 203, custom application 207 via API 209, or 3$^{rd}$ party application using file system interface via virtual file system adapter 208. Upon completion of step 522, user 220 is able to interact with the content of server device 201 remotely.

In case the user 221 gives the authorization type 516B, on step 517 the server application 205 will register the identifier of client device 202 in the whitelist of the access control component 314 so the client device 202 is automatically authorized next time it requests to access the content of the server device 201, followed by steps 520, 522 and 523.

In case the user 221 gives the authorization type 516C, the server application 205 will notify the client application 203 that its remote access request is denied in step 519. In step 519, the client application 203 may or may not notify the user 220. As a result, the server application 205 is disconnected from client application 203 of the client device 202 in step 521.

In case the user 221 gives the authorization type 516D, the server application 205 will register the identifier of client device 202 in the blacklist of the access control component 314 so the client device 202 is automatically rejected next time it requests to remotely access the content of server device 201, followed by steps 519 and 521.

FIGS. 6A to 6F show sequence diagrams of exemplary communications in the system architecture of FIG. 2A where a client application 203 presents access to content using different implementations including: (i) access using the user interface of client application 203, (ii) access using the file system interface 222, and/or (iii) access using the API 209. Whenever it is stated that user 220 is accessing or interacting with remote content via the client application 203, it is assumed that the user may perform the action with any of the three implementations mentioned, unless explicitly stated otherwise. Whenever it is stated that the server application 205 is accessing or performing an operation on the storage container 211, it is implied that the communications or the actions are carried out via the storage container interface 210. Whenever it is stated that client application 203 is communicating with the server application 205, and vice versa, it is implied that the communication involves exchange of protocol messages over the peer-to-peer wireless network.

The initial process of accessing the server device's contents consist of three operations: (i) an access authorization operation 600A, (ii) a content list and metadata retrieval operation 600B, and (iii) an additional content metadata operation 600C. In operation 600A, user 220 using the client application 203 selects a discovered server device 201 at step 601. FIG. 7A shows a screenshot of one implementation of the client application (e.g., "AirMount") in the menu bar of a Mac OS.

Client application 203 sends a protocol message to server application 205 running on server device 201 to access the server's storage container 211. Server application 205 may reply with the authorization status to the client application 203 according to the implementation shown in FIG. 5C at step 603. FIG. 7B shows a screenshot of one implementation of the client application in the menu bar showing a nearby server electronic device (e.g., "Neeraj's iPhone 6s").

Next, in operation 600B, the client application 203 will request the remote content list together with its metadata from the server application 205. Starting with step 604, the client application 203 sends a protocol message to request the remote content list and metadata to server application 205. Server application 205 will translate the protocol message into an instruction to fetch the authorized content list and its metadata from the storage container(s) 211 at step 605. Storage container 211 will then reply with the content list together with its metadata at step 606. After receiving the content list and its metadata, at step 607, the server application 205 will encode it into an intermediate data structure, such as JSON or any other data encoding type as in the implementation shown in FIG. 2C, to be sent back to client application 203 at step 608. Upon receiving the encoded remote content list and metadata, at step 609 the client application 203 will decode it and present the remote content list to the user 220 at step 611. Before presenting the remote content list to the user 220, in some implementations at step 610 the client application 203 may cache, or store into memory of the client device, the remote content list and its metadata. At this time, the client application 203 has most of the information of the remote content to which it may access and generally consists of a list of content items identified by unique identifiers and metadata associated with each content such as, name, creation date, modification date, content size, etc. The unique identifier of the content item may be in form of, but not limited to, a content resource path or a unique identifier returned by the storage interface 210. The information received by the client application 203 at this point is sufficient to present the list of remote contents to the user 220 as a lightweight representation that is representative of the remote contents thereof. FIG. 7E shows a screenshot of one implementation of the Mac OS with the Finder displaying the photo and video contents of the server device (e.g. "Neeraj's iPhone 6s"), with photo albums organized into corresponding folders. In FIG. 7E, the lightweight representation is understood to indicate that while remote content of the server appears to be located at the client from the Finder, the representation of the remote content is generated from decoding the intermediate data structure which includes a content list and metadata of the listed content rather than the actual data of the content. In this sense, the encoded remote content list and metadata 608 is lightweight in that it does not include the actual data of the content and requires less bandwidth in order to be transmitted than does the actual data of each content item of the content list as a whole.

Nevertheless, some additional information of the content item may not be provided by the server application 205 at this time such as icons, location info, or additional metadata like EXIF. In order to provide a richer content presentation at the client device, in some implementations, a second request of additional metadata is sent in operation 600C. Namely, the client application 203 sends a protocol message to server application 205 to request for additional metadata of the remote content at step 612. Server application 205 will then translate the protocol message into additional metadata fetching operation(s) of the storage container 211 at step 613. After storage container 211 returns the additional content metadata at step 614, the server application 205 will again encode it into intermediate data structure at step 615 and send it via protocol message to client application 203 at step 616. Client application 203 will decode the intermediate data structure from the protocol message at step 617 and may cache the decoded additional metadata at step 618. The decoded additional metadata will then be combined with the previous metadata of the content received in operation 600B and the remote content list presentation is refreshed with the newly updated metadata to the user 220 at step 619. Upon completion of operation 600C, the client application 203 will present the content list in a rich representation which may include, for example, a photo is displayed as a file with its associated thumbnail instead of a generic file icon as in the implementation where user 220 accessing the client application 203 uses the $3^{rd}$ party application 206 via virtual file system method. In the implementation where user 220 is presented the aggregated content as an interactive document format, a photo may be displayed with a low resolution version during operation 600B and which is then updated to a higher resolution in operation 600C. Splitting content metadata fetching into two or more operations 600B and 600C optimizes the browsing experience at the client device. During operation 600B, the data transfer is controlled to optimize network bandwidth, so the user sees all the permitted contents, can recognize each piece of content and navigate within the content list. While the user is browsing the content list, the operation 600C is started in order to furnish additional metadata so that the user 220 is provided a better representation of the aggregated remote content. Up to operation 600C, the user 220 is able to remotely browse all the authorized contents of the storage container 211 without any of content itself being transferred to the client application 203.

FIG. 6C shows a sequence diagram of user 220 reading or opening a remote content stored in the storage container 211 on the server device 201. Beginning with operation 620A, when the user 220 inputs to read a remote content via client application 203 for the first time at step 621, the client application 203 will send a protocol message to server application 205 requesting the remote content data at step 622A. Server application 205 will then convert the protocol message into an operation to fetch the content data from storage container 211 at step 623. After storage container 211 returns the content data at step 624, server application 205 will encode the content data in intermediate data structure and transmit it to the client application 203 at step 626. Client application 203 will decode the received remote content data at step 627. Client application 203 may or may not cache the received remote content data depending on the implementation on step 628. Client application 203 will then present the decoded remote content to the user at step 629A. A subsequent open operation on the same remote content by the user 220 will follow operation 620B. Upon receiving the open request from the user 220 at step 621B, the client application will try to load the cached remote content first at step 622B. If the cached content is found, it will immediately return and present the remote content to the user 220 at step 629B. If the cached content is not found, it will follow the same sequence as operation 620A. The implementation of remote content caching will significantly increase the responsiveness of the client application 203 to the user 220.

Figure 6A:
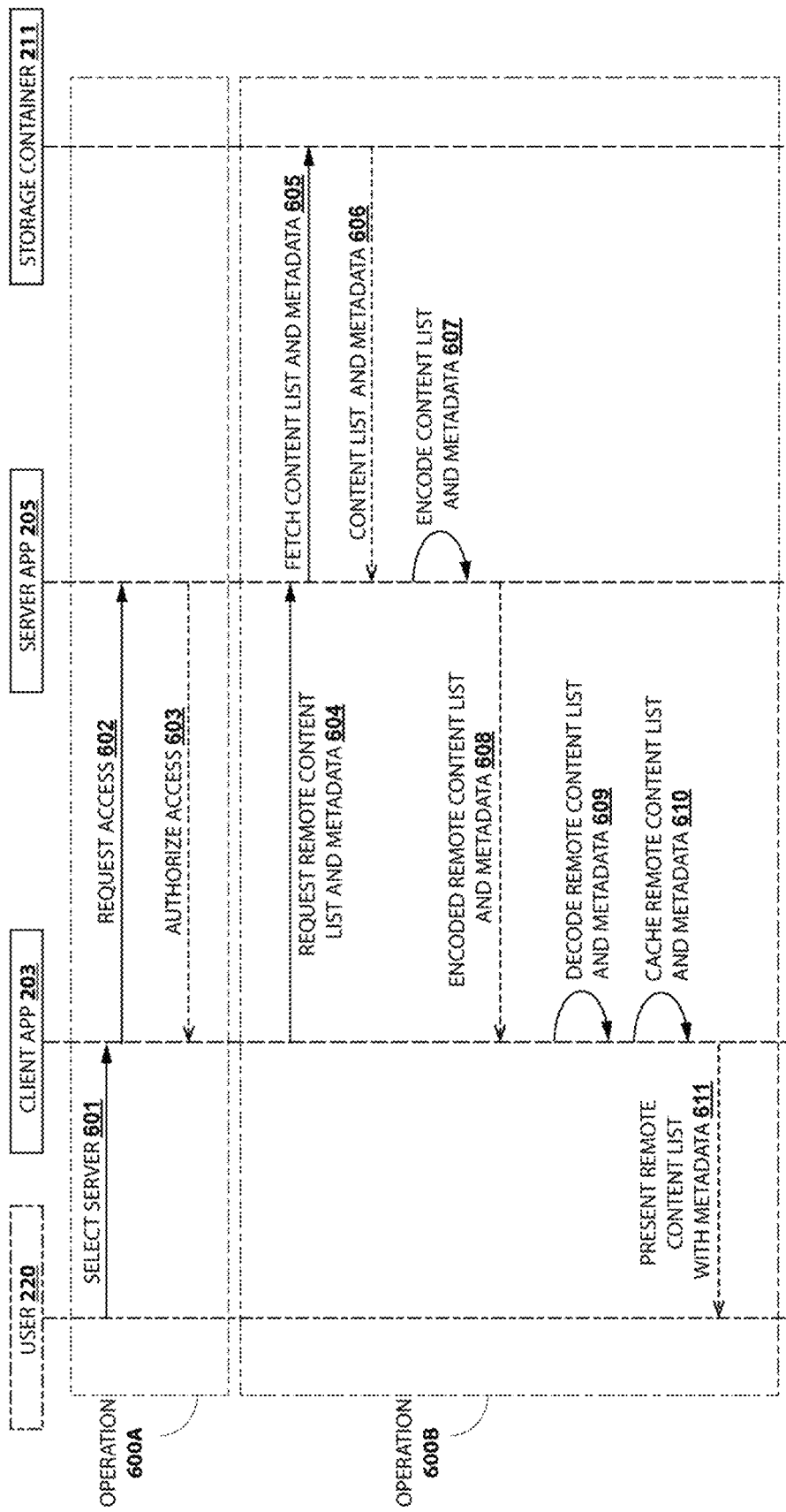
FIG. 6A shows a sequence diagram of the initial process of accessing the server device's contents.
Figure 6B:
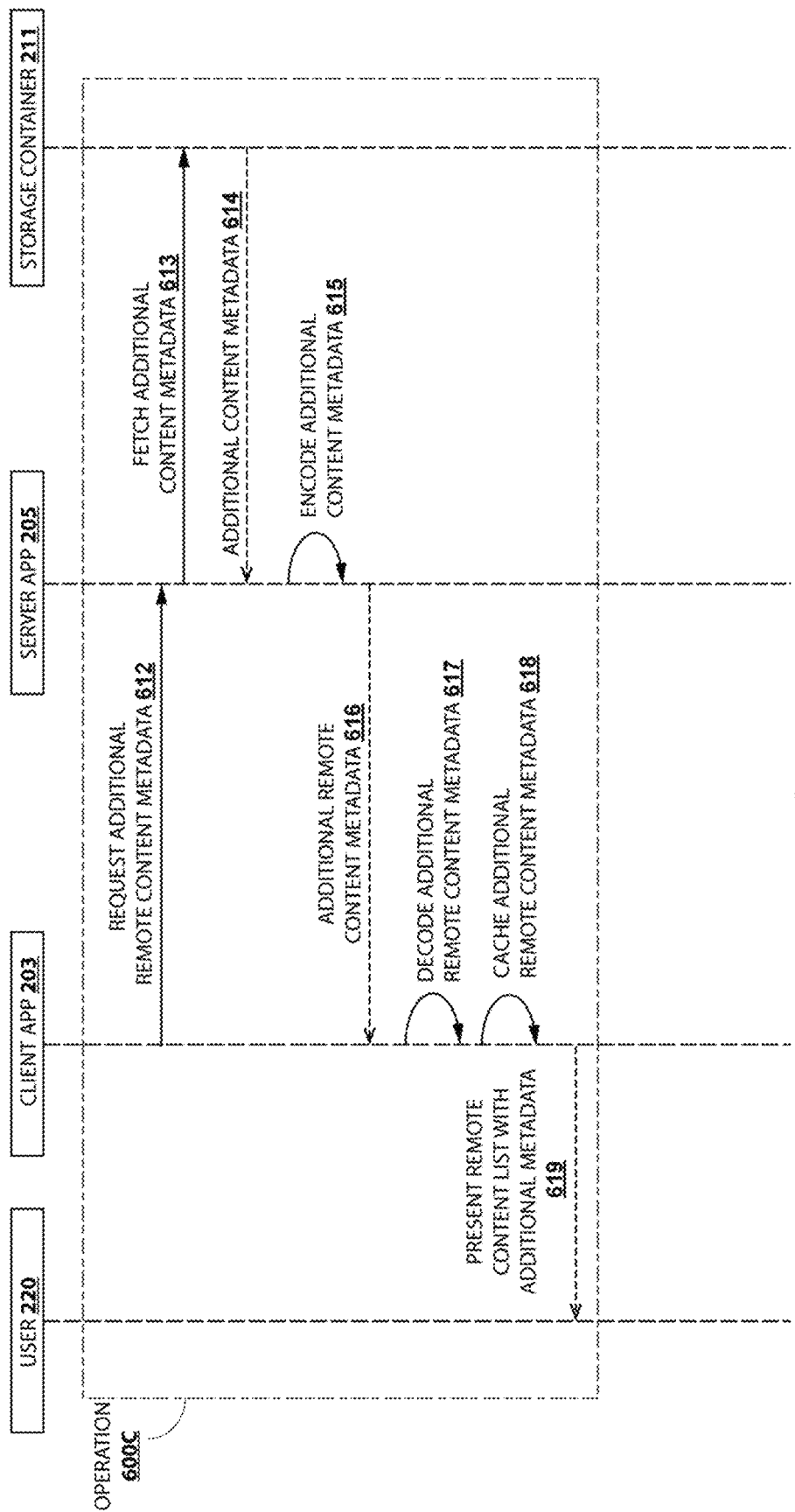
FIG. 6B shows a sequence diagram of the process of retrieving additional content metadata.
Figure 6D:
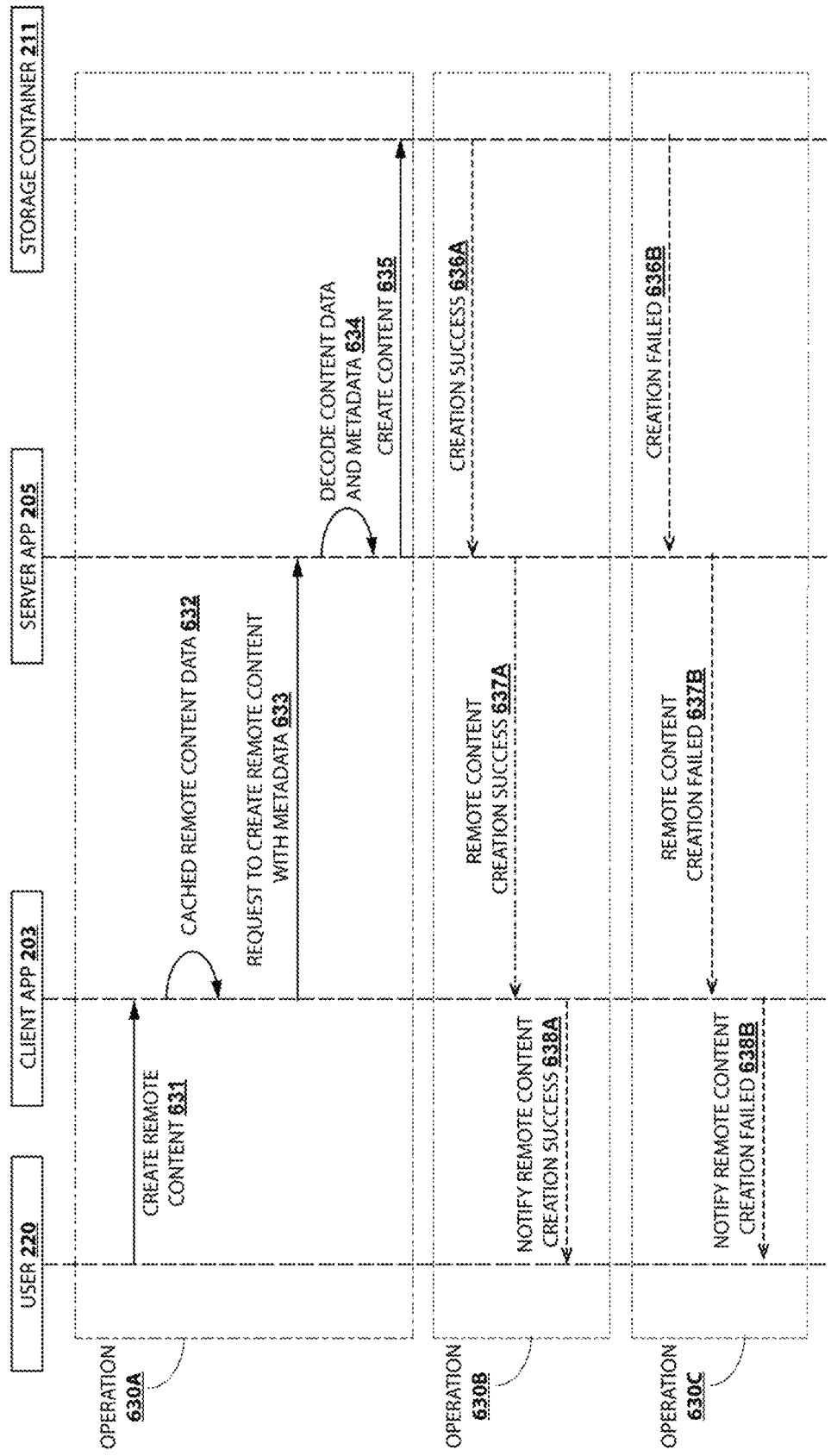
FIG. 6D shows a sequence diagram of the create operation of the remote content.

FIG. 6D shows a sequence diagram of creating content via the client application 203. In operation 630A in FIG. 6D, the user 220 may create a new remote content via client application 203 in step 631. When user 220 creates a new content, client application 203 may first cache the content data at step 632 in a memory area of the client device, or directly send a protocol message of the request to create remote content to server application 205 at step 633. The protocol message sent to the server application 205 in step 633 will include the data and the metadata of the remote content to furnish the information when creating the actual content in the storage container 211. Upon receiving the protocol message, server application 205 will decode it and extract the content data together with its metadata at step 634. Server application 205 will then create the content in the storage container 211 at step 635. After the storage container 211 creates the content, it will return the result to the server application 205 at step 636A in case of success, and step 636B in case of failure. In some implementations, the return status from storage container 211 may be more than just success or failure depending on the type of the storage container 211 of the server device 201. The result will then be propagated to the client application 203 at step 637A or 637B, accordingly, and eventually notified to the user 220 at step 638A or 638B respectively. In the case of success on step 638A, client application may notify user by updating the presentation of the content such as setting the creation progressively to 100%, or showing a completion message, etc. In the case of failure on step 638B, client application 203 may notify the user by showing error message or some other message indicating a fail operation.

Figure 6E:
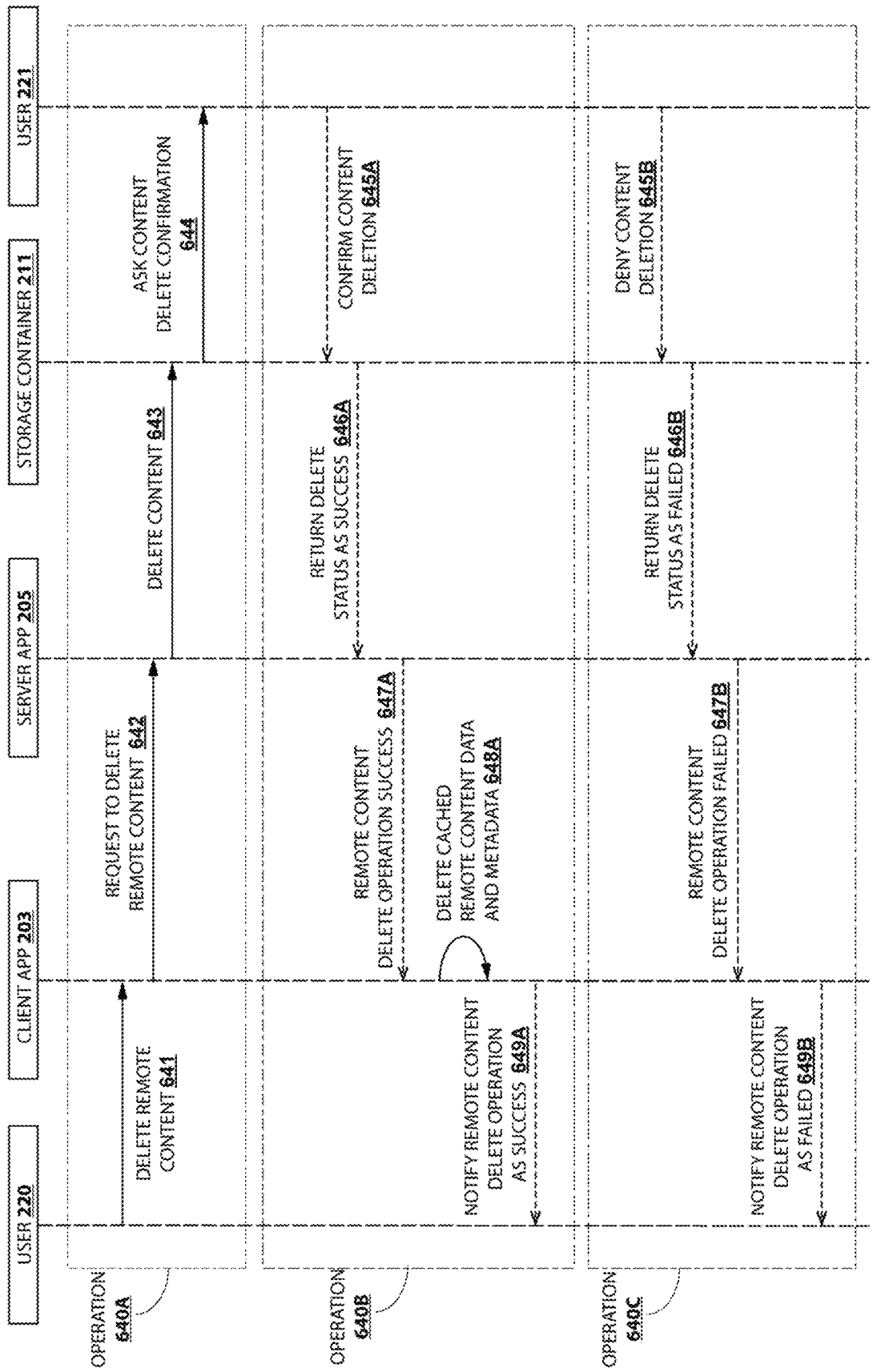
FIG. 6E shows a sequence diagram of the delete operation of the remote content.
Figure 7G:
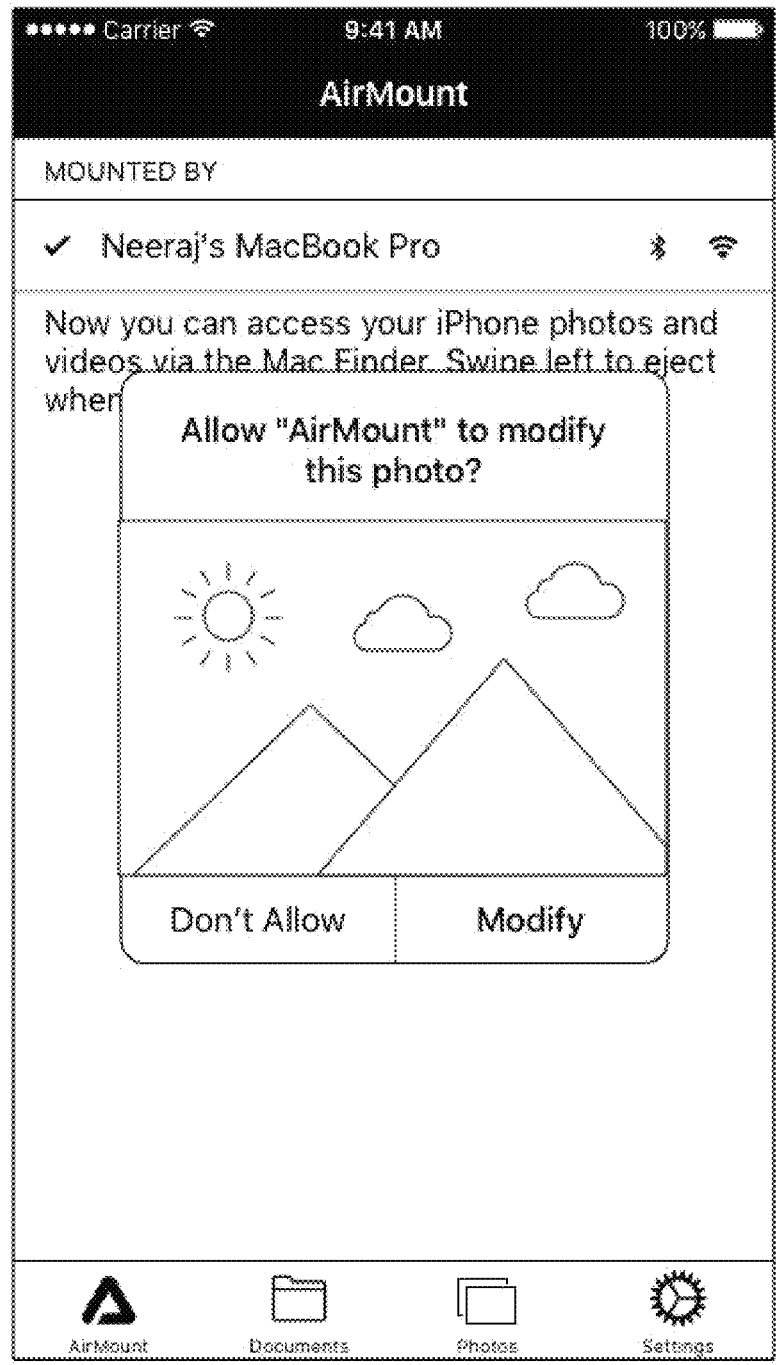
FIG. 7G shows a screenshot of one implementation of the server application showing a request from a client application to modify photo content on the server device.
Figure 7H:
FIG. 7H shows a screenshot of one implementation of the server application showing a request from a client application to delete photo content on the server device.
Figure 7J:
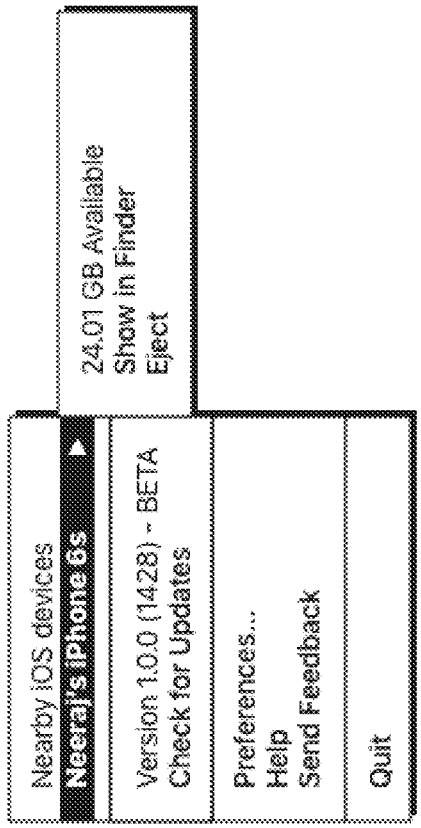
FIG. 7J shows a screenshot of one implementation of the client application showing available user storage space on a connected server device.
Figure 7I:
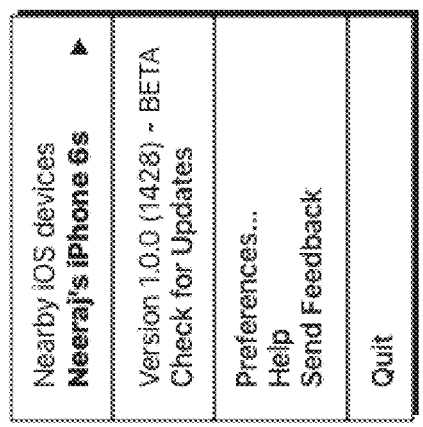
FIG. 7I shows a screenshot of one implementation of the client application showing a connected status of the server device.

FIG. 6E shows a sequence diagram of deleting content via the client application 203. In operation 640A in FIG. 6E, the user 220 is performing a delete operation on remote content via the client application 203 at step 641. The client application 203 will then send a protocol message requesting the server application 205 to delete the remote content at step 642. The server application 205 will decode the protocol message and attempt a delete operation of the content in the storage container 211. Some storage containers 211, such as a photo library, may require the server device's user 221 to give confirmation before a delete action can actually be performed. At step 644, the storage container 211 may ask the user 221 to give confirmation of the content deletion. One example of step 644 is shown in FIG. 7H shows a screenshot of one implementation of the server app showing the request from a client application to delete photo content on the server device. If the user 221 confirms the deletion at step 645A, the sequence proceeds to operation 640B. The storage container 211 will return to the server application 205 a status that the content deletion is success at step 646A. Server application 205 will propagate the success status to the client application 203 via protocol message at step 647A. Upon receiving the success status in step 647A, client application 203 first delete the cached remote content, if any, at step 648A followed by a notification to the user 220 that the delete operation is successful at step 649A. The availability of the remote content in the cached is dependent on the condition whether or not the user 220 has previously opened the remote content at operation 620A. When the user 221 denies the content deletion at step 645B, the storage container 211 will return a fail status to server application 205 at step 646B in operation 640C. In some implementations, the return status from storage container 211 may be more than just success or failure depending on the types) of the storage container(s) 211 of the server device 201. Server application 205 will then propagate the failure status to the client application 203 via a protocol message at step 647B. Upon receiving and decoding the protocol message, the client application 203 will notify the user 220 to inform that the delete request has failed at step 649B.

Figure 6F:
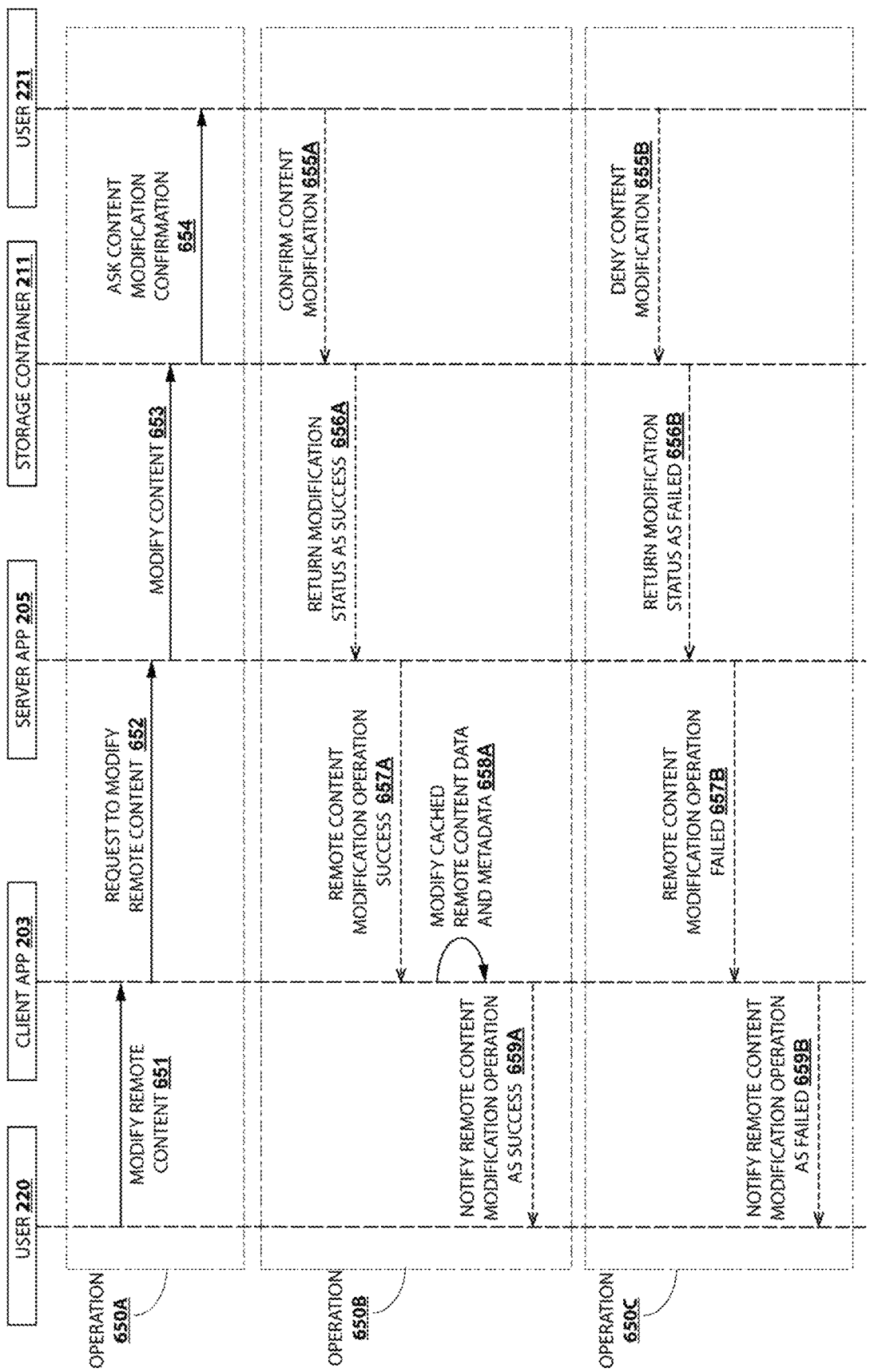
FIG. 6F shows a sequence diagram of the modify operation of the remote content.

FIG. 6F shows a sequence diagram of the modify operation of remote content. In particular, edits can be made in place, so there is no need for additional steps to send the file back and forth between the server and client device. In operation 650A of FIG. 6F, user 220 performs a modification of remote content via the client application 203 at step 651. The client application 203 will send a protocol message to server application 205 requesting to modify a remote content at step 652. Server application 205 will decode the protocol message and perform the modification operation of the content in the storage container 211 at step 653. The protocol message sent at step 652 may include the modified content data, and/or content metadata. The modified content data may be the entire data or differential data from the previous version. Some storage container(s) 211, such as a photo library, may require the server device's user 221 to give confirmation before a modification can be applied to a content. At step 654, the storage container will ask the user 221 to give confirmation on the content modification request. One implementation of step 654 is shown in FIG. 7G which shows a screenshot of one implementation of the server app showing a request from a client application to modify photo content on the server device. If the user 221 confirms the modification request it will follow the sequence in operation 650B, otherwise it will follow the sequence in operation 650C. After user 221 confirms the modification request at step 655A, the storage container 211 will return the status as success at step 656A which also means the modification is applied to the content at the server device. For example, a modification request on a photo may be a cropping operation. Upon confirming the modification by the user, the cropped photo is applied to the storage container 211. Server application 205 will propagate the success status to client application 203 in a protocol message at step 657A. Upon decoding the protocol message with the success status, the client application 203 may update the cached remote content, if any, with the modified version, at step 658A, so subsequent request to open the remote content will already have the modified version of the content. Client application 203 will then notify the user 220 that the content modification operation is successful at step 659A. The notification in step 659A may be presented to the user with the modified form of the content, for example a cropped photo in the case the modification operation is cropping. In the case user 221 deny the content modification request at 655B, the storage container 211 will not apply the modification to the stored content, and return modification status as failed to the server application 205 at 656B. Server application 205 will propagate the failure status to the client application 203 via a protocol message at 657B. Client application 203 will decode the protocol message with the failure status and notify the user 220, at 659B, so the user 220 will still access the remote content unmodified.

In one implementation, the client application 203 may further manage operation priority handling to prioritize plural operations performed by the user 220. In some implementations, there are three operation categories that may be performed remotely by the client application 203 to the storage container 211, which include: (i) Category A operations which are content list and metadata retrieval operations 600B, (ii) Category B operations which are additional content metadata operations 600C, and (iii) Category C operations which consist of read operations 620A & 620B, create operations 630A, delete operations 640A, or modify operations 650A. To increase the responsiveness of the client application 203 to the user 220, operations of Category C may take the highest priority followed by Category A and then followed by Category B.

FIG. 6G shows a sequence diagram of priority handling for remote content operations of different categories. An example of operation priority handling between different operation categories is shown in FIG. 6G. The server application 205 manages an operation stack to suspend one or more operations when a higher priority operation is to be performed in advanced. In FIG. 6G, an operation 600C which belongs to Category A is requested by client application 203 to be performed on the server application 205 at step 661. Server application 205 is processing the operation 600C at step 662. Before completing the processing of operation 600C, server application 205 receives a request from client application 203 to process an operation 620A which is a Category C operation at step 663. As soon as the server application 205 receives the request for operation 620A, it suspends the currently running operation 600C at step 664. The suspended operation 600C will then be pushed to the stack at step 665 and the stack is now holding the suspended operation 600C as shown in 671B. Server application 205 will then continue to process operation 620A at step 666 and send the response of operation 620A to the client application 203 at step 667. Upon finishing the processing of step 666, the server application 205 will pop the operation 600C back from the stack at step 668 which will make the stack back to the state before any of the operation is performed at 671C. Once the operation 600C is popped from the stack, it is resumed from its last operational state at step 669 and a response is sent to the client application 203 at step 670. The foregoing sequence ensures that the current intention of the user 220 is fulfilled first before completing other less urgent tasks. Similar management is applied for operations 630A, 640A and 650A which are Category C operations.

Figure 6H:
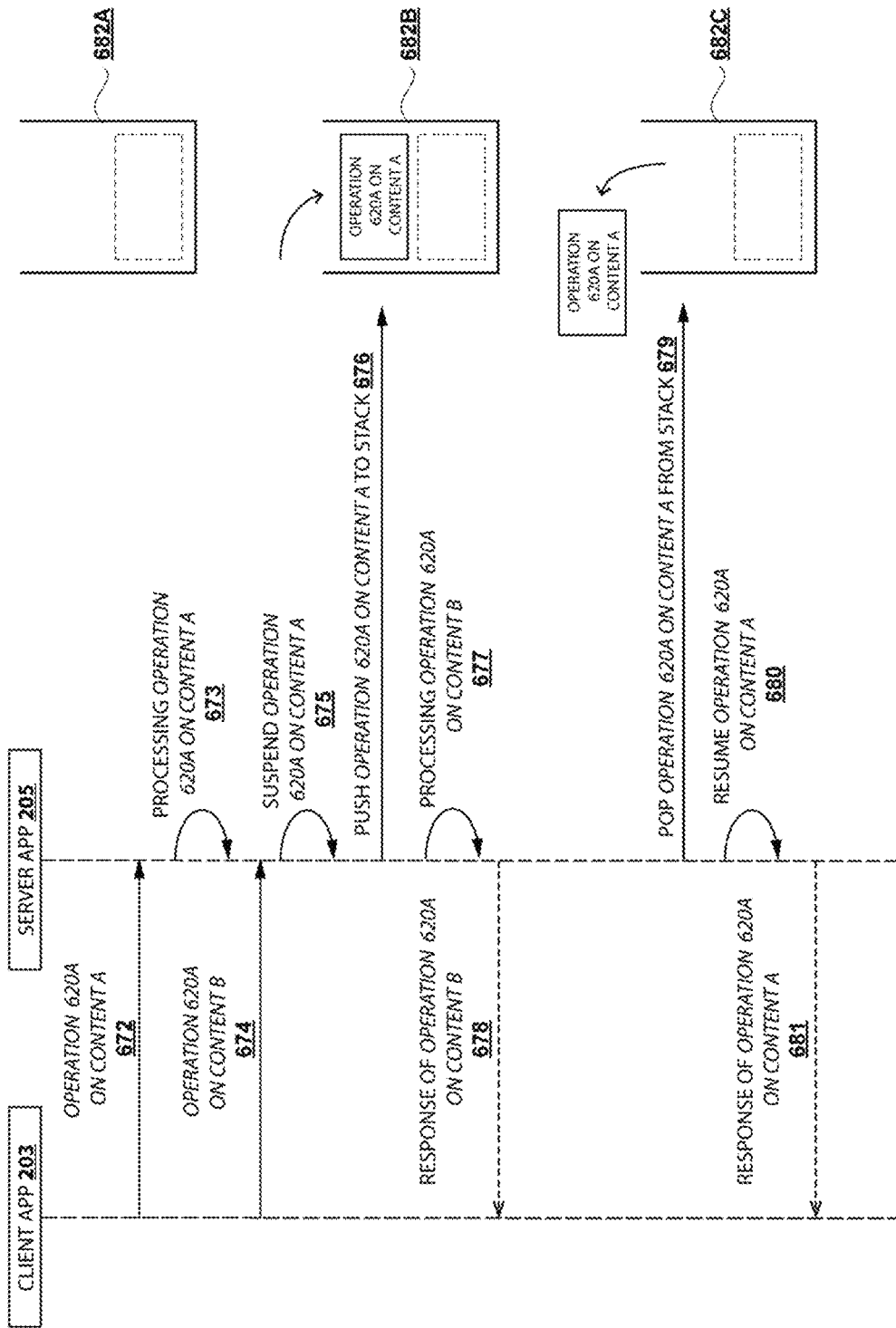
FIG. 6H shows a sequence diagram of priority handling for remote content operations of the same category.

FIG. 6H shows a sequence diagram of priority handling for remote content operations of the same category. Within the same operation category, the operation that is performed last will always be served first. For example, in FIG. 6H, client application 203 performs an operation 620A on remote content A to server application 205 at step 672. While server application 205 processes the request of operation 620A on content A at step 673, client application 203 performs another operation 620A on another remote content B at step 674. Upon receiving the request of operation 620A on content B, server application 205 will immediately suspend operation 620A on content A at step 675, and push the suspended operation 620A on content A to stack at step 676. The stack that was initially in state 682A, will now change to state 682B with operation 620A on content A sitting on the top of the stack. Server application 205 will then process the operation 620A on content B at step 677, and return the response to client application 203 at step 678. Upon completing the processing of operation 620A on content B, the server application 205 will pop the operation 620A on content A back from the stack at step 679, resume it at step 680, and send the response to client application 203 at step 681. After this, the stack is in state 682C, and is back to the same state before any of the operations were performed.

In some implementations, operation Category A has a higher priority than Category B since the Category A operation has a more significant impact on the browsing experience of the user compared to Category B. It is assumed that user browsing and interaction experience with the content list should not be compromised in exchange with a richer content presentation. This assumption is more prominent in the case that the client application 203 is accessed via file system interface 222 where the $3^{rd}$ party application 206 may navigate on the directory tree in a random and quick manner, for example navigating folder trees using a file manager such as Finder in Mac OS. Depending on the application and system requirements, the operation categories may be defined as more than just three types and set as different priority levels for each in some implementations. The assignment of the operations into a category may also depend on the application and system requirements of the implementations. An operation may belong to one or more category depending on the application or system conditions or may even change categories at runtime.

As described above with reference to the drawings, content(s) of nearby server(s) are presented to be interfaced with at client(s) over a peer-to-peer direct wireless network. The clients and servers may be concurrently provided in one or more devices. Among the advantages of the peer-to-peer direct wireless network, conventional network infrastructure and wired connections can be foregone. Moreover, once connected, the clients can retrieve, present, interact and operate on the aggregated contents of the servers via a lightweight representation of the content of the servers. Aggregated content(s) may be presented in the form of an interactive document, a filesystem volume, and/or an API, different from the original form the content(s) are stored at each server. Further, authorizations to access content can be provided at the servers to limit the clients directly interactions and operations on the content(s) of the server(s). The types of interactions the client may perform can vary by presentation but generally include viewing, browsing, editing, deleting as well as liking tagging, and commenting.

Although specific details of implementations are described with regard to the architectures and sequence diagrams presented in the figures, certain acts shown in the figures need not be performed in the order described, and may be modified, and/or may be omitted entirely, depending on the circumstances. As described in this application, the aforementioned features may be implemented using software, hardware, firmware, or a combination thereof. Moreover, the acts and methods described may be implemented by a computer, smartphone device, or other types of computing devices based on instructions stored on memory, the memory comprising one or more computer-readable storage media.

Such media may be any available physical media accessible by the one or more devices to implement the instructions stored thereon. Such media may include, but is not limited to, random access memory (RAM), read-only memory (ROM), electrically erasable programmable read-only memory (EEPROM), flash memory or other solid-state memory technology, compact disk read-only memory (CD-ROM), other optical disk storage, magnetic cassettes, magnetic tape, magnetic disk storage or other magnetic storage devices, or any other medium which can be used to store non-transitory computer-readable information and which can be accessed by a processor for execution.

Furthermore, it should be emphasized that conditional language, such as, among others, "can," "could," "might," or "may," unless specifically stated otherwise, or otherwise understood within the context as used, are generally intended to convey that certain implementations include, while other implementations do not, certain features, elements and/or steps. Thus, such conditional language is not generally intended to imply that features, elements and/or acts are in any way required for one or more implementations or that one or more implementations necessarily include logic for deciding, with or without user input or prompting, whether these features, elements and/or steps are included or are to be performed in any particular implementations.

It should be emphasized that the implementations described herein may be realized in any of various forms. For example, some implementations may be realized as a computer-implemented method, a computer-readable media, or a computer system. In some implementations, a non-transitory computer-readable memory medium may be configured to store instructions and/or data, where the instructions cause processors of the computer system to perform foregoing acts described herein. Although the implementations above have been described in considerable detail, numerous variations, modifications, and combinations to the disclosed implementations will become apparent to those skilled in the art having considered the disclosure in its entirety.

What is claimed is:

1. An electronic device of a first user comprising:
   one or more processors;
   a display coupled to the one or more processors; and
   one or more computer-readable media storing instructions executable by the one or more processors, wherein the electronic device is a first electronic device of a plurality of electronic devices, and wherein the one or more processors of the first electronic device are configured to:
   connect with a second electronic device of a second user of the plurality of electronic devices over a first peer-to-peer wireless network link when the second electronic device is within a communicable range of the first electronic device;
   send to the second electronic device over the first peer-to-peer wireless network link, a first unique code generated by the first electronic device, wherein the first unique code corresponds to a first user identifier of the first electronic device, both the first unique code and the first user identifier are stored on the first electronic device;
   receive from the second electronic device, over the first peer-to-peer wireless network link, a second unique code generated by the second electronic device, the second unique code being unique to the second electronic device, wherein the second unique code corresponds to a second user identifier of the second electronic device, both the second unique code and the second user identifier are stored on the second electronic device;
   store on the first electronic device, the second unique code;
   store on the first electronic device, information indicating the proximity of the second electronic device and the time when it is within the communicable range of the first electronic device;
   retrieve from a coupled backend database stored in a cloud, a third unique code wherein the third unique code is a unique code of an electronic device; and
   upon determining that the third unique code matches the second unique code received by the first electronic device from the second electronic device over the first peer-to-peer wireless network link, display a notification on the first electronic device.

2. The electronic device according to claim 1, wherein the one or more processors are further configured to:
   store the second unique code on the first electronic device for a limited period of time.

3. The electronic device according to claim 1, wherein the one or more processors are further configured to:
   generate a new first unique code automatically after a specific period of time and store the new first unique code along with the first unique code previously generated.

4. The electronic device according to claim 1, wherein the one or more processors are further configured to:
   connect with the second electronic device only when granted permission by the first user.

5. The electronic device according to claim 1, wherein:
   the information indicating the proximity of the second electronic device and the time when it is within the communicable range of the first electronic device does not include the location of the second electronic device or the second user identifier.

6. The electronic device according to claim 1, wherein the one or more processors are further configured to:
   encrypt the first unique code.

7. The electronic device according to claim 1, wherein the one or more processors are further configured to:
   display the notification on the first electronic device only if the information indicating the proximity of the second electronic device and the time when it is within the communicable range of the first electronic device meets certain criteria.

8. The electronic device according to claim 7, wherein the criteria include the proximity or duration of interaction between the first and second electronic devices.

9. The electronic device according to claim 1, wherein the one or more processors are further configured to:
retrieve the third unique code from the coupled backend database automatically after a specific period of time.

10. The electronic device according to claim 1, wherein the third unique code is uploaded to the coupled backend database from an electronic device in response to a user input on the electronic device.

11. The electronic device according to claim 1, wherein the third unique code is uploaded to the coupled backend database via an API.

12. A computer-implemented method for discovering a unique code associated with a second electronic device on a first electronic device connected over a first peer-to-peer wireless network link to the second electronic device, the method comprising:
discovering a second electronic device of a second user of the plurality of electronic devices over a first peer-to-peer wireless network link when it is within a communicable range of the first electronic device;
connecting with the second electronic device after discovering the second electronic device;
sending to the second electronic device over the first peer-to-peer wireless network link, a first unique code generated by the first electronic device, wherein the first unique code corresponds to a first user identifier of the first electronic device, both the first unique code and the first user identifier are stored on the first electronic device;
receiving from the second electronic device, over the first peer-to-peer wireless network link, a second unique code generated by the second electronic device, the second unique code being unique to the second electronic device, wherein the second unique code corresponds to a second user identifier of the second electronic device, both the second unique code and the second user identifier are stored on the second electronic device;
storing on the first electronic device, the second unique code;
storing on the first electronic device, information indicating the proximity of the second electronic device and the time when it is within the communicable range of the first electronic device;
retrieving from a coupled backend database stored in a cloud, a third unique code wherein the third unique code is a unique code of an electronic device uploaded to the coupled backend database stored in the cloud; and
upon determining that the third unique code matches the second unique code received by the first electronic device from the second electronic device over the first peer-to-peer wireless network link, displaying a notification on the first electronic device.

13. The computer-implemented method according to claim 12, further comprising:
displaying the notification on the first electronic device only if the information indicating the proximity of the second electronic device and the time when it is within the communicable range of the first electronic device meets specific criteria, including the proximity or duration of interaction between the first and second electronic devices.

14. One or more non-transitory computer-readable storage media storing a program including one or more computer-readable media storing instructions executable by one or more processors, and wherein the instructions, when executed by the one or more processors, program the one or more processors of a first electronic device or a plurality of electronic devices to:
connect with a second electronic device of a second user of the plurality of electronic devices over a first peer-to-peer wireless network link when the second electronic device is within a communicable range of the first electronic device;
send to the second electronic device over the first peer-to-peer wireless network link, a first unique code generated by the first electronic device, wherein the first unique code corresponds to a first user identifier of the first electronic device, both the first unique code and the first user identifier are stored on the first electronic device;
receive from the second electronic device, over the first peer-to-peer wireless network link, a second unique code generated by the second electronic device, the second unique code being unique to the second electronic device wherein the second unique code corresponds to a second user identifier of the second electronic device, both the second unique code and the second user identifier are stored on the second electronic device;
store on the first electronic device, the second unique code;
store on the first electronic device, information indicating the proximity of the second electronic device and the time when it is within the communicable range of the first electronic device;
retrieve from a coupled backend database stored in a cloud, a third unique code wherein the third unique code is a unique code of an electronic device; and
upon determining that the third unique code matches the second unique code received by the first electronic device from the second electronic device over the first peer-to-peer wireless network link, display a notification on the first electronic device.

15. The one or more non-transitory computer-readable storage media according to claim 14, wherein the one or more processors are further programmed to:
store the second unique code on the first electronic device for a limited period of time.

16. The one or more non-transitory computer-readable storage media according to claim 14, wherein the one or more processors are further programmed to:
generate a new first unique code automatically after a specific period of time and store the new first unique code along with the first unique code previously generated.

17. The one or more non-transitory computer-readable storage media according to claim 14, wherein the one or more processors are further programmed to:
encrypt the first unique code.

18. The one or more non-transitory computer-readable storage media according to claim 14, wherein the one or more processors are further programmed to:
display the notification on the first electronic device only if the information indicating the proximity of the second electronic device and the time when it is within the communicable range of the first electronic device meets certain criteria.

19. The one or more non-transitory computer-readable storage media according to claim 18, wherein the criteria include the proximity or duration of interaction between the first and second electronic devices.

20. The one or more non-transitory computer-readable storage media according to claim 14, wherein the one or more processors are further programmed to:
retrieve the third unique code from the coupled backend database automatically after a specific period of time.

21. The one or more non-transitory computer-readable storage media according to claim 14, wherein the third unique code is uploaded to the coupled backend database stored in the cloud from the electronic device in response to a user input on the electronic device.

22. The one or more non-transitory computer-readable storage media according to claim 14, wherein the third unique code is uploaded to the coupled backend database stored in the cloud via an API.

23. A system comprising:
an electronic device of a first user comprising:
one or more processors;
a display coupled to the one or more processors; and
one or more computer-readable media storing instructions executable by the one or more processors, wherein the electronic device is a first electronic device of a plurality of electronic devices, and wherein the one or more processors of the first electronic device are configured to:
connect with a second electronic device of a second user of the plurality of electronic devices over a first peer-to-peer wireless network link when the second electronic device is within a communicable range of the first electronic device;
send to the second electronic device over the first peer-to-peer wireless network link, a first unique code generated by the first electronic device, wherein the first unique code corresponds to a first user identifier of the first electronic device, both the first unique code and the first user identifier are stored on the first electronic device;
receive from the second electronic device, over the first peer-to-peer wireless network link, a second unique code generated by the second electronic device, the second unique code being unique to the second electronic device, wherein the second unique code corresponds to a second user identifier of the second electronic device, both the second unique code and the second user identifier are stored on the second electronic device;
store on the first electronic device, the second unique code; and
store on the first electronic device, information indicating the proximity of the second electronic device and the time when it is within the communicable range of the first electronic device;
a coupled backend database stored in a cloud; and
a coupled backend server connected to the coupled backend database;
wherein the first electronic device displays a notification upon retrieving a third unique code from the coupled backend database matching the second unique code it received;
wherein the third unique code is a unique code of an electronic device uploaded to the coupled backend database stored in the cloud.

24. The system according to claim 23, wherein the first electronic device retrieves the third unique code from the coupled backend database automatically after a specific period of time.

25. The system according to claim 23, wherein the first electronic device displays the notification only if the information indicating the proximity of the second electronic device and the time when it is within the communicable range of the first electronic device meets certain criteria.

26. The system according to claim 25, wherein the criteria include the proximity or duration of interaction between the first and second electronic devices.

27. The system according to claim 23, wherein the second unique code is stored on the first electronic device for a limited period of time.

28. The system according to claim 23, wherein the third unique code is uploaded to the coupled backend database from the electronic device in response to a user input on the electronic device.

29. The system according to claim 23, wherein the third unique code is uploaded to the coupled backend database via an API.

30. The system according to claim 23, wherein the first unique code is encrypted.

* * * * *